(12) United States Patent
Everett

(10) Patent No.: US 8,051,102 B2
(45) Date of Patent: Nov. 1, 2011

(54) DATA BASE AND KNOWLEDGE OPERATING SYSTEM

(75) Inventor: Ron Everett, Montreal (CA)

(73) Assignee: Levitronics, Inc., Montreal, Quebec (CA)

( * ) Notice: Subject to any disclaimer, the term of this patent is extended or adjusted under 35 U.S.C. 154(b) by 1974 days.

(21) Appl. No.: 10/620,988

(22) Filed: Jul. 16, 2003

(65) Prior Publication Data

US 2004/0024790 A1 Feb. 5, 2004

Related U.S. Application Data

(60) Provisional application No. 60/398,843, filed on Jul. 26, 2002, provisional application No. 60/457,207, filed on Mar. 25, 2003.

(51) Int. Cl.
G06F 17/30 (2006.01)

(52) U.S. Cl. .......................... 707/793; 707/803

(58) Field of Classification Search .................. 707/103, 707/4, 10, 3; 395/613
See application file for complete search history.

(56) References Cited

U.S. PATENT DOCUMENTS

| | | | |
|---|---|---|---|
| 5,448,726 A | 9/1985 | Cramsie et al. | |
| 4,591,983 A | 5/1986 | Bennett et al. | |
| 4,752,889 A | 6/1988 | Rappaport et al. | |
| 4,816,994 A | 3/1989 | Freiling et al. | |
| 4,853,873 A | 8/1989 | Tsuji et al. | |
| 4,868,763 A | 9/1989 | Masui et al. | |
| 4,884,218 A | 11/1989 | Agnew et al. | |
| 4,893,232 A | 1/1990 | Shimaoka et al. | |
| 5,333,237 A | 7/1994 | Stefanopoulos et al. | |
| 5,333,310 A | 7/1994 | Sakai | |
| 5,448,722 A | 9/1995 | Lynne et al. | |
| 5,481,718 A | 1/1996 | Ryu et al. | |
| 5,490,258 A | 1/1996 | Fenner | |
| 5,555,409 A | 9/1996 | Leenstra, Sr. et al. | |
| 5,561,793 A | 10/1996 | Bennett et al. | |
| 5,592,666 A | 1/1997 | Perez | |
| 5,619,621 A | 4/1997 | Puckett | |
| 5,649,190 A | 7/1997 | Sharif-Askary et al. | |

(Continued)

FOREIGN PATENT DOCUMENTS

WO 0129717 4/2001

(Continued)

OTHER PUBLICATIONS

Tanenbaum A. S., Memory Management, XP-002282085, Chapter 4, pp. 206-209.

(Continued)

Primary Examiner — John E Breene
Assistant Examiner — Dennis Myint
(74) Attorney, Agent, or Firm — Dennis M. Carleton; George P. Baier; Fox Rothschild LLP

(57) ABSTRACT

Associative Data Management and Knowledge Operating System using a Data Instance centric architecture, where Data Instances are typically atomic. Each Data Instance can be at the center with all its associations. The base structures encapsulate the Data Instances and can generally be identical in form and function, and application independent. Encapsulate references can include references to all other directly related independently encapsulated Data Instances. The encapsulated references can be both unique identifiers for each and every associated Data Instance and also logical indexes that encode the abstracted location of each Data Instance, making it possible to both identify and locate any Data Instance using the same reference key.

70 Claims, 31 Drawing Sheets

Assimilating a 'Primary' Relation

U.S. PATENT DOCUMENTS

| | | | |
|---|---|---|---|
| 5,671,406 A | | 9/1997 | Lubbers et al. |
| 5,701,453 A | | 12/1997 | Maloney et al. |
| 5,701,467 A | | 12/1997 | Freeston |
| 5,713,014 A | | 1/1998 | Durflinger et al. |
| 5,713,031 A | | 1/1998 | Saito |
| 5,726,898 A | | 3/1998 | Jacobs |
| 5,758,333 A | | 5/1998 | Bauer et al. |
| 5,799,157 A | | 8/1998 | Escallon |
| 5,809,297 A | * | 9/1998 | Kroenke et al. ............. 707/102 |
| 5,812,840 A | * | 9/1998 | Shwartz ........................... 707/4 |
| 5,822,780 A | | 10/1998 | Schutzman |
| 5,873,049 A | * | 2/1999 | Bielak et al. ..................... 702/6 |
| 5,878,408 A | | 3/1999 | Van Huben et al. |
| 5,905,989 A | | 5/1999 | Biggs |
| 5,920,867 A | | 7/1999 | Van Huben et al. |
| 5,974,141 A | | 10/1999 | Saito |
| 5,991,758 A | | 11/1999 | Ellard |
| 6,002,772 A | | 12/1999 | Saito |
| 6,016,497 A | * | 1/2000 | Suver ........................ 707/103 R |
| 6,029,174 A | | 2/2000 | Sprenger et al. |
| 6,031,537 A | | 2/2000 | Hugh |
| 6,037,944 A | | 3/2000 | Hugh |
| 6,067,552 A | | 5/2000 | Yu |
| 6,073,111 A | | 6/2000 | Leymann et al. |
| 6,076,077 A | | 6/2000 | Saito |
| 6,088,693 A | | 7/2000 | Van Huben et al. |
| 6,101,500 A | | 8/2000 | Lau |
| 6,112,209 A | | 8/2000 | Gusack |
| 6,115,716 A | | 9/2000 | Tikkanen et al. |
| 6,134,549 A | | 10/2000 | Regnier et al. |
| 6,205,447 B1 | | 3/2001 | Malloy |
| 6,212,530 B1 | | 4/2001 | Kadlec |
| 6,233,586 B1 | | 5/2001 | Chang et al. |
| 6,236,997 B1 | | 5/2001 | Bodamer et al. |
| 6,301,581 B1 | | 10/2001 | Smiley |
| 6,317,749 B1 | | 11/2001 | Chatate |
| 6,327,594 B1 | | 12/2001 | Van Huben et al. |
| 6,330,572 B1 | | 12/2001 | Sitka |
| 6,356,897 B1 | | 3/2002 | Gusack |
| 6,363,388 B1 | | 3/2002 | Sprenger et al. |
| 6,366,922 B1 | | 4/2002 | Althoff |
| 6,385,604 B1 | | 5/2002 | Bakalash |
| 6,400,996 B1 | | 6/2002 | Hoffberg et al. |
| 6,408,321 B1 | | 6/2002 | Platt |
| 6,424,989 B1 | | 7/2002 | Shaw et al. |
| 6,425,119 B1 | | 7/2002 | Jones et al. |
| 6,434,554 B1 | | 8/2002 | Asami et al. |
| 6,484,179 B1 | | 11/2002 | Roccaforte |
| 6,513,038 B1 | | 1/2003 | Hasegawa et al. |
| 6,609,132 B1 | * | 8/2003 | White et al. ............... 707/103 R |
| 6,711,582 B2 | * | 3/2004 | Aldridge et al. ........... 707/103 Y |
| 6,957,214 B2 | * | 10/2005 | Silberberg et al. ................ 707/4 |
| 2002/0069240 A1 | * | 6/2002 | Berk ............................ 709/203 |
| 2003/0076978 A1 | * | 4/2003 | Eversole et al. .............. 382/100 |
| 2003/0110513 A1 | * | 6/2003 | Plourde et al. ................ 725/134 |
| 2003/0216169 A1 | * | 11/2003 | Walker et al. ................... 463/25 |
| 2003/0227487 A1 | | 12/2003 | Hugh |
| 2005/0044079 A1 | * | 2/2005 | Abineri et al. ................. 707/10 |

FOREIGN PATENT DOCUMENTS

WO        0177904        10/2001

OTHER PUBLICATIONS

Tanenbaum A. S., Memory Management, XP-002282086, Chapter 4, pp. 191-205.

CCITT, Information Technology—Open Systems Interconnection—Structure of Management Information: Management Information Model, XP-002282087, Recommendation X.720, Jan. 1992, pp. 1-27.

Elementary Data Structures, XP-002268154, Chapter 11, pp. 200-218.

Graph Algorithms, XP-002269155, Chapter 8, pp. 537-547.

Chen, "The Entity-Relationship Model—Toward a Unified View of Data", ACM Transactions on Database Systems, vol. 1, No. 1, Mar. 1976, pp. 1-36.

E.F. Codd, "Extending the Database Relational Model to Capture More Meaning", ACM Transactions on Database Systems, vol. 4, No. 4, Dec. 1979, pp. 397-434.

Lazy Software Ltd., "The Associative Model of Data White Paper", Copyright 2000 Lazy Software Ltd, pp. 1-15.

Richard Hull, et al., "Semantic Database Modeling: Survey, Applications, and Research Issues", ACM Computing Survey, Applications and Research Issues, vol. 19, No. 3. Sep. 1987, pp. 201-260.

Lazy Software Ltd., "Lazy View Database Aggregation Capability White Paper", Lazy Software Ltd., Copyright 2002, pp. 1-4.

Codd, A Relational Model of Data for Large Shared Data Banks, IBM Research Laboratory, vol. 13, No. 6, Jun. 1970, pp. 377-387.

Senko, "Diam II: The Binary Infological Leval and Its Database Language—FORAL", Mathematical Sciences Dept., p. 121-140.

Baldissera, et al., "Interactive Specification and Formal Verification of User's Views in Data Base Design", 1979 IEEE Ch1406-8/79/0000-0262, pp. 262-272.

* cited by examiner

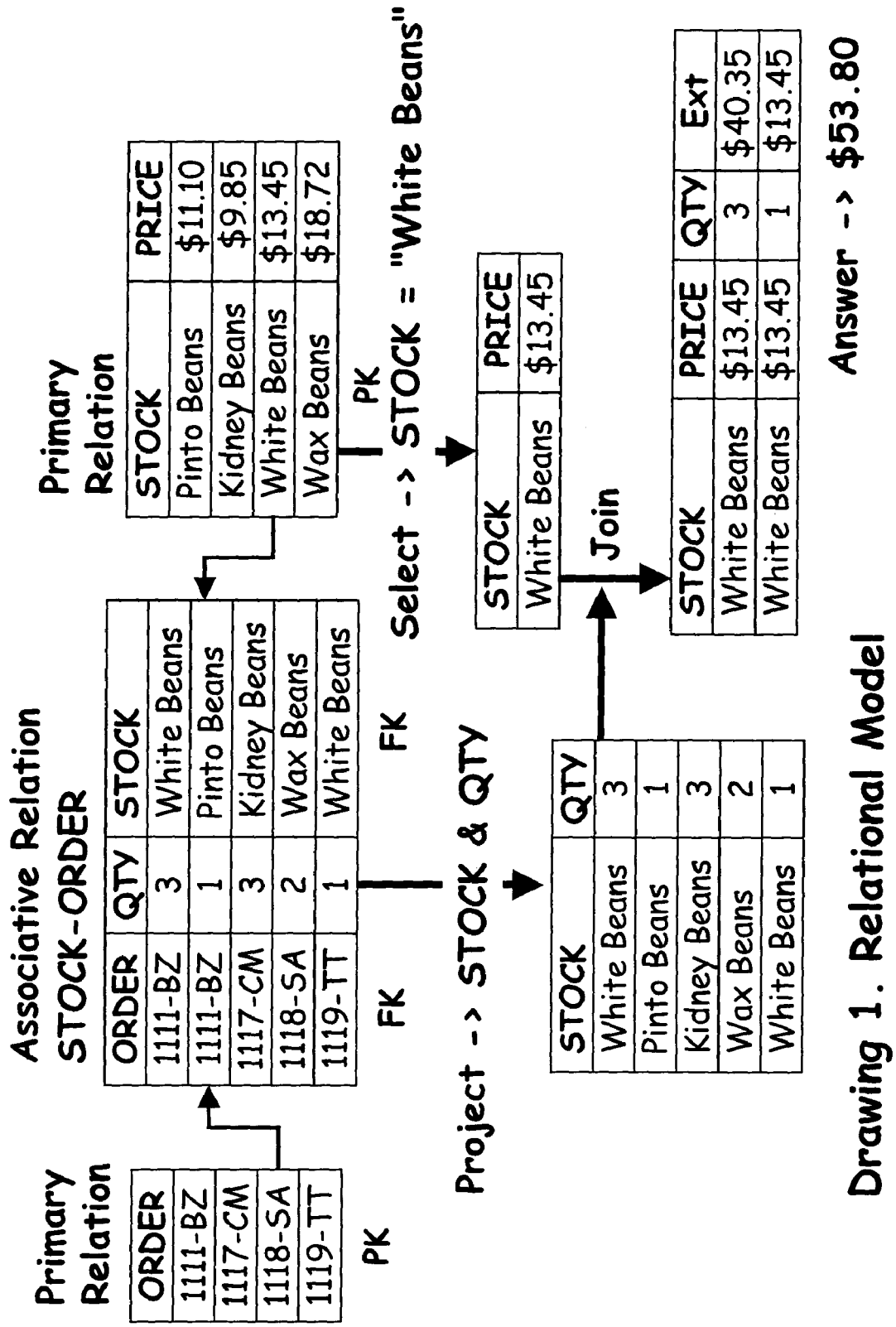

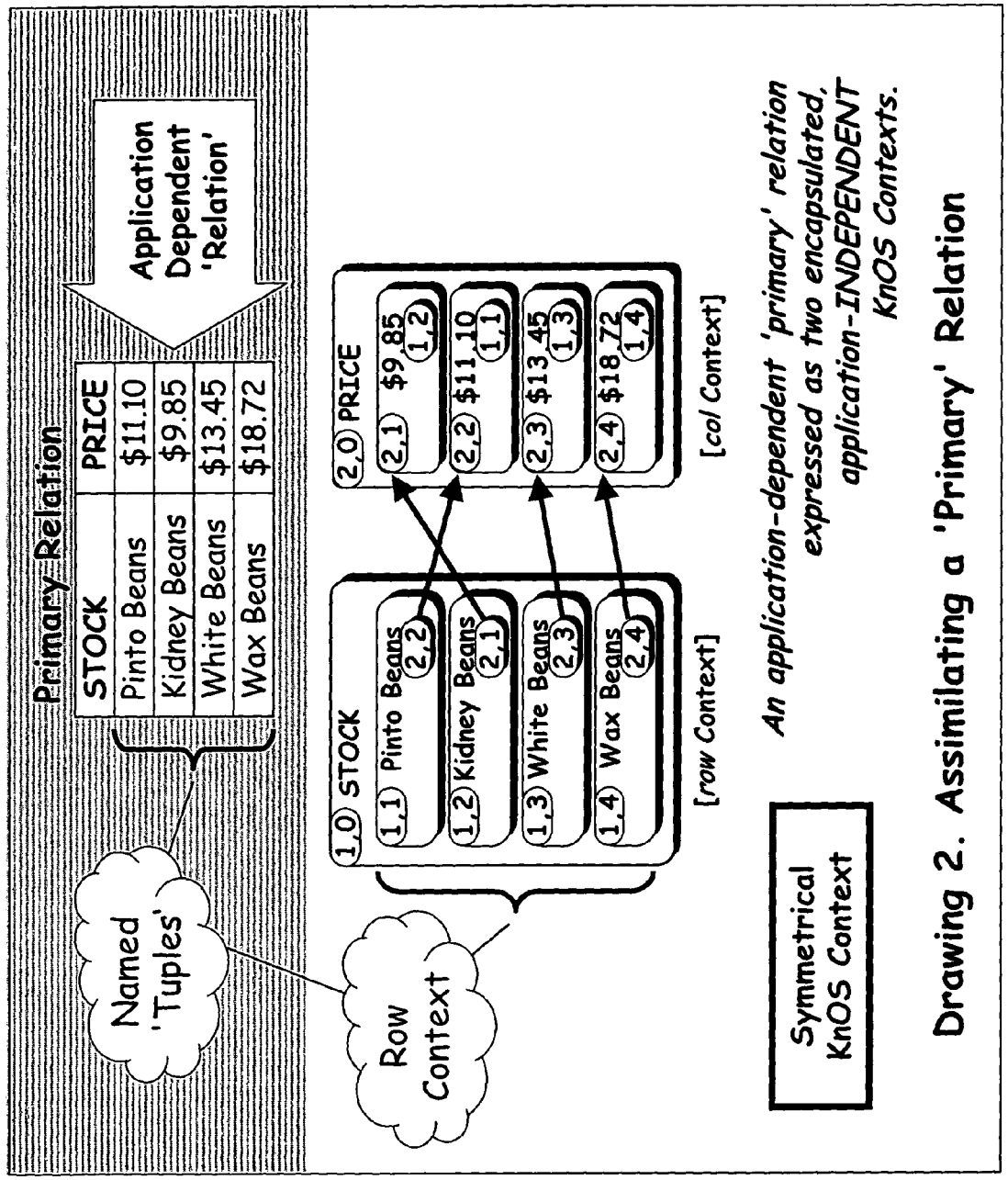
Drawing 2. Assimilating a 'Primary' Relation

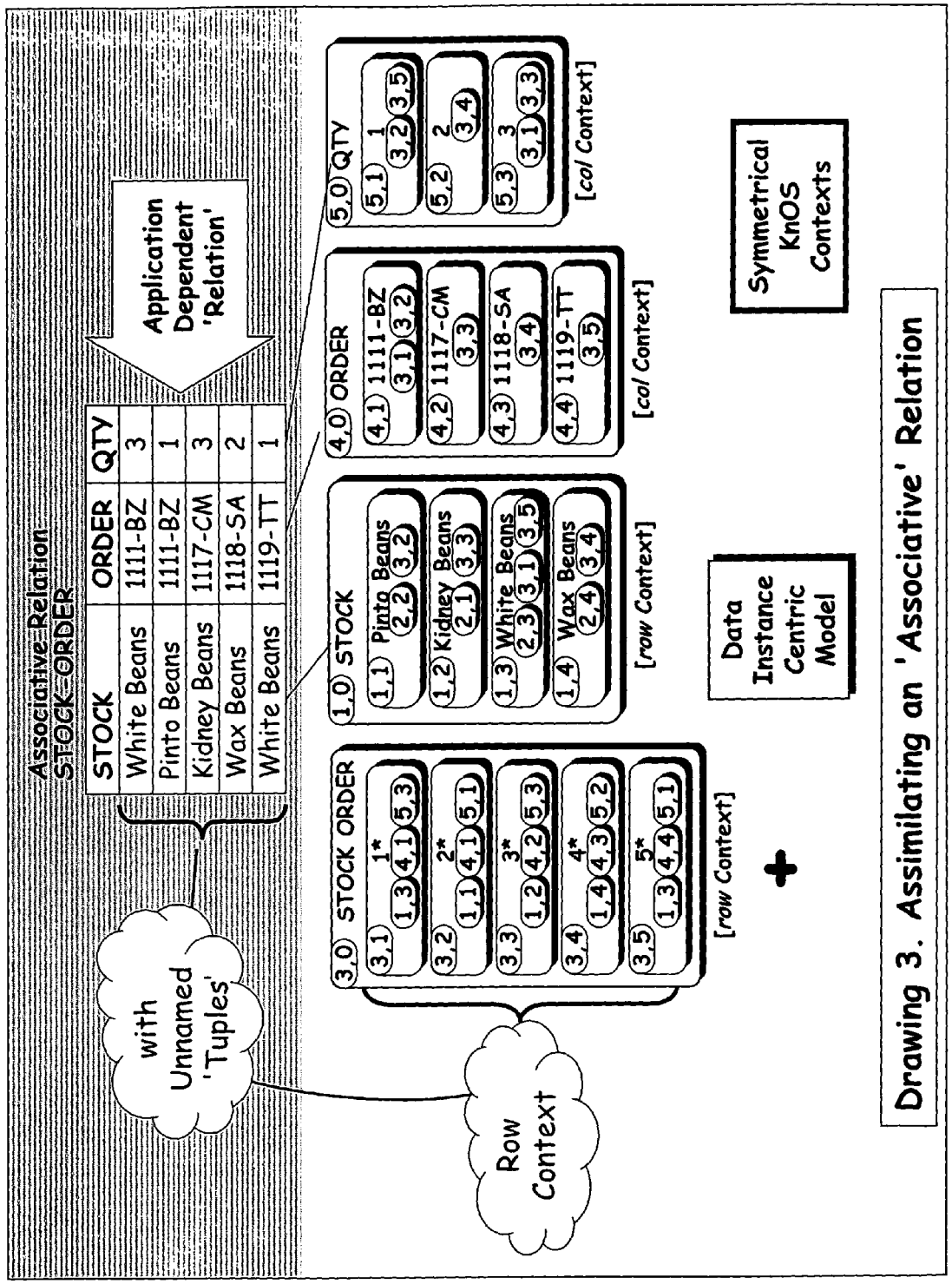
Drawing 3. Assimilating an 'Associative' Relation

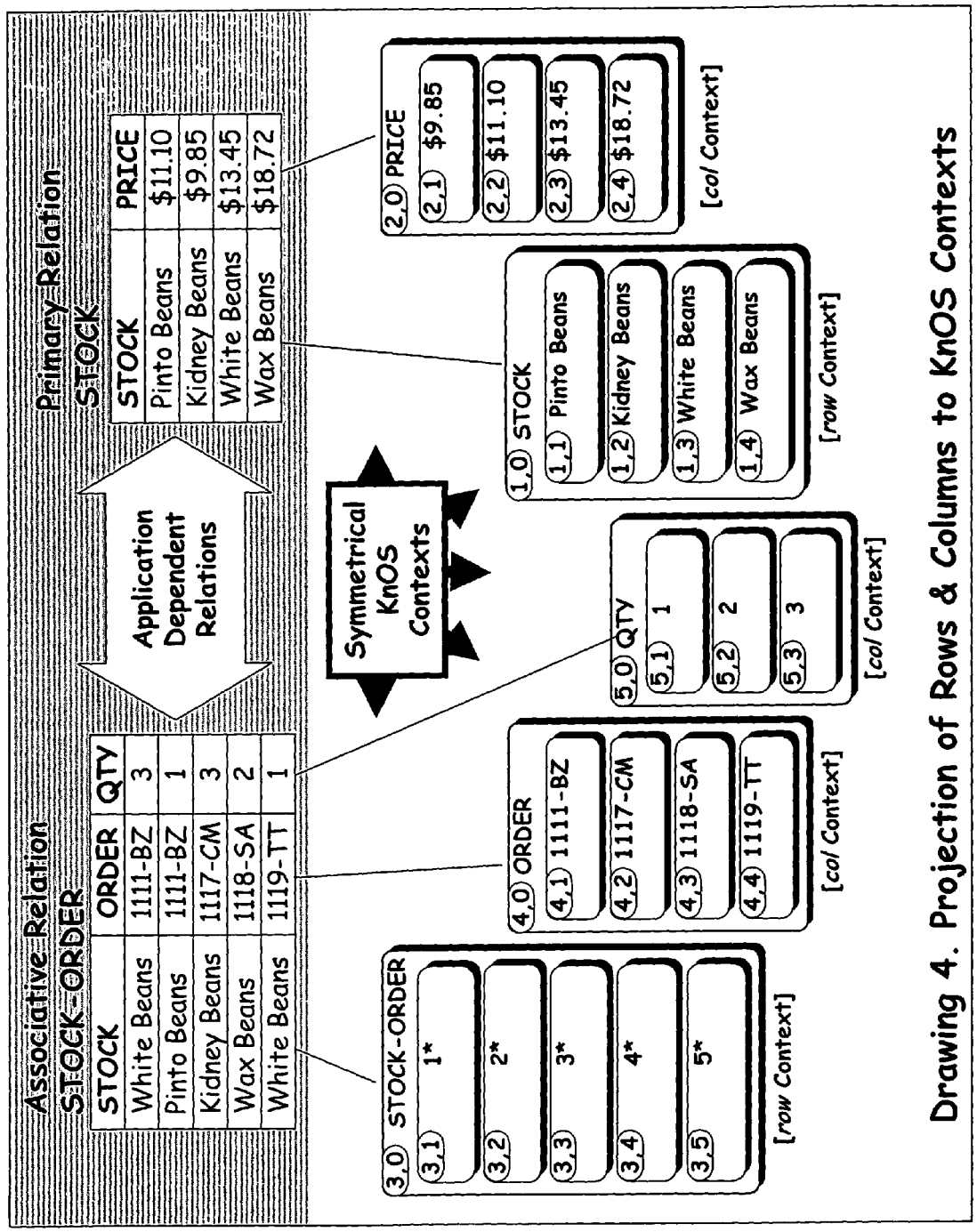
Drawing 4. Projection of Rows & Columns to KnOS Contexts

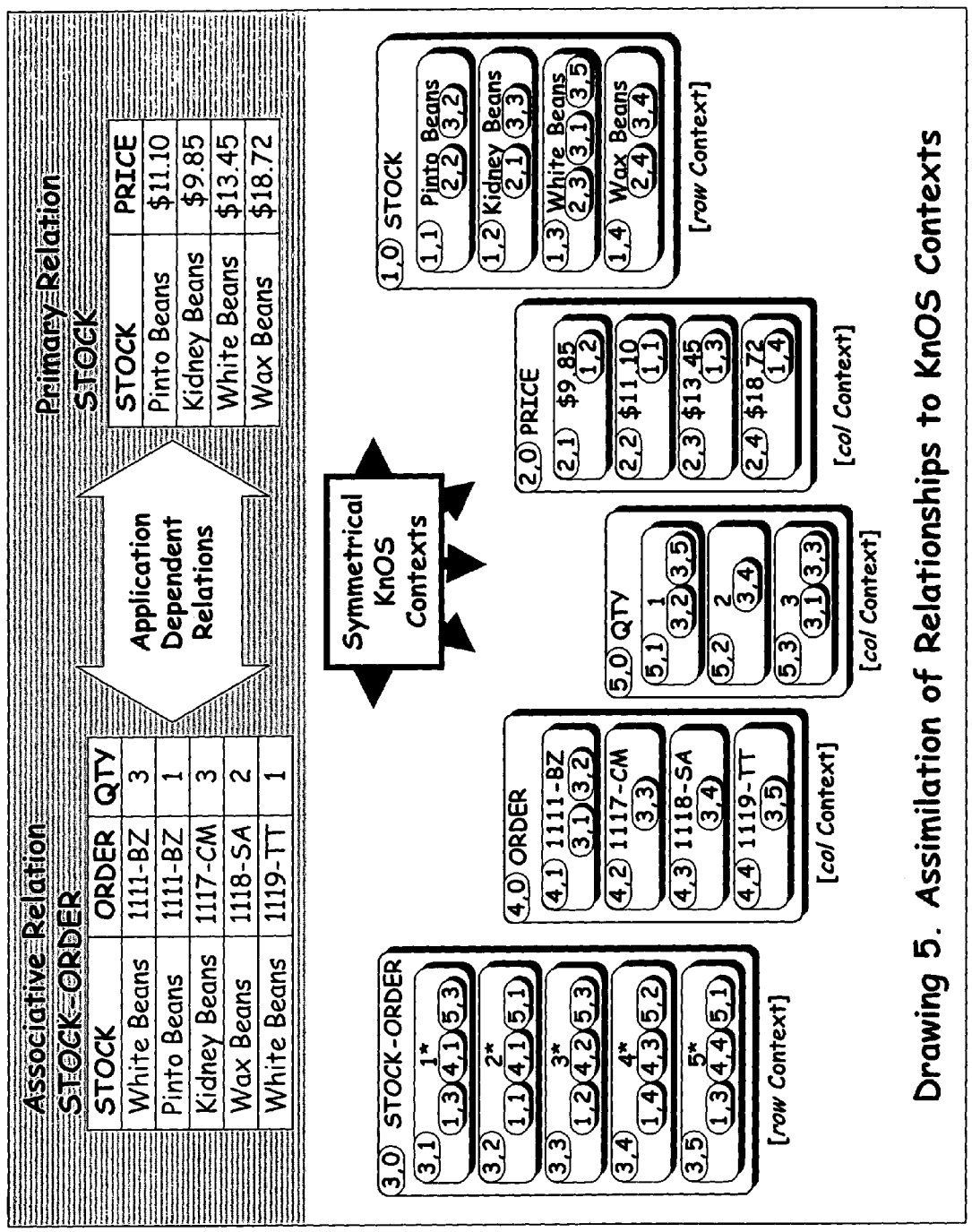
Drawing 5. Assimilation of Relationships to KnOS Contexts

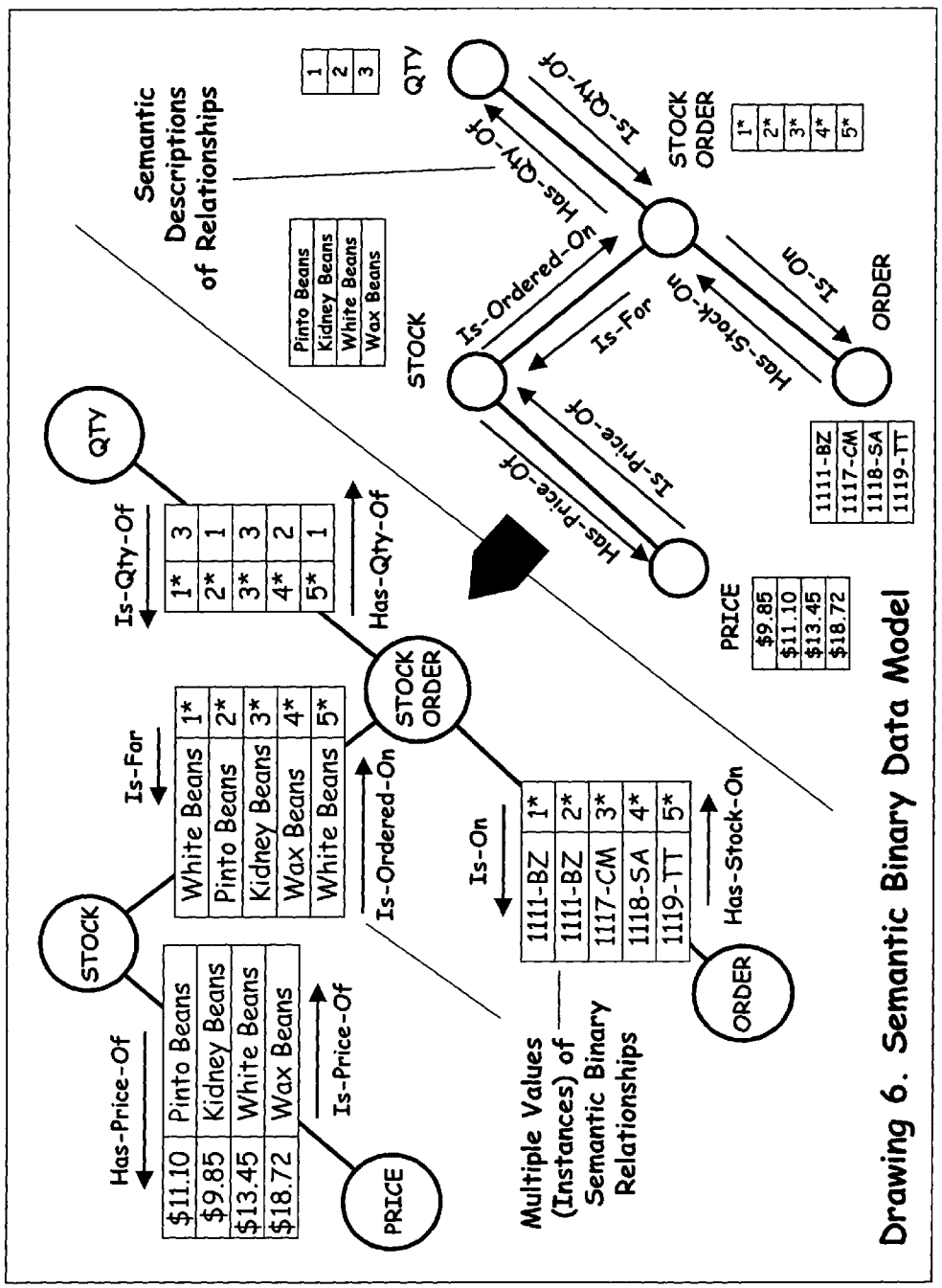
Drawing 6. Semantic Binary Data Model

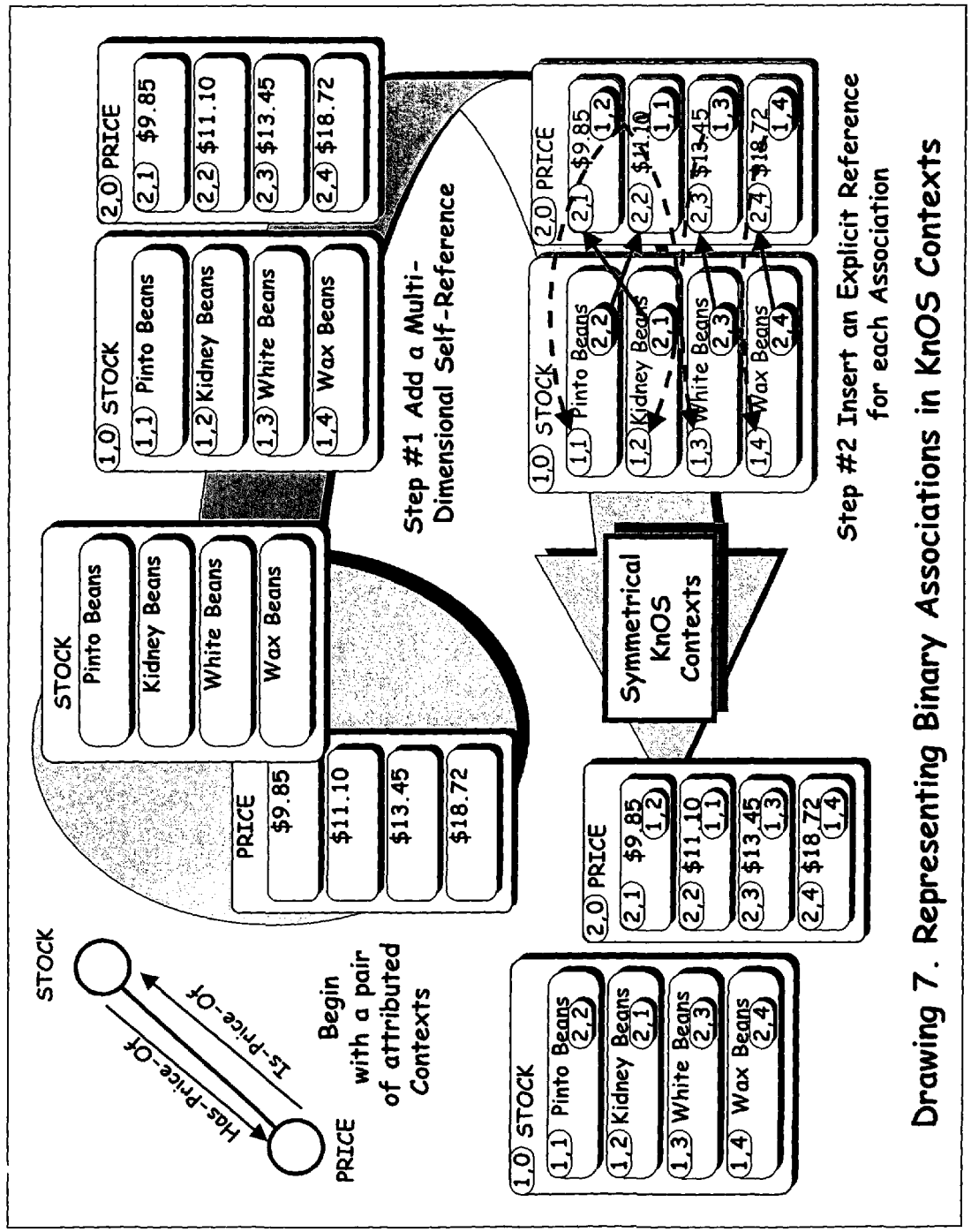
Drawing 7. Representing Binary Associations in KnOS Contexts

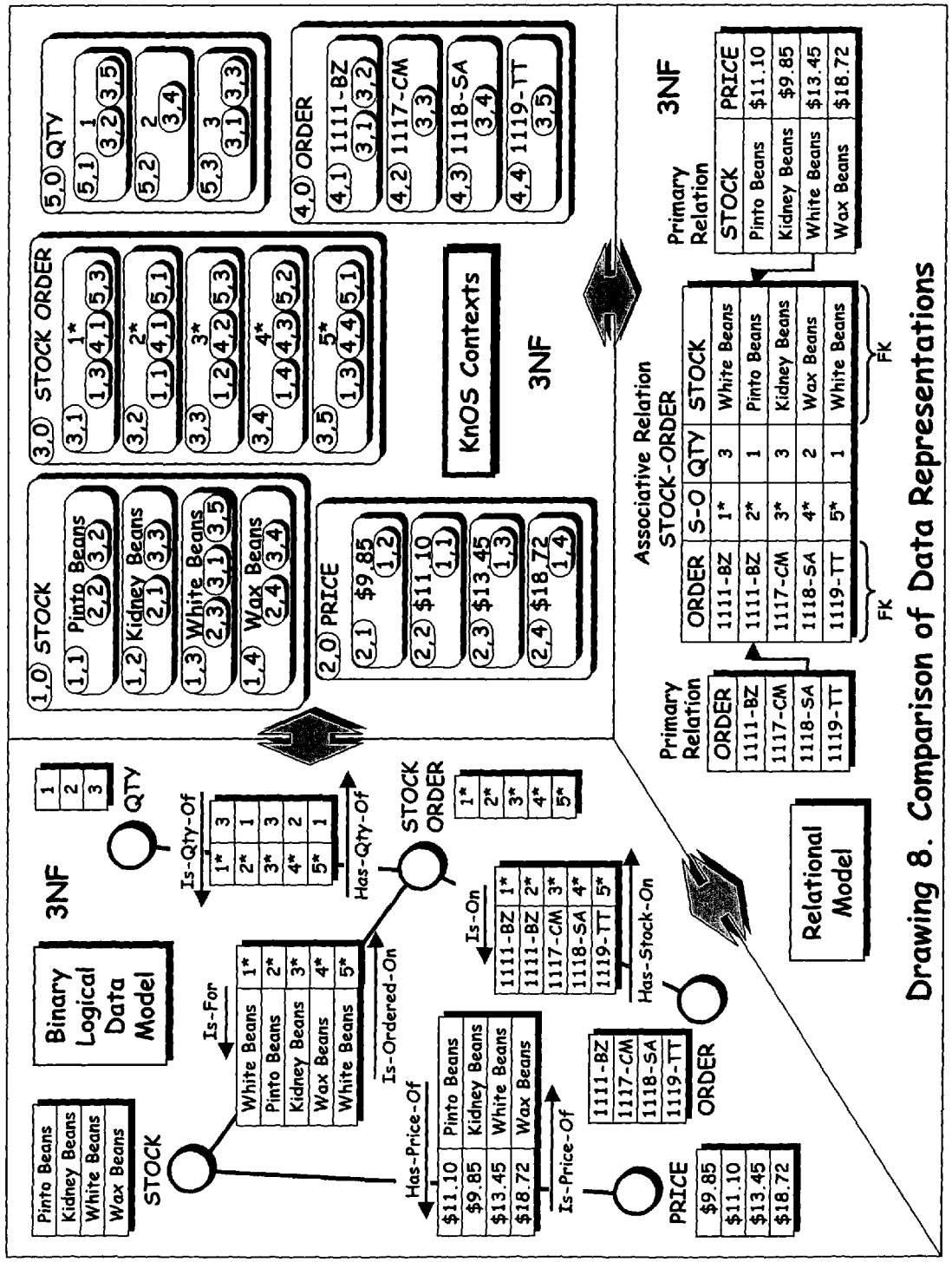
Drawing 8. Comparison of Data Representations

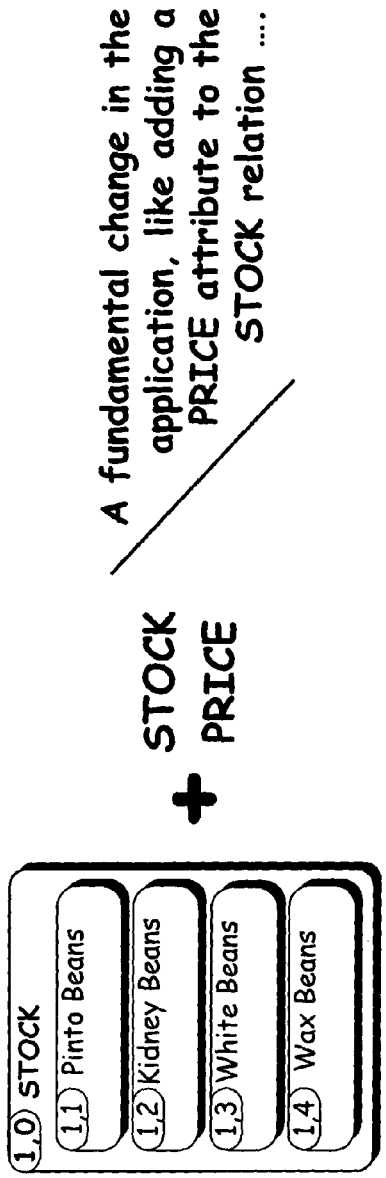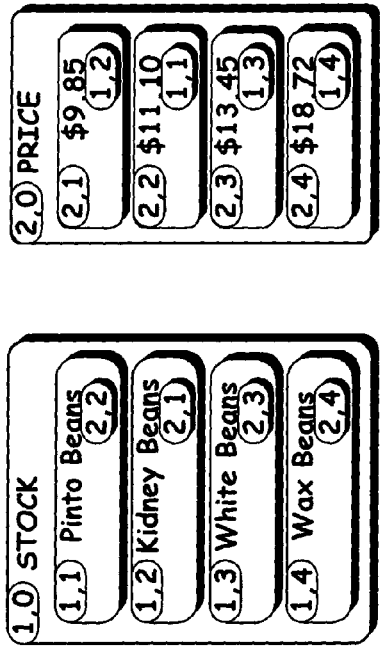
Drawing 9. Application Independence

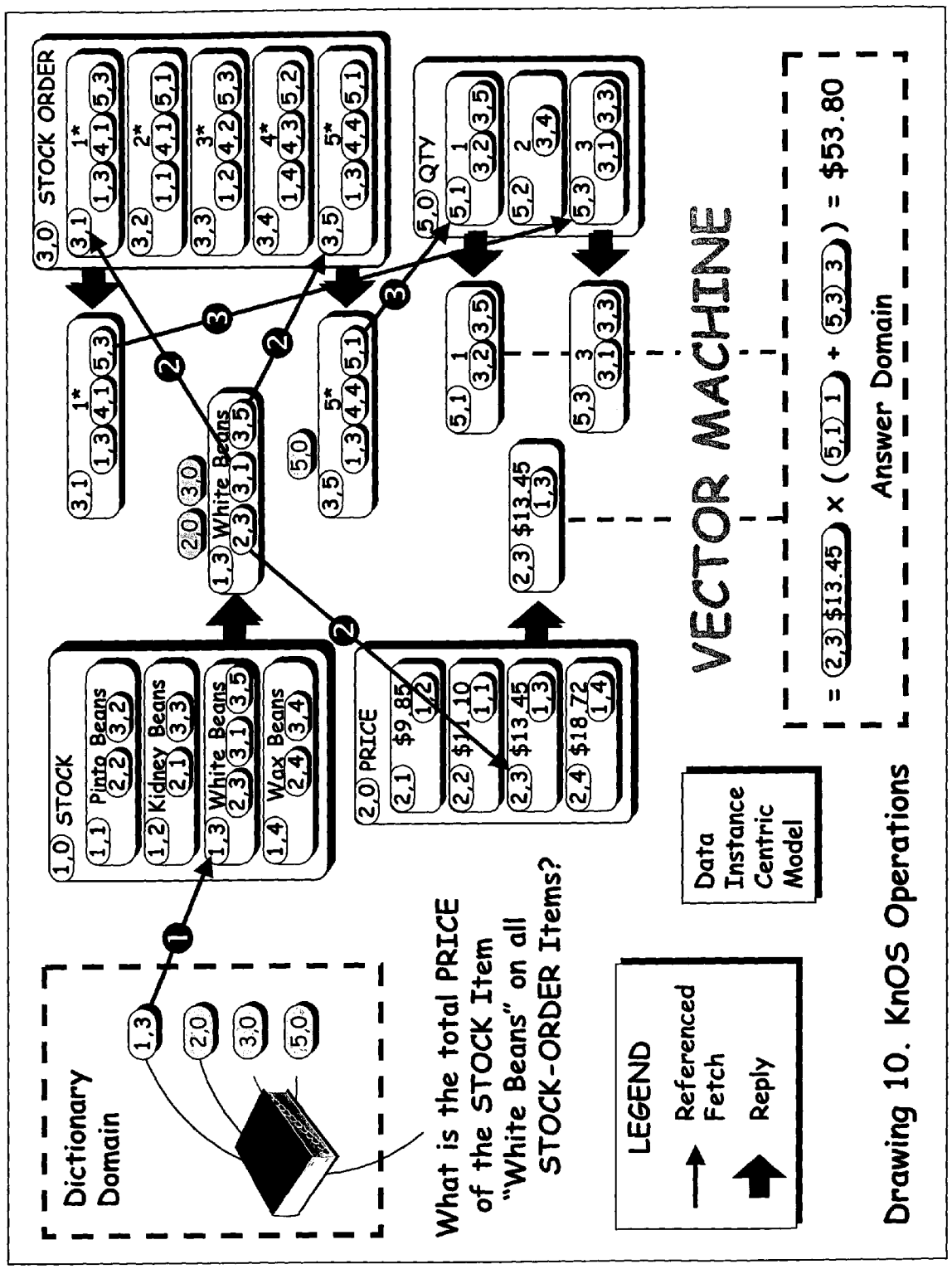
Drawing 10. KnOS Operations

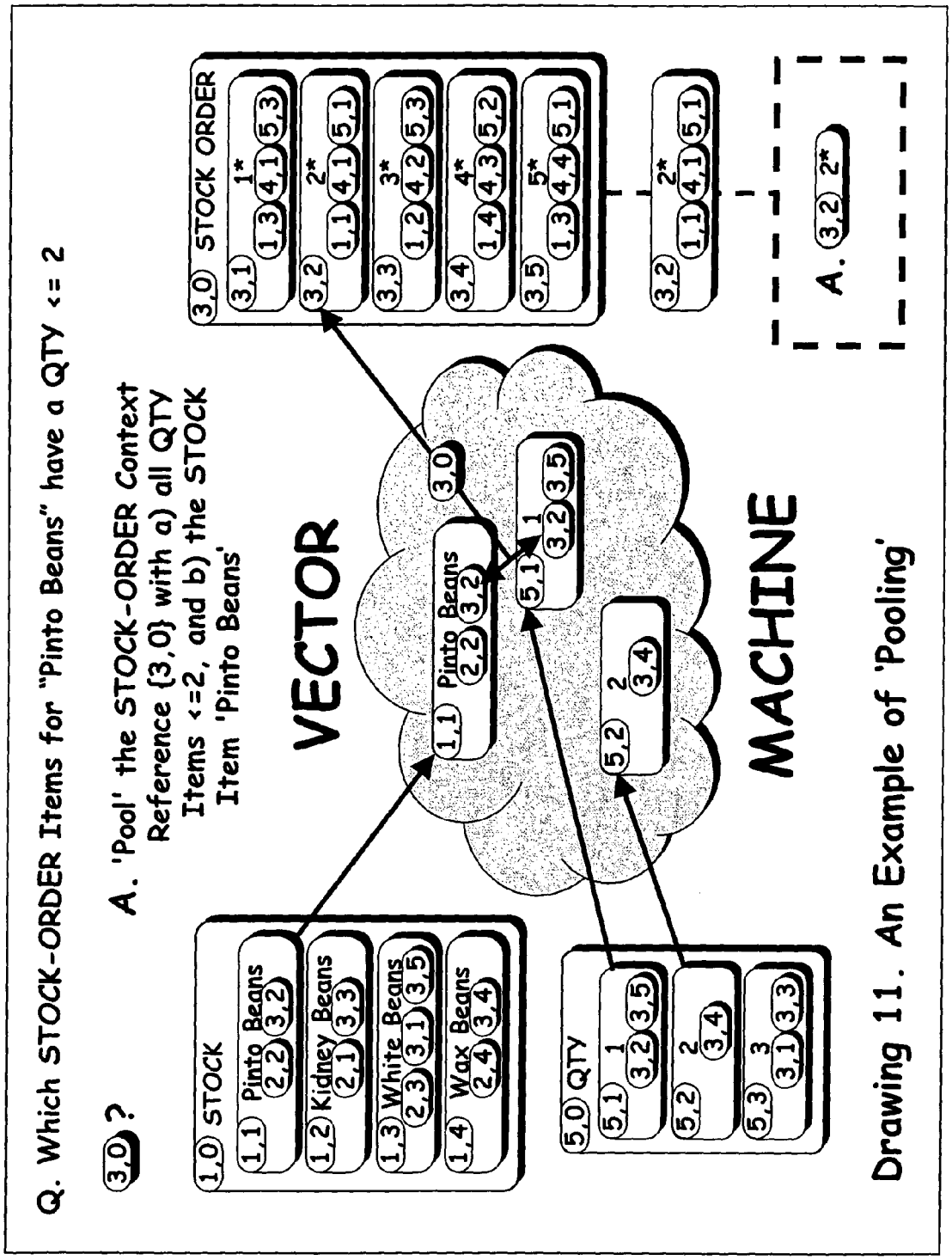
Drawing 11. An Example of 'Pooling'

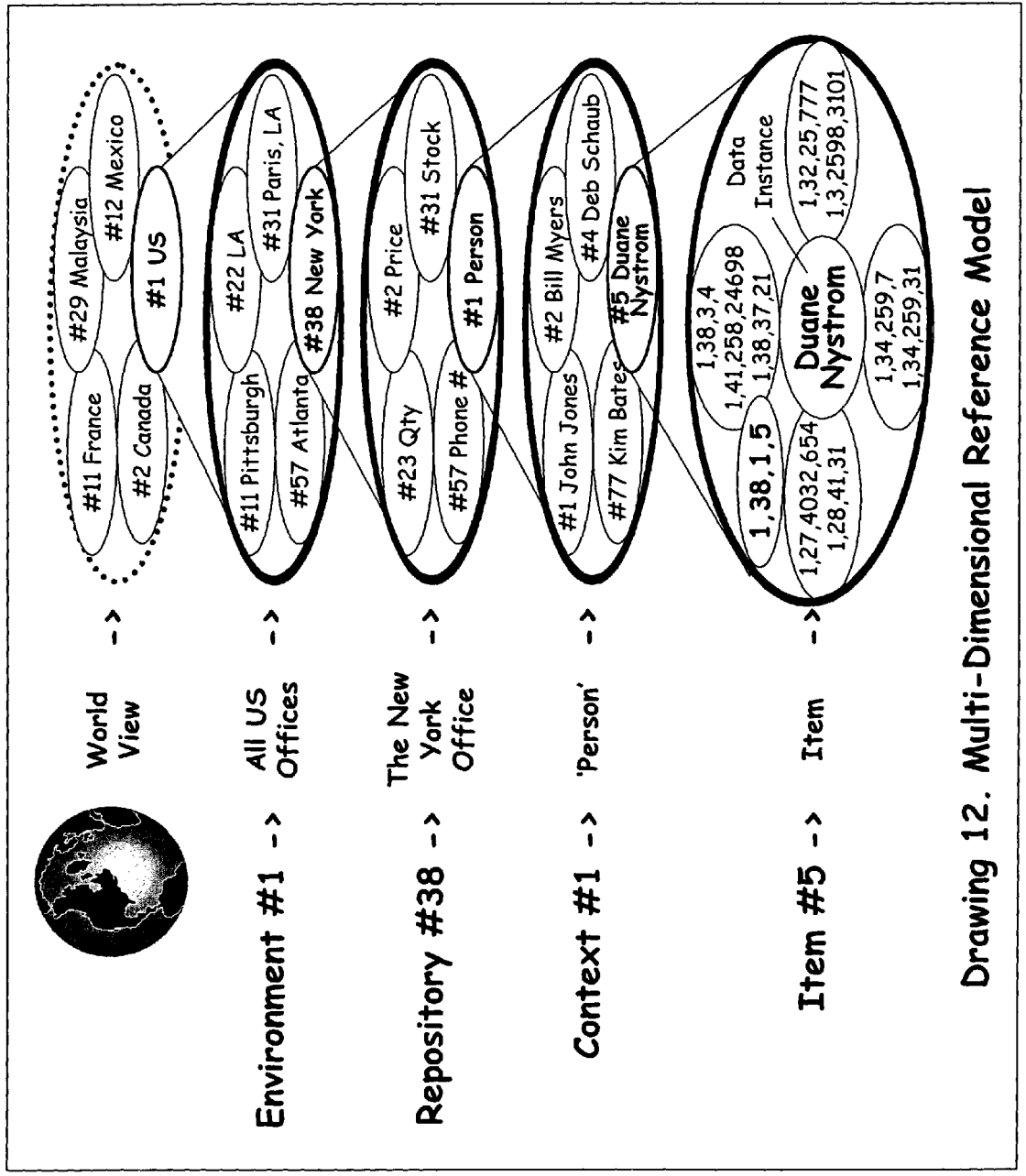
Drawing 12. Multi-Dimensional Reference Model

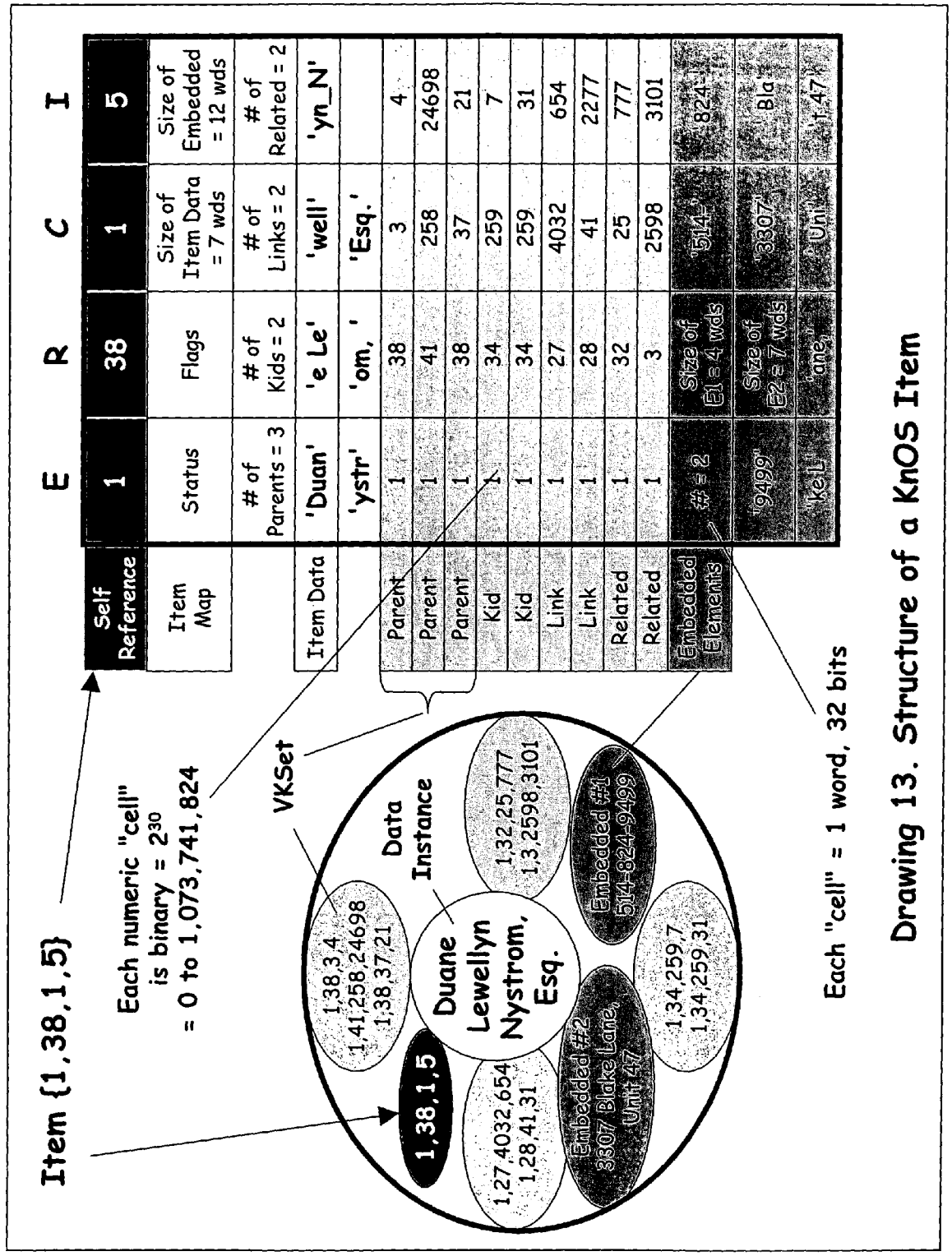
Drawing 13. Structure of a KnOS Item

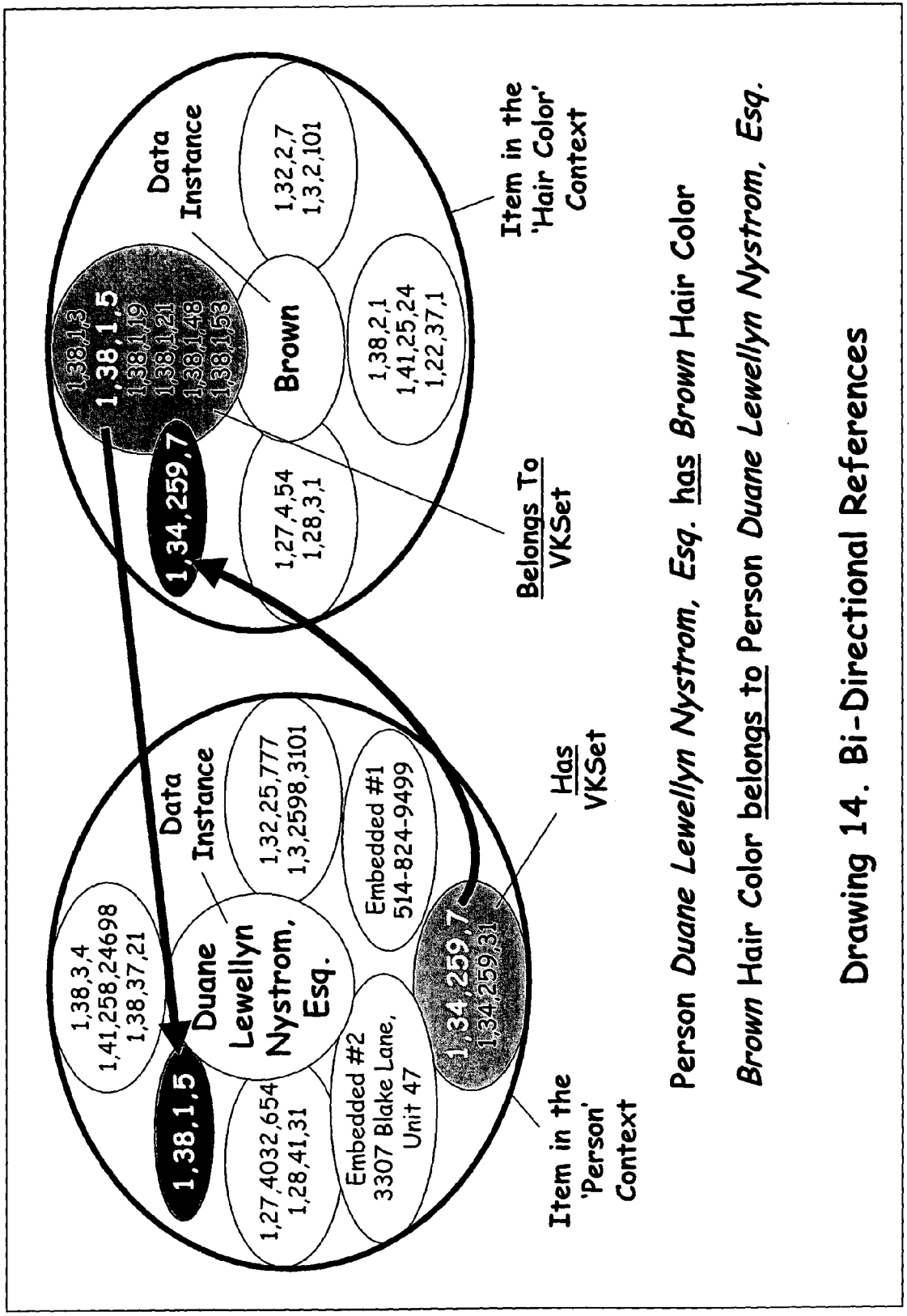

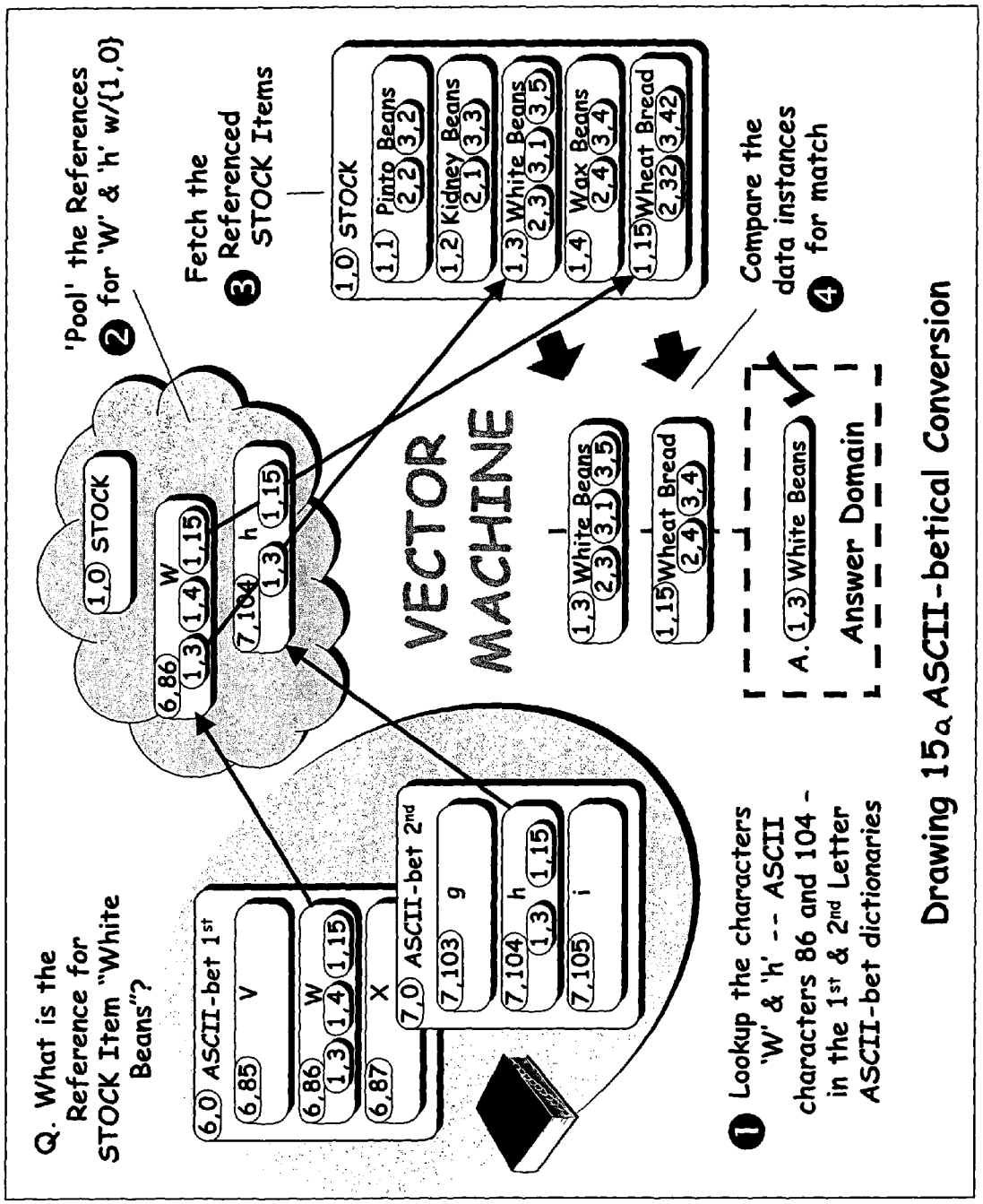

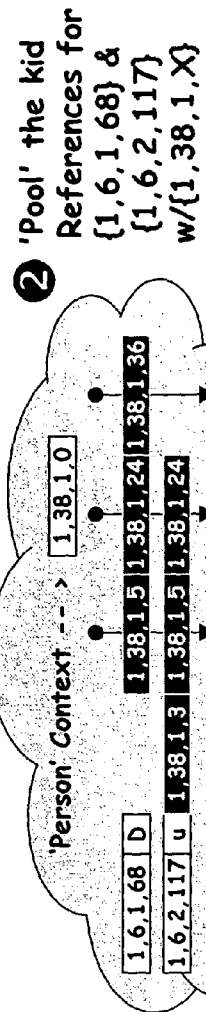
Drawing 15b ASCII-betical Conversion

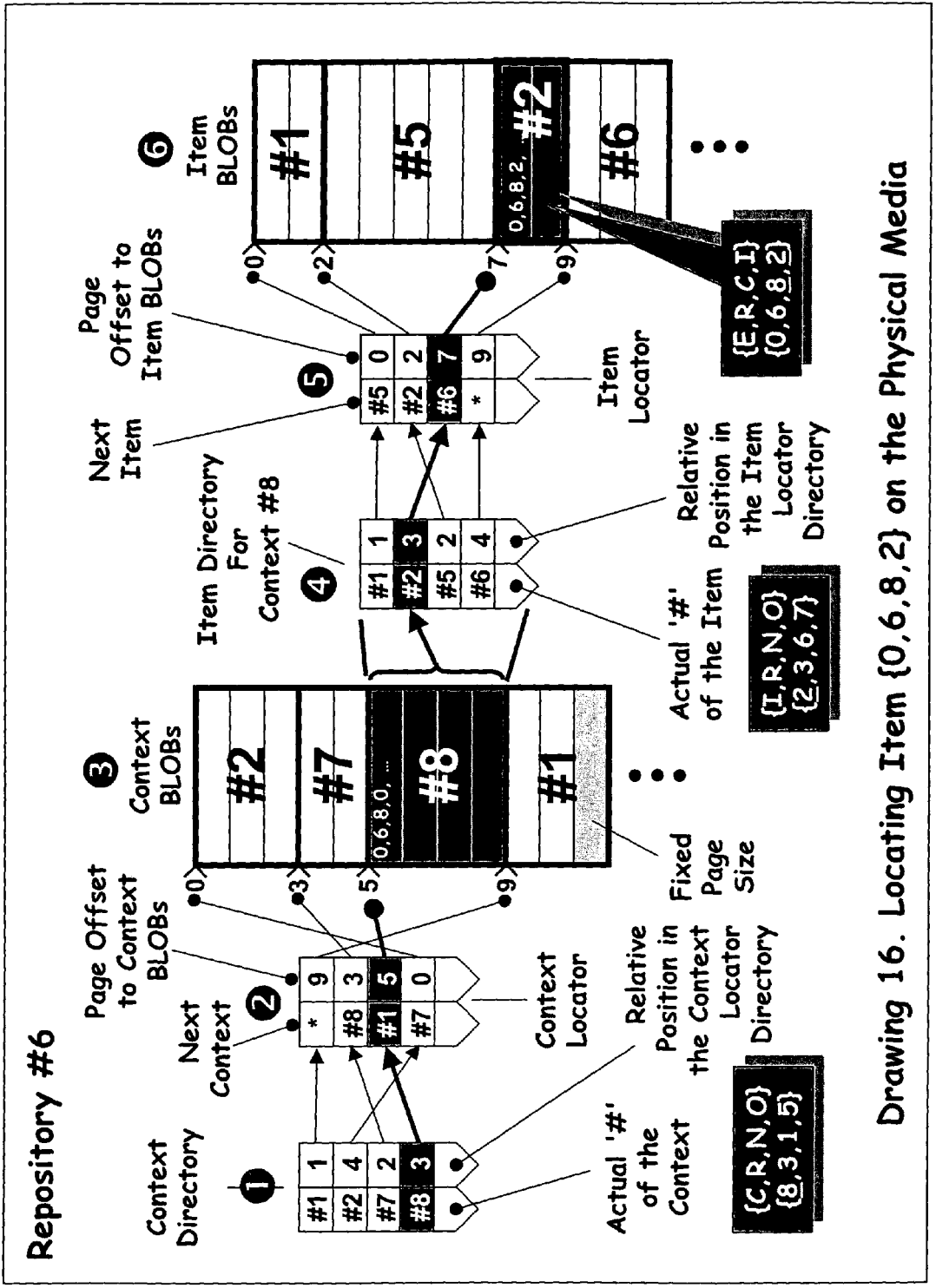
Drawing 16. Locating Item {0,6,8,2} on the Physical Media

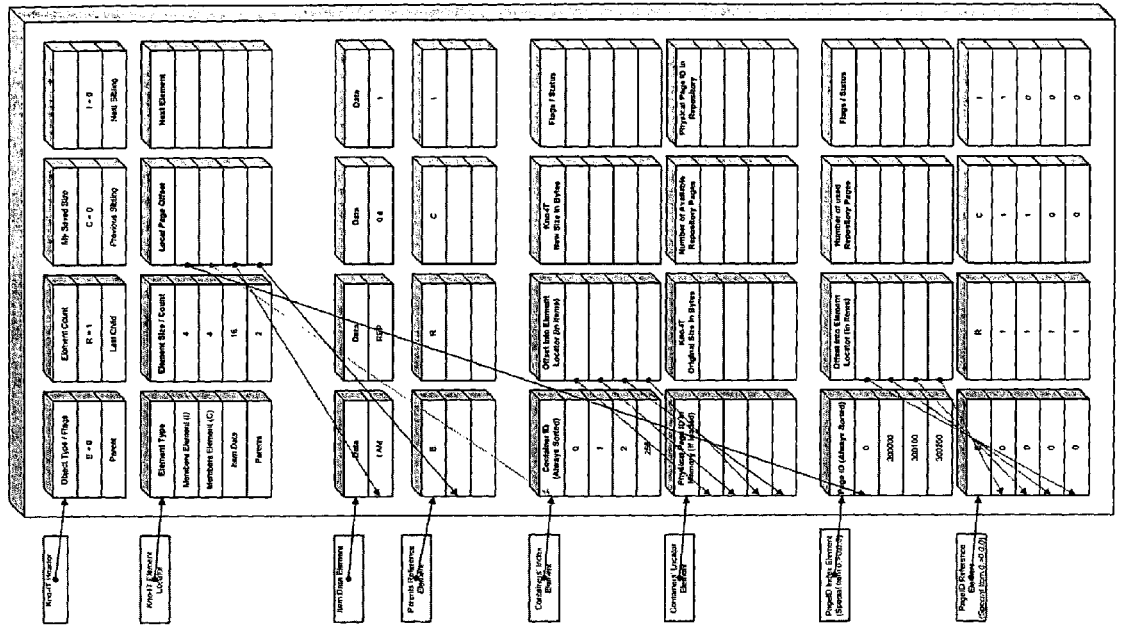
Drawing 17. Repository Structure

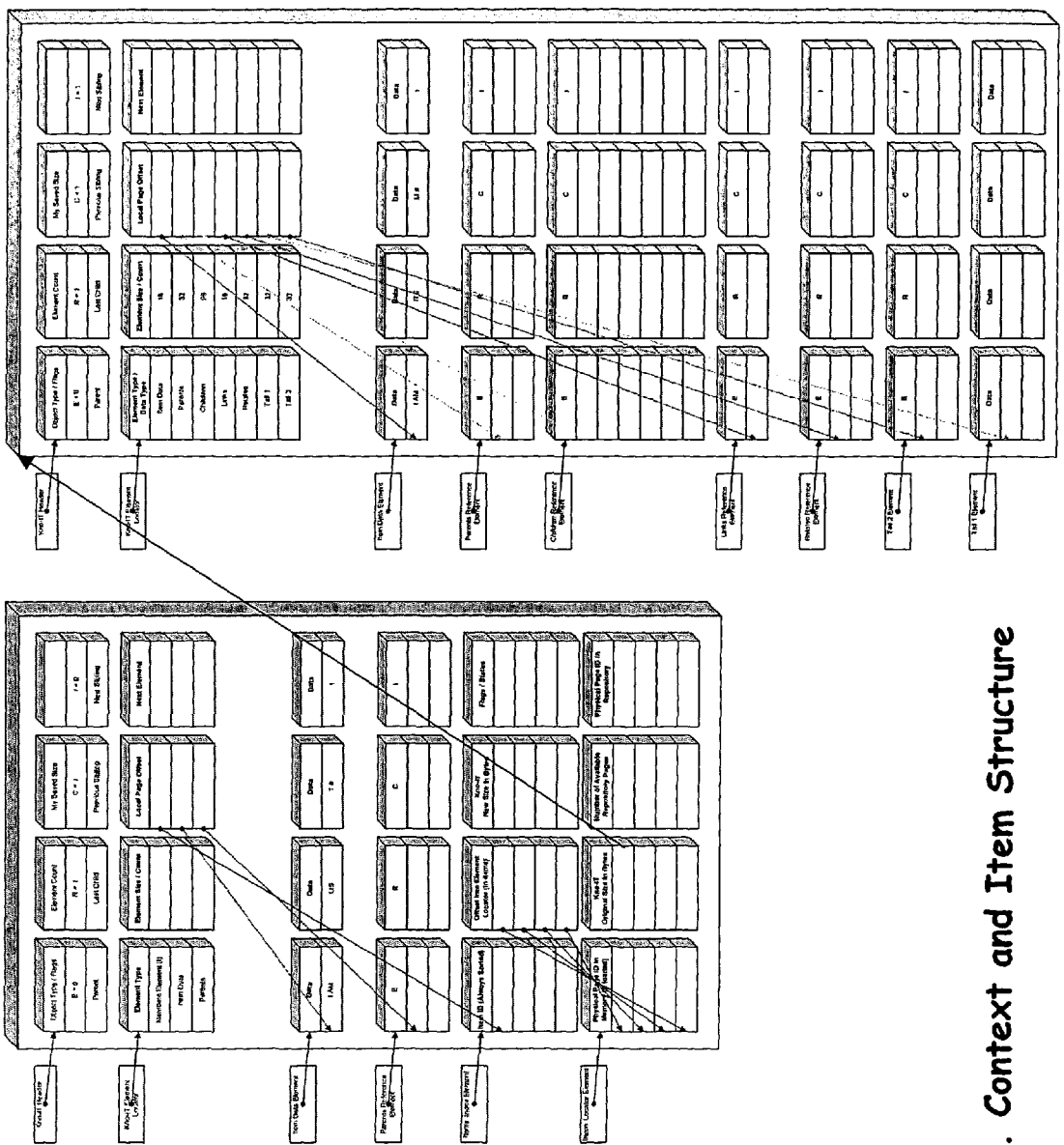
Drawing 18. Context and Item Structure

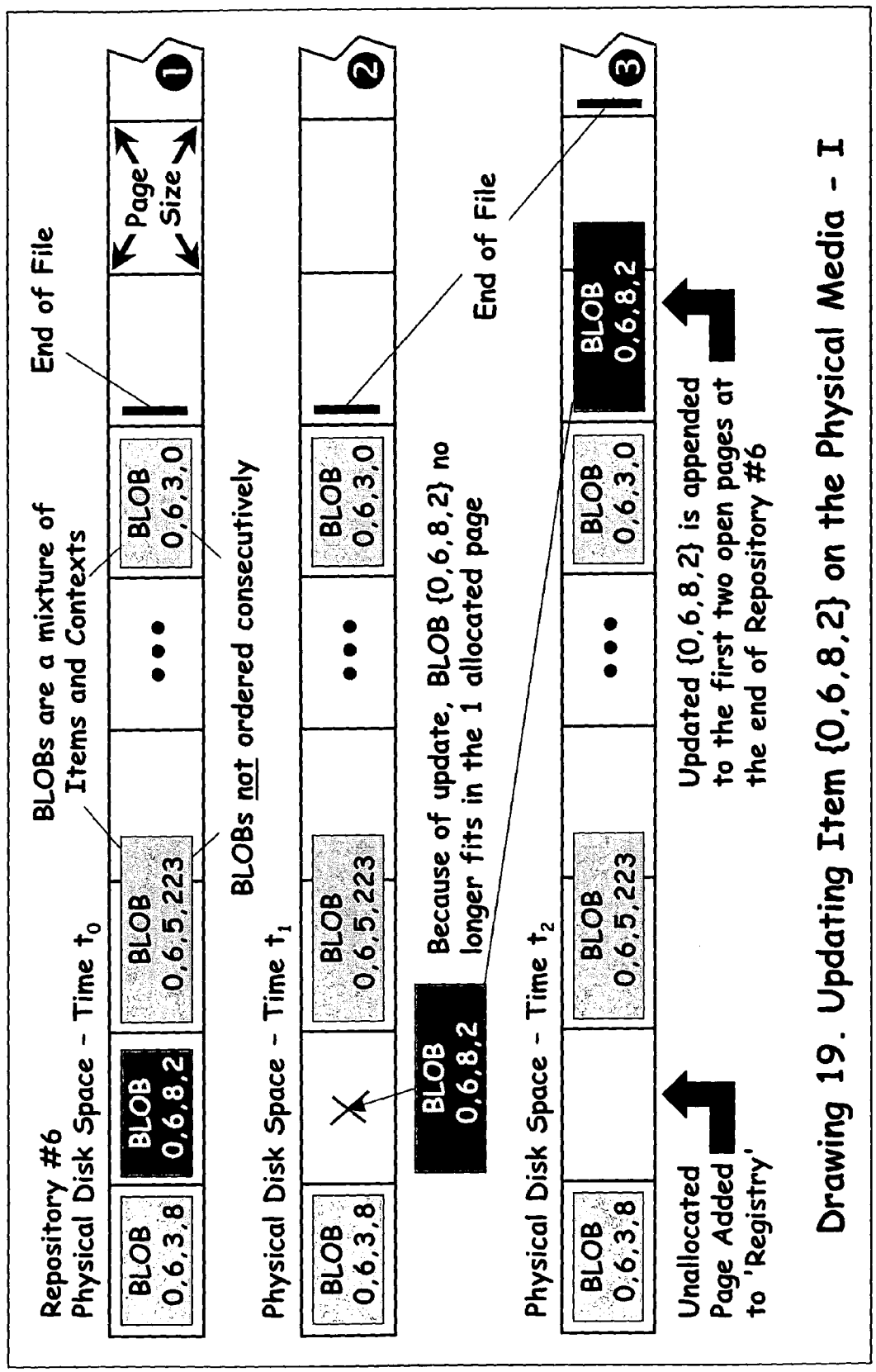
Drawing 19. Updating Item {0,6,8,2} on the Physical Media - I

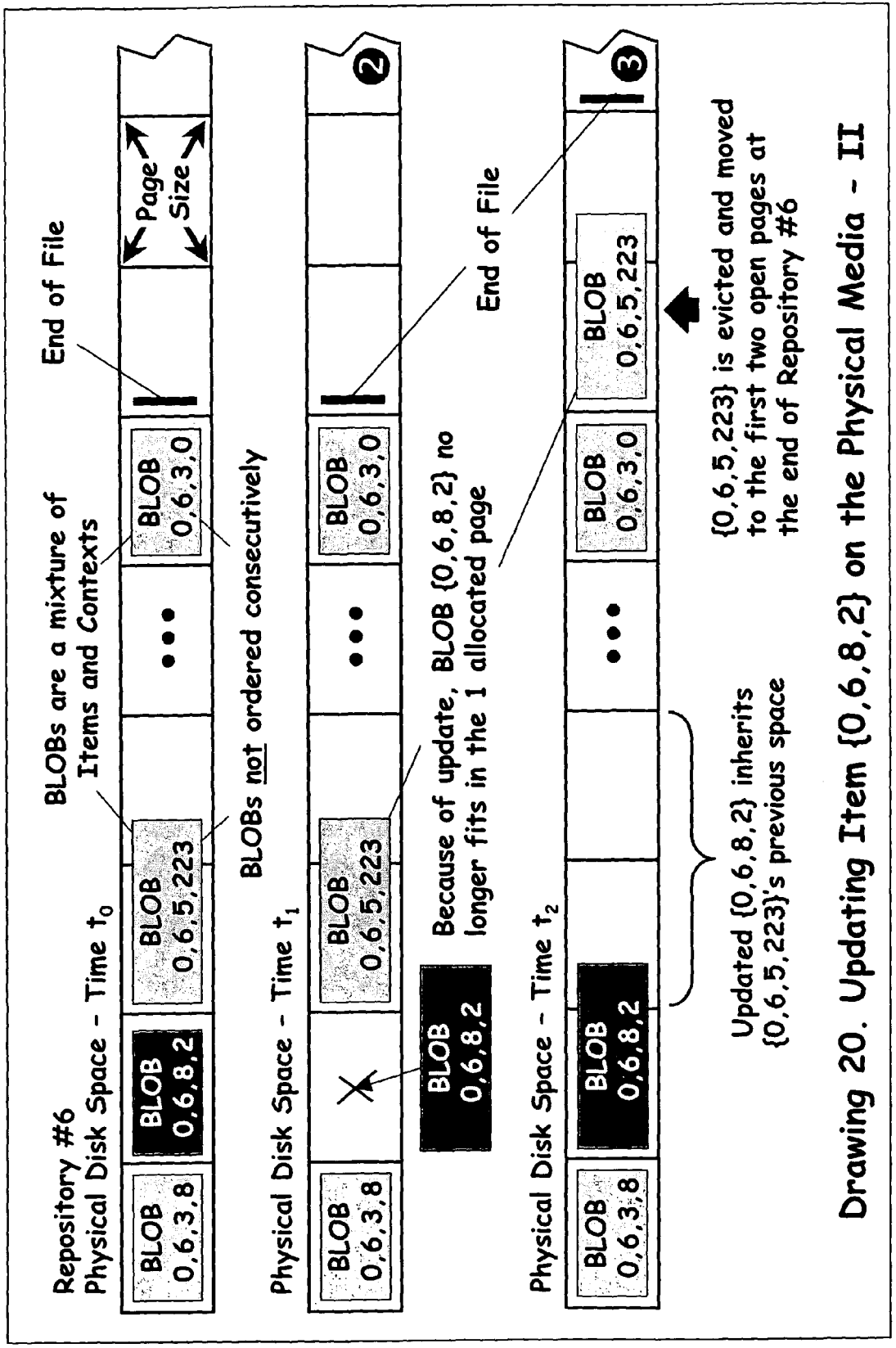
Drawing 20. Updating Item {0,6,8,2} on the Physical Media – II

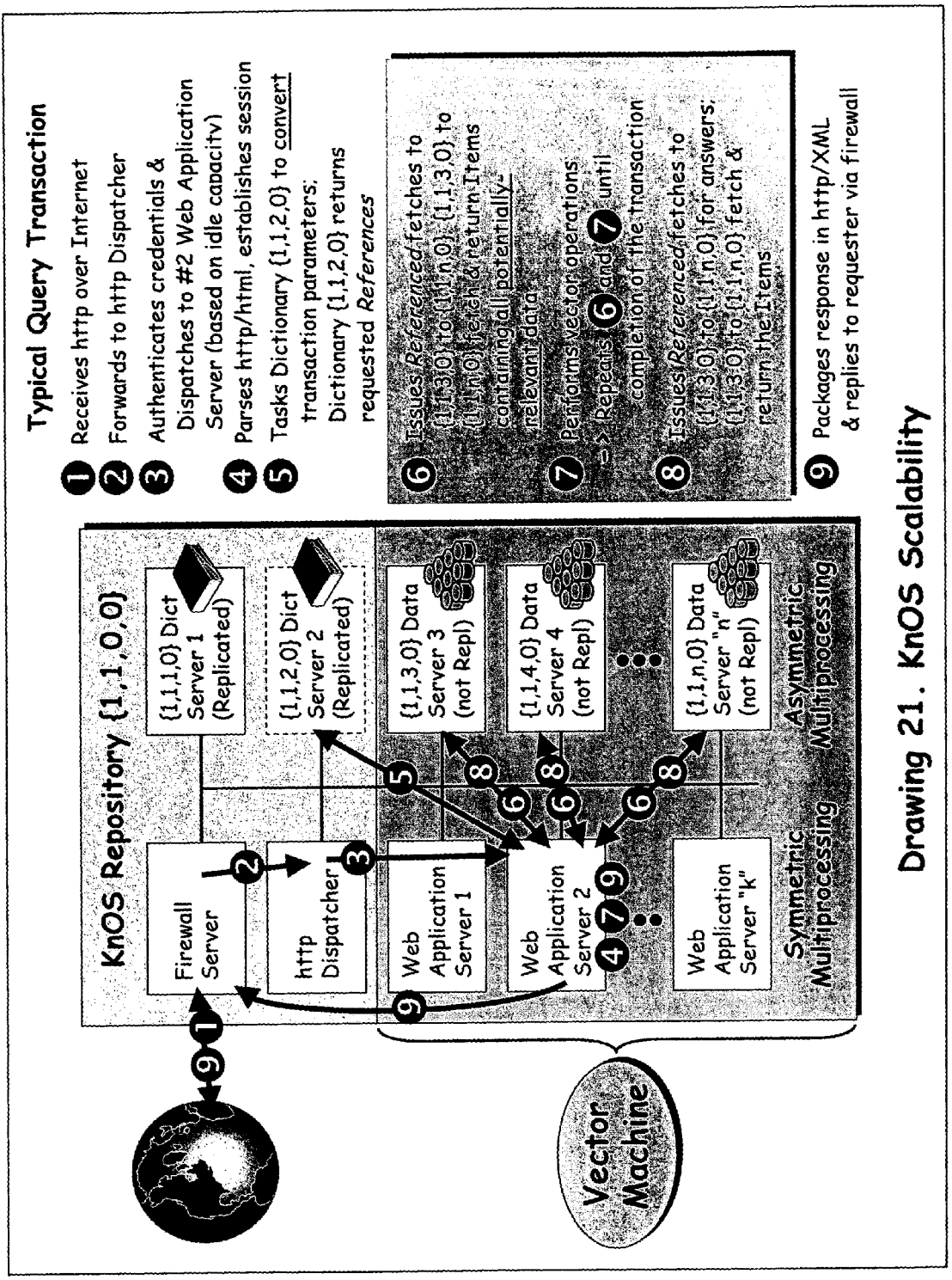
Drawing 21. KnOS Scalability

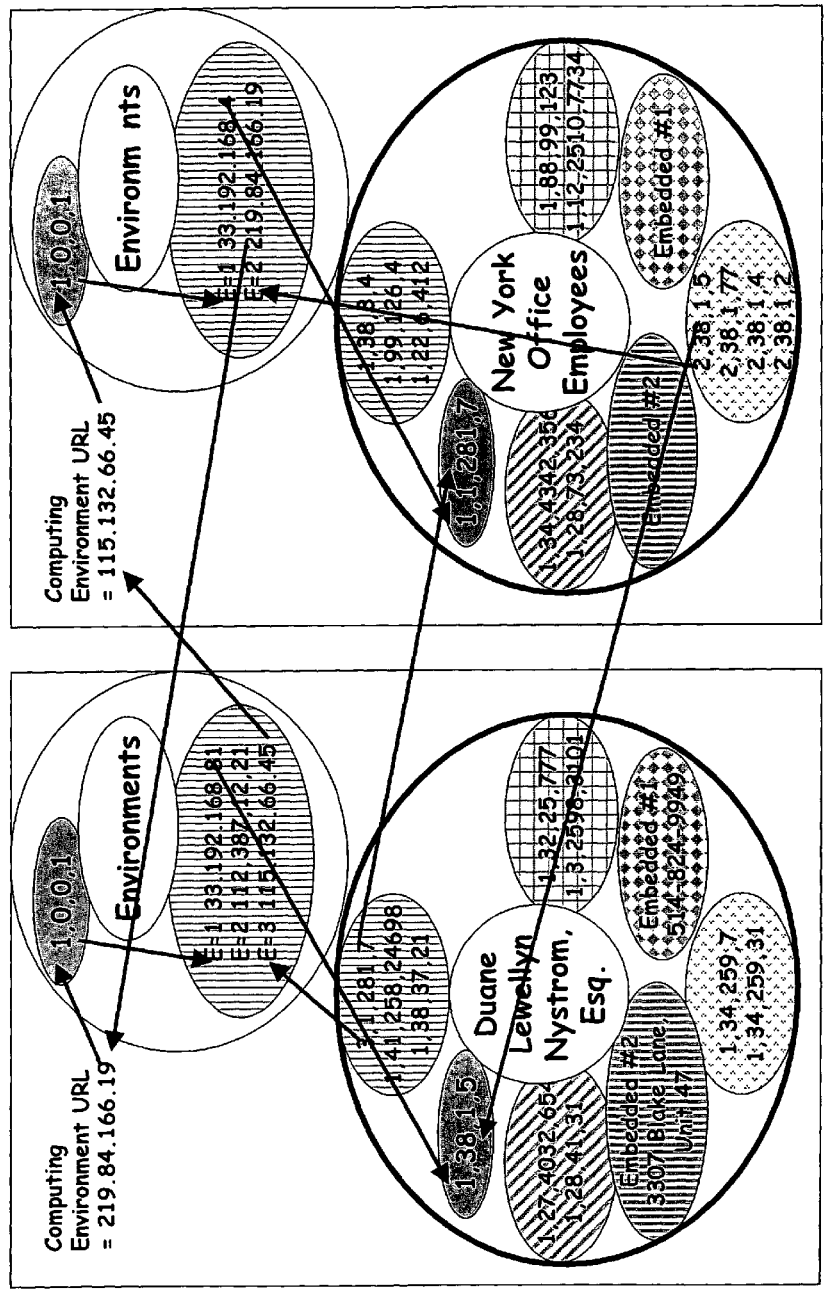
Drawing 22. Inter-Referencing between Computing Environments

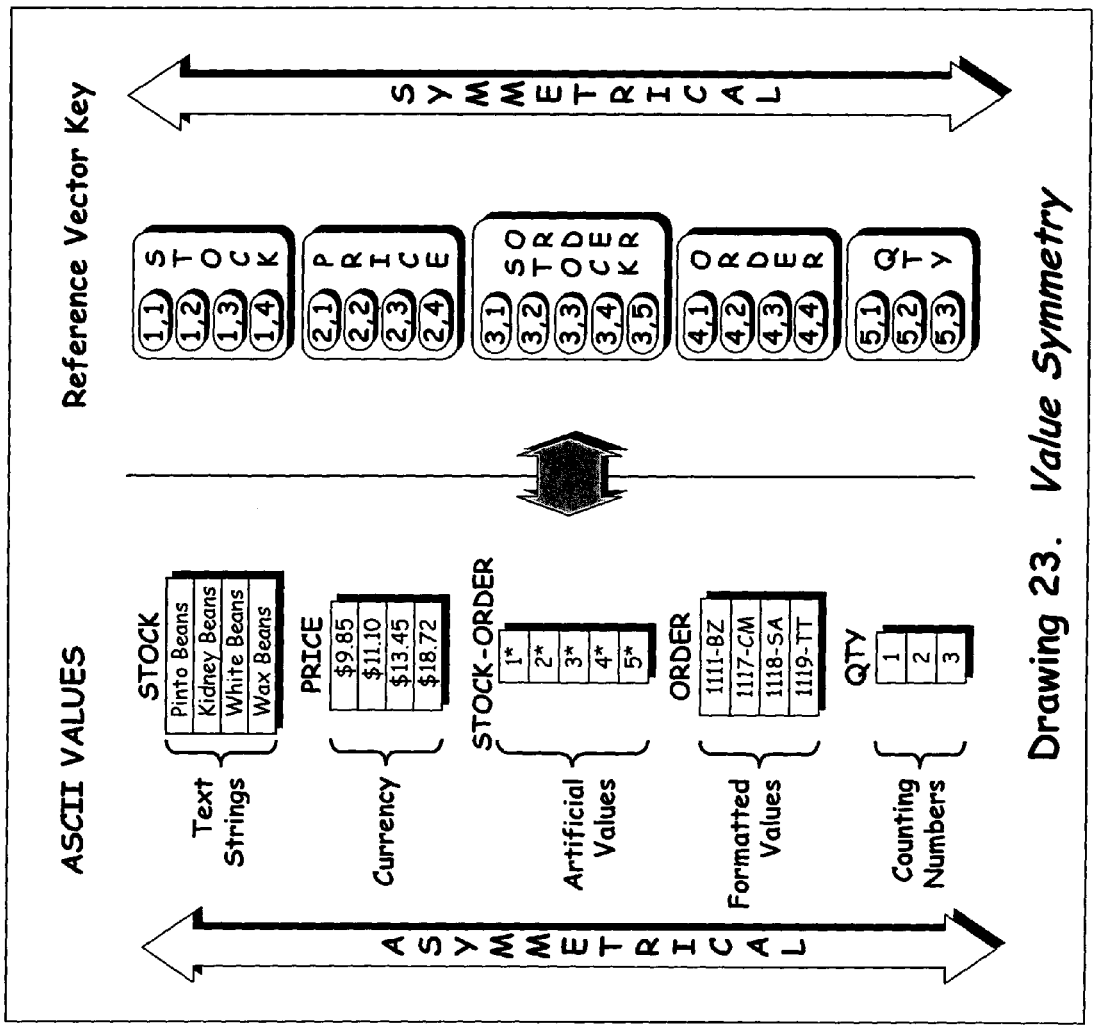
Drawing 23. Value Symmetry

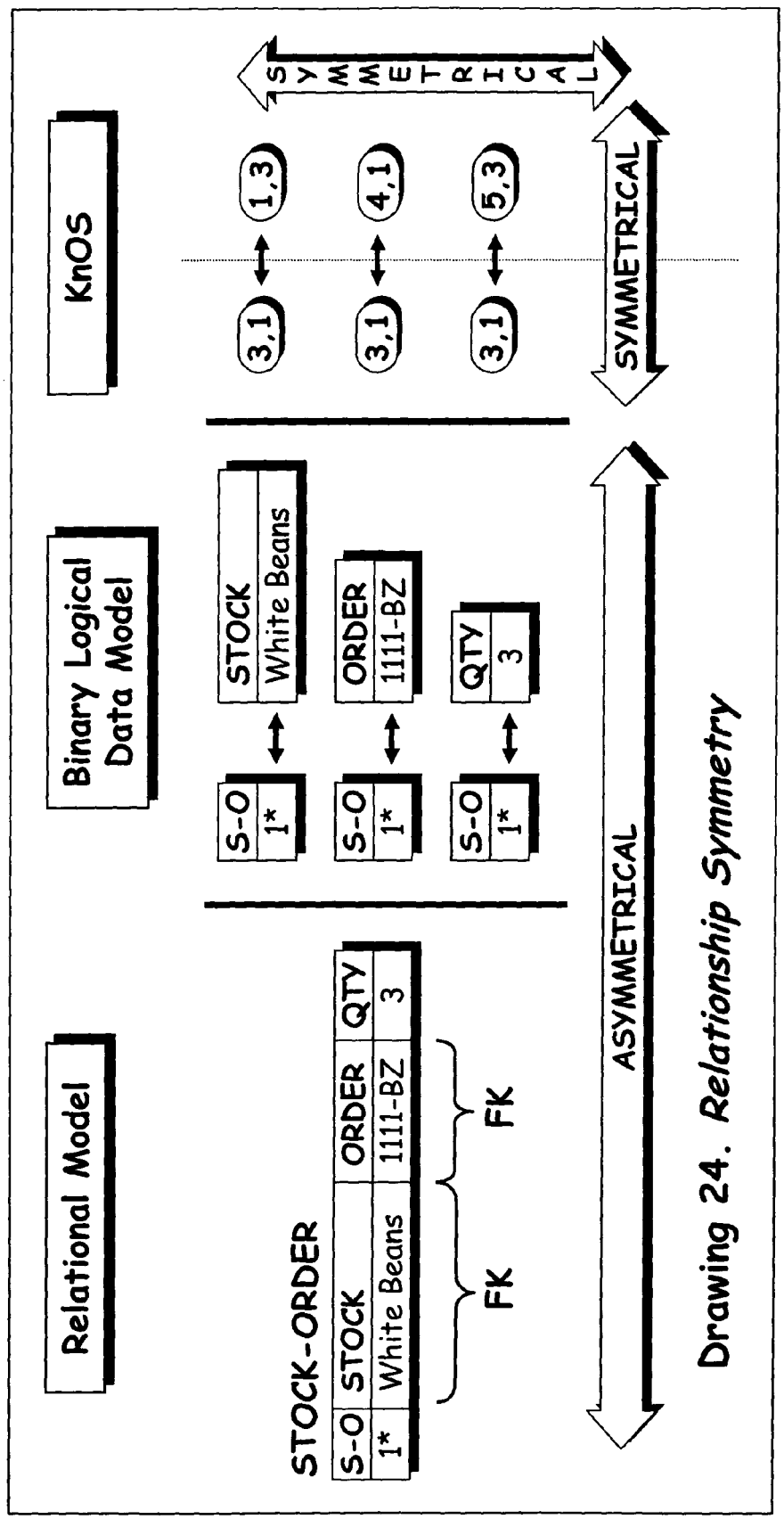
Drawing 24. Relationship Symmetry

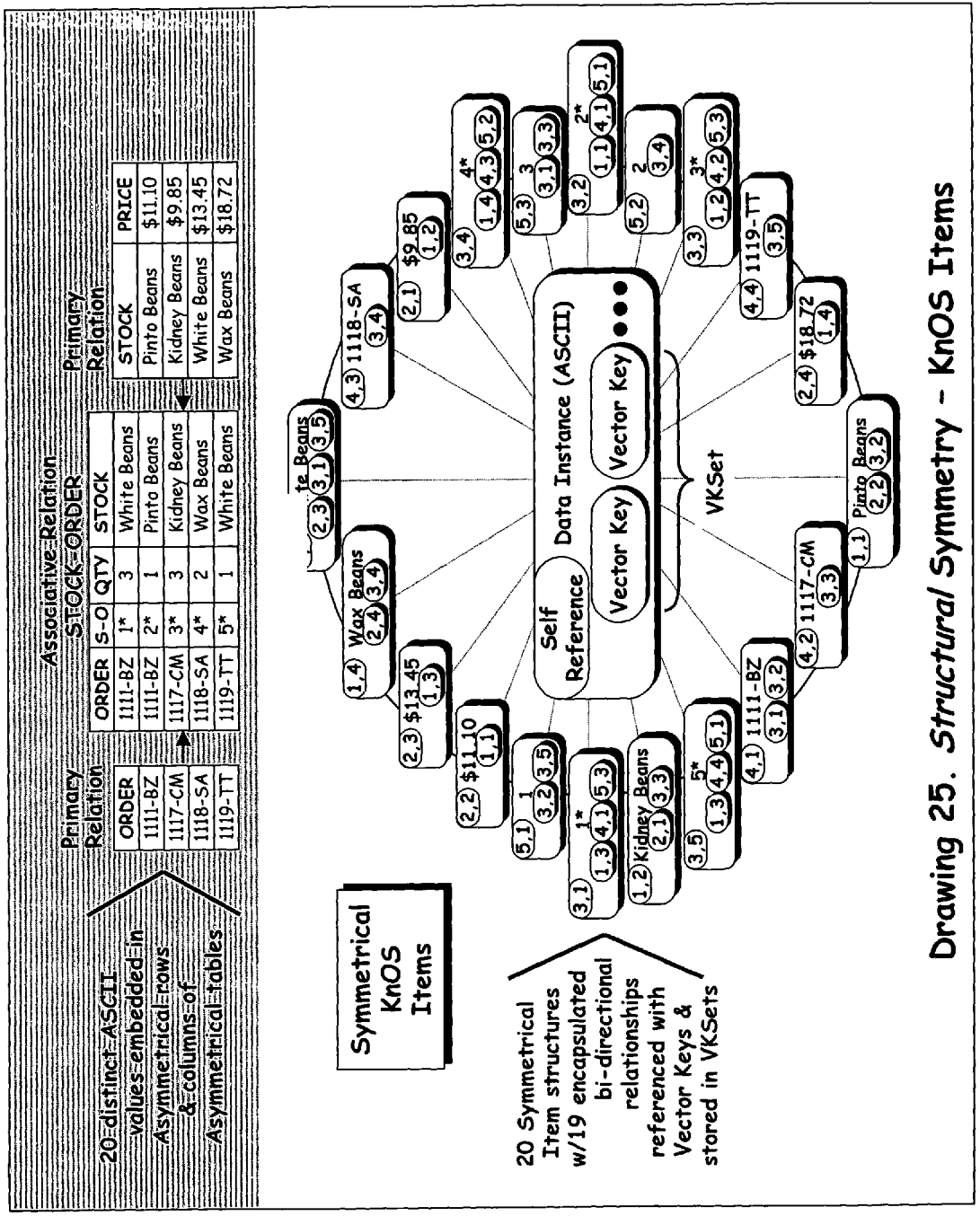
Drawing 25. *Structural Symmetry – KnOS Items*

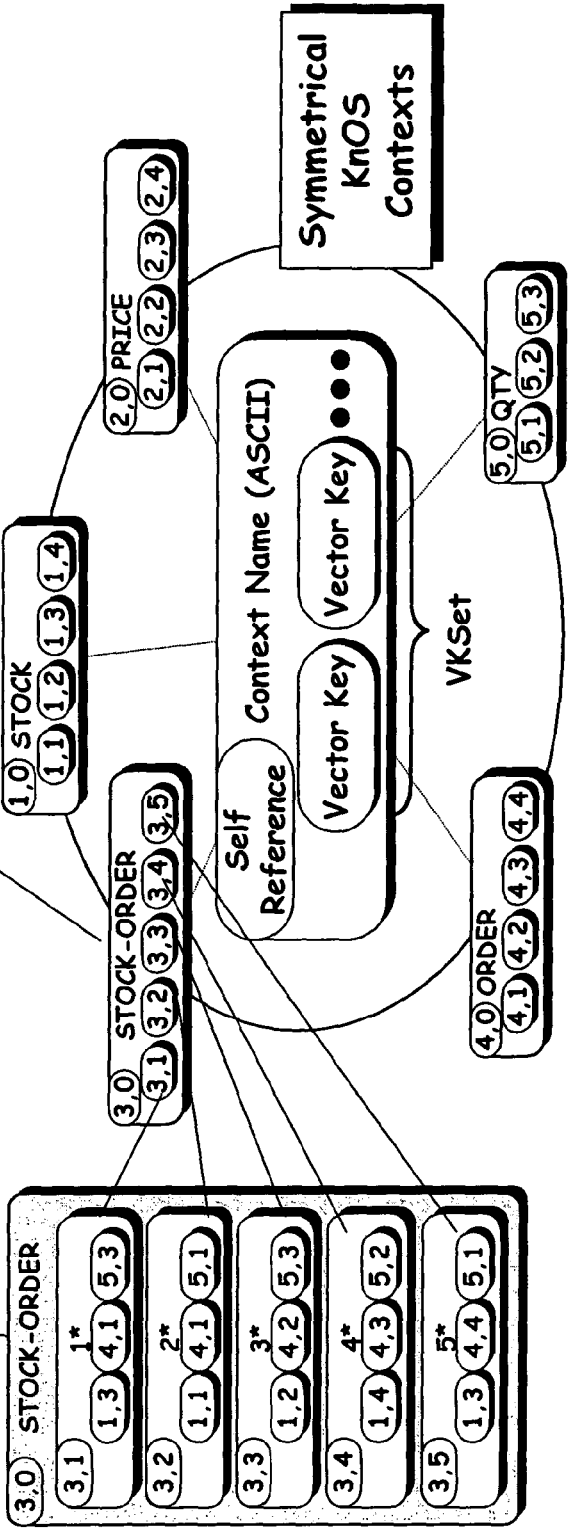
Drawing 26. *Structural Symmetry – KnOS Contexts*

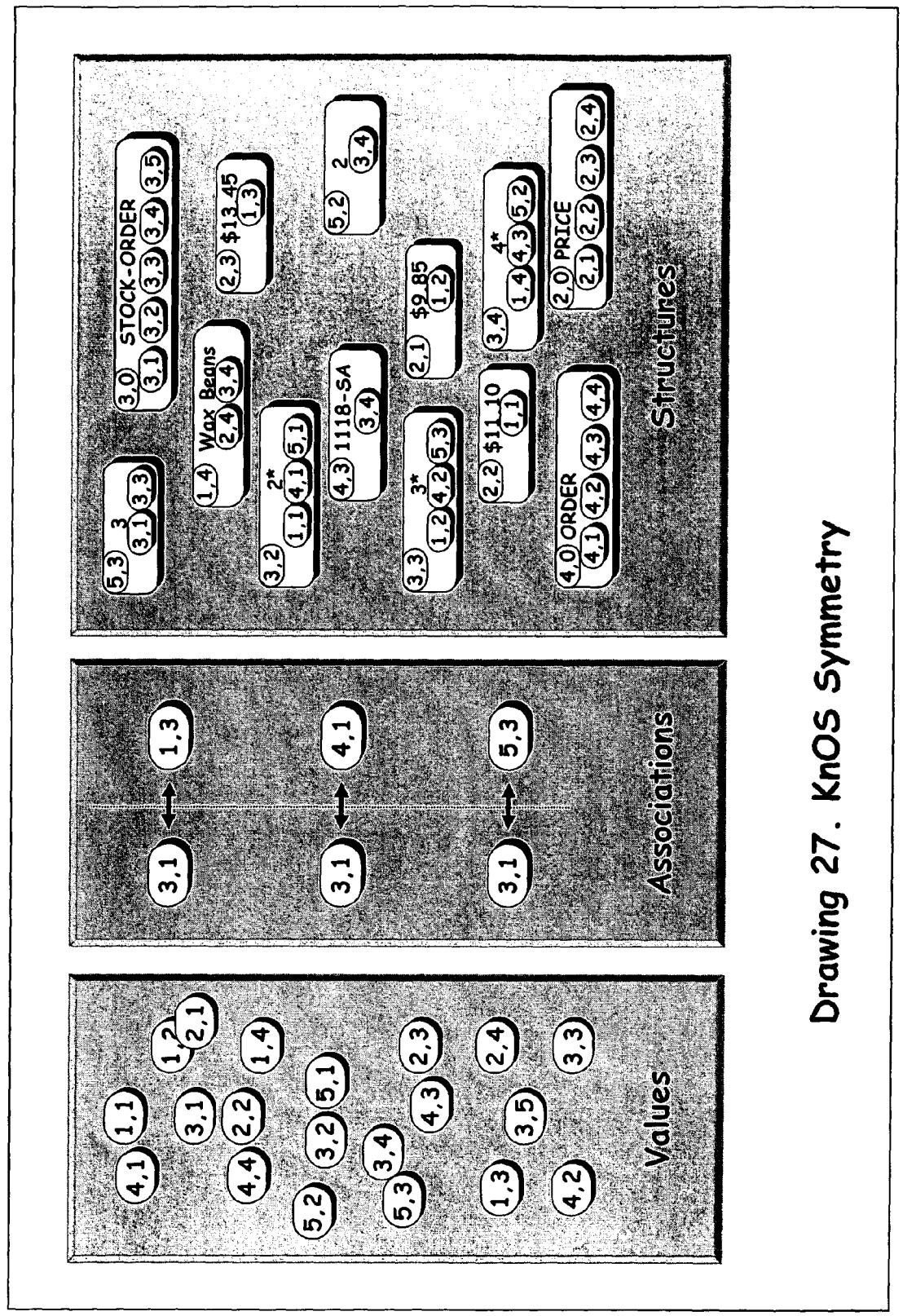
Drawing 27. KnOS Symmetry

A Comparison of Compactness

DATA BASE AND KNOWLEDGE OPERATING SYSTEM

CROSS-REFERENCES TO RELATED APPLICATIONS

This application claims priority to corresponding Provisional U.S. Patent Applications 60/398,843, filed Jul. 26, 2002 and 60/457,207, filed Mar. 25, 2003.

FIELD OF THE INVENTION

The invention pertains to the field of data management, most commonly called Database Management Systems or DBMSs.

BACKGROUND OF THE INVENTION

The earliest business-oriented data processing applications consisted of records of information content collected into flat files based on like record structures. Each department within an enterprise attempted to independently computerize their data-intensive functions (e.g., invoice processing, customer billing). Aspects of the enterprise's data were repeated or replicated at will, as these flat files of information were specifically engineered for each aspect of the separate software applications. There was a massive level of data redundancy in the flat files, which made information very difficult to update completely and often resulted in software applications giving wrong answers or taking inappropriate actions. Flat file computing also meant that there was no enterprise view of data across the spectrum of departmental information. Each software application used a unique physical data storage design and basic device access methods supplied by the hardware manufacturer to implement physical data management within the application. The flat file approach to data processing was extremely error-prone and costly, and provided no strategic view of the enterprise.

This situation led to a universal quest to separate physical data management from the functional software applications and create independent, reusable applications whose sole purpose would be physical database management. These applications became known as Data Base Management Systems or DBMSs.

Because enterprise data often has rich structural complexity that is almost impossible to capture in flat files (i.e., all structural complexity is flattened into two dimensions and hence the term 'flat'), the first attempts at independent DBMSs used smaller records of largely non-redundant information with either hierarchical or networked 'pointers'. To choose among these DBMSs it was necessary to decide whether the data was inherently hierarchical or networked. Both approaches proved to have limited scalability. For these and other reasons, hierarchical and network DBMSs met with limited commercial success.

In 1970, E. F. (Ted) Codd of IBM published a relational model of data storage and retrieval for large shared data banks (CODD, E. F., A Relational Model of Data for Large Shared Data Banks, *Communications of the ACM* 13, 6 (June, 1970), pp. 377-387, hereafter referred to as [Cod70]). Ted Codd's model for organizing database records with limited redundancy is a set-theoretical (mathematical) model that treats data contents the same whether its underlying structures are hierarchical or network-oriented. Though elegant and universal, Ted Codd's approach was not largely adopted through the early 1980s because mainframe computers of that day were incapable of supporting the input/output intensity required by a relational DBMS (RDBMS). As hardware capability increased through the 1980s, most industry practitioners began to line up behind Codd's RDBMS as the best means to manage large shared data banks.

While there are hundreds of thousands of business-oriented software applications today that still operate with flat files and hierarchical or network-based DBMSs, these methods of managing enterprise databases are considered outdated. Information update is now the province of on-line transaction processor (OLTP) sites that are implemented by RDBMSs. Large-scale complex query is increasingly being handled by specialized applications called data warehouses (DWH) that operate on vestiges of Codd's relational model. Ted Codd's relational model today stands astride the world of enterprise computing.

Despite near-universal acceptance as a database management mechanism, there are huge problems with the relational model. The most significant is the lack of relationship definition. Relational models contain almost no clues as to a) how they were created; b) what the various relationships among the data actually are; or c) how the relationships are reflected in the model. Most practitioners and experts who work with the relational model are destabilized by its lack of semantic context. As a result, many experts, including Ted Codd himself (CODD, E. F., Extending the Database Relational Model to Capture More Meaning, *ACM Transactions on Database Systems* 4, 4 (December, 1979), pp. 397-434, hereafter referred to as [Cod79]), have attempted to create semantic data models (HULL, R., KING, R., Semantic Database Modeling: Survey, Applications, and Research Issues, *ACM Computing Surveys*, Vol. 19. No. 3, (September, 1987) pp. 201-260, hereafter referred to as [Hull87]). For example, a semantic data model posed by Peter Chen in 1976 (CHEN, P. P., The Entity-Relationship Model—Toward a Unified View of Data, *ACM Transactions on Database Systems* 1, 1 (March, 1976), pp. 9-36, hereafter referred to as [Che76]) is almost universally accepted as the means to determine the semantic context of a relational model.

There have been many serious attempts to implement semantic data models (SDMs) as DBMSs. None have reached the commercial marketplace, partly because they are more difficult to implement just the required optimizers are difficult propositions), and partly because they are typically more difficult to use in real business settings. Also, the more semantic context a DBMS captures, the more difficult it is to make corrections and changes. Though such changes may have less impact than when the semantics are managed by the functional application, efficient support for semantics in a DBMS is very difficult. Getting a value-based or record-based DBMS to work takes significantly less resources. Another notion as to why semantic data models have not done better in the commercial marketplace is that semantic context does not do much to improve performance (and may actually retard performance). Given that RDBMSs are challenged for performance, it is probably not surprising that more semantic context has not found its way into value-based DBMSs.

With rare exceptions (e.g., Sentences from Lazy Software Ltd), semantic data models are not used as DBMSs. Unlike humans, a computer has no need to understand the semantic context of data. A computer needs only for the DBMS schema definition to be efficient for maintenance and execution. If semantic context helped a computer to be more efficient, there would be a reason to include semantic information in the execution system. There is no reason to believe that semantic context would improve the performance of the relational model. For example, there are no RDBMSs that also implement Peter Chen's E-R semantic data model [Che76]. There are numerous semantic data models and specialized implementation techniques, but there is only one widely accepted means of implementing enterprise databases—an RDBMS running on the relational model.

Background Art—Relational Model:

Ted Codd's relational model (originally [Cod70] but defined for current context in [Cod79]) is the foundation for relational DBMSs, which are today the prevalent implementation for enterprise systems. In a relational representation, which is shown in Drawing 1., "Relational Model", all data is folded into two-dimensional relations (tables) consisting of attributes (columns) and tuples (rows), such that some combination of the attribute values will uniquely identify each tuple (primary key or PK). Such a 2D table is called a relation (hence, the term relational. The remaining attributes (columns) in a relation (i.e., those that are not part of the PK) are called the non-key attributes or NKs of the relation. Within each relation, integrity is ensured when the NK attributes are dependent upon the whole set of the designated PK attributes and nothing but the whole set of the PK attributes (normalized, normal form, third normal form and 3NF). Creating lookup relations that define the range of acceptable values for an attribute ensures attribute-level integrity.

Relations (tables) are connected to one another only by shared combinations of identifying attributes. PK attributes migrate from relation to relation, where they are known as foreign keys (FKs). FK migration begins with the primary relations, which are the relations with only one attribute in the PK and no FKs. Relations with multiple attributes in the PK are called associative relations. Information is typically extracted from a relational model by projecting and/or selecting, then joining the resulting relations according to the FKs and, finally, filtering the results table based on any attribute value limitations specified in the transaction. Structured Query Language (SQL) can specify the data manipulation involved in projecting, selecting, joining and filtering. When an enterprise database structure has been captured in its correct (canonical or normalized) relational format, there is no redundancy in the stored NK attributes.

The best definition of the relational model can be found in [Cod79], Section 2. "The Relational Model", which defines succinctly that which is generally accepted as the relational model. The remainder of the paper ([Cod79]) proposes an extended relational model to capture more of the meaning of the data. Codd's extended relational model sought to move the relational model toward a more semantic data model with at least four "personalities". The extended relational model was not adopted by industry.

Advantages of the Relational Model:

The relational model has a highly evolved structure that facilitates data retrieval and a ero data redundancy goal for NK attributes that ensures data integrity. The relational model also separates logical data representation from the physical implementation. The data repository can be plied with a relational calculus implemented by a highly evolved and broadly standardized SQL, for example, as specified in [SQL92].

Relational Model Advantage—Application-Oriented Structure:

The process for evolving a relational model causes the data model to exactly mimic the business model. Each relation is created to exactly support some number of end-user views of data that are required by the software application. Once the correct relational tuples are located in the relational model, all of the necessary attribute values (instances) for the particular user view are directly contained within the structure of the tuple. No additional data need be accessed or retrieved (except, sometimes, lookup values that can be stored in memory).

Relational Model Advantage—Limited Data Redundancy:

The normal (canonical) form of the relational model ensures that no tuple of attributes is stored more than once. This has the advantage of reducing the amount of data to be stored and ensuring that updates to non-key attributes will be performed without anomalies. Each question posed to an RDBMS should only be answered in one way (when multiple replicated tuples are involved in a data model there exists the possibility that the data replicas will be out-of-synch and, thus, provide wrong answers to questions). The elimination of data redundancy from the flat file model was one of the driving features of the relational model.

Relational Model Advantage—Relational Calculus and SQL:

The relational model has a highly evolved relational calculus for manipulating the elements of the model and a broadly standardized SQL for plying the relational data structures.

Problems Involved in the Relational Model:

The principal problem involved with the relational model is that its fundamental data structure is both highly evolved and application-dependent. In simplest terms, the "row×column" structure of a relation lacks symmetry. The attributes that are bound into the various relations, the designations of the PK attributes and the nature and structure of the interconnecting FKs are as unique to a given enterprise's operation as fingerprints are to a person. Relational application software, written in SQL, relies completely on the structure of the relations and business rules.

Each aspect of the relational model maps to many different views/interfaces in the application and each view/interface in the software application interfaces with many different aspects of the relational model. This many-to-many relationship between the application software and the representation of the data has the effect of binding together the application and data so tightly that a minor change in either can have major consequences on the other. Because the relational model's application-dependent data structures (ADDS) are unique, complex and fragile (resistant to change), the ADDS feature of the relational model causes many severe problems in the software applications.

Relational Model Problem Involved—ADDS vs. Relational COTS:

ADDS makes the distribution and maintenance of commercial off-the-shelf (COTS) application software a very difficult business proposition. Because each application is inherently unique (by virtue of the ADDS uniqueness), it is difficult to achieve the economy of scale necessary to sustain a business distributing COTS applications. If the data model is made more flexible (complex) to accommodate a range of variation in the underlying business model (such as varying operational practices within an industry), the artifacts of this flexibility will cause the application software's complexity to increase, proportionally, to handle the increased operational flexibility (because SQL is tightly bonded to the data structure). Although any given implementation only uses a small portion of the ADDS-induced flexibility, every implementation must be able to fully identify and understand the flexibility. The relational equation—flexibility implies unnecessary complexity—is inescapable with respect to any given implementation of the COTS software.

Relational applications that are built on such flexible relational model data structures often suffer operational difficulties and failures that are not caused by any aspect of the particular enterprise's business model, but rather are caused by unneeded and unused artifacts of flexibility (included in the COTS application to accommodate competitors' business models).

In addition, identifying, understanding and ignoring the unused artifacts of induced flexibility in the application and the data model necessarily consumes the most talented human IT resources of the enterprise, as well as other institutional resources such as data storage, processing, training and documentation. As the COTS software vendor's customer base continues to grow, the need for flexibility and attendant complexity increases until the existing customer base begins to reject the COTS application. This often results in the failure of the COTS application vendor.

It is fair to state that the ADDS inherent in the relational model are the root cause of many if not most commercial failures of COTS application software vendors. [i.e., a) commercial viability requires vast flexibility, b) because of ADDS, vast flexibility implies unnecessary complexity (with respect to any given customer), and c) ever increasing and unnecessary complexity causes customers to stop using the application.]

Relational Model Problem Involved—Long Frozen Baselines:

For a given relational software application, the complete structure of the relations must be known/defined before the coding of the application software can begin. Thus, because of ADDS, long frozen requirements baselines are necessary so that the relational modelers can ascertain and document the specifics of the enterprise's data structure (it is not uncommon for enterprises with complex data structures to require frozen requirements baselines measured in years). The complexity is so extreme that it is often necessary to use semantic data models to first describe the data model in abstract terms. Because the underlying data model of the enterprise does change during the period of the frozen baseline (sometimes considerably), relational application software typically lags behind the true enterprise model, often to a substantial degree.

Relational Model Problem Involved—Resistance to Change:

Because of the ADDS and the tight bond with SQL, relational software applications are highly resistant to even the smallest changes in the structure of the relations. The most sensitive problems in this area are involved with changes in the single PK attributes of the primary relations. Any given PK for a primary relation can migrate to become FKs in a substantial number of relations within the enterprise's relational model. Any changes in such PK attributes can induce changes throughout a relational model, as well as the associated application software. This implies that minor changes can be very costly to make, and necessary changes are often avoided with costly workarounds (because the cost to correct the problem in the application is even greater). As a direct result of ADDS and FK migration, relational applications typically have years of unapplied application change requests in backlog. This is why COTS enterprise applications based on the relational model typically have a low degree of fit to the customer's needs.

Relational Model Problem Involved—Structural Degradation:

On the typical enterprise application, RDBMSs are faced with a physical reorganization problem relative to the basic tabular organization of information. The problem, which is attendant to the ADDS, is that relational information is stored in a highly-organized form which should be at least clustered if not physically contiguous on the storage medium. However, a table is only represented in its pristine structural form on the storage medium when it is first loaded (or re-loaded). When rows are deleted and inserted, this clustered physical arrangement on disk cannot be maintained. Over time, the RDBMS will gradually lose much of its throughput efficiency because of the relational model's reliance on structured data storage. The enterprise may simply accept this loss of efficiency or correct it by periodically reorganizing the tables on the physical storage medium.

The problem of structural degradation is inherent in relational data management. Reliance on complex physical data structures is the problem. All complex physical data storage structures degrade over time. When the DBMS relies on the physical structures for organization, processing efficiency degrades in proportion to the erosion in the physical structures.

Relational Model Problem Involved—Need to De-Normalize:

Normalization is considered a key theoretical strength of the relational model. In practice, it is one of the great weaknesses of the model. It is a rare implementation of the relational model that can afford the inefficiency involved in full normalization. The join operation is extremely inefficient and the greater the degree of normalization the more joins must be performed. De-normalizing the structures of the relational model provides for operational efficiency but leads to update anomalies and significant redundant data that then must be plied to support operations. This is especially true of the requirement to keep the data replicates updated in synch with the copies of record. All of this complexity must be added to the application. Complex queries require so many joins, that databases on the relational model must often be de-normalized further just to support complex query. When the update processors (OLTP) cannot support the added redundancy (de-normalization) that is required for complex query, it is frequently necessary to deploy separate DWH sites just to support the complex query.

Relational Model Problem Involved—Elemental Security:

The security requirements of enterprise applications are difficult to predict. Customers often require that security classifications (for access to data) be at the row or column (attribute) level. In some cases, customers may require security at the 'cell' level of a table (row×column). There are no practical ways to implement security labels within the cells of two-dimensional table structures (certainly none that are efficient). This is so because security is actually a different, third dimension to the two-dimensional table. A certain 'row-column' combination (two-dimensions) might require no security, or one or more security labels. If the security dimension is collapsed (folded) onto the two-dimensional table, as is required by the relational model, the result is not good.

This is an example of one area where induced flexibility makes the relational model untenable. To make applications broadly useful, the underlying data model must allow for cell-level security. Yet, cell-level security may only be invoked in a few instances. The rigid relational table structure would have to be built to handle security labels on all instances (cells). This approach is enormously inefficient. One alternate possibility is to create adjunct table structures (category relations) with only the row-column values that require the security labels. In a secure mode, this doubles the number of reads that are required to process transactions.

The more dimensions of complexity that exist in the application (such as security) the more difficult it is to implement the application in a two-dimensional relational depiction.

Relational Model Problem Involved—Inability to Interface:

Because of ADDS, the ability to read the information in a relational repository is effectively limited to the application for which the repository was erected. This is ironic because Codd's original intent for the relational model [Cod70] was to facilitate access to large shared data banks. To share a relational database that was erected for/by a different application and use its data effectively, a software application must learn the complicated ADDS of the 'owning' software application. Over time, as each application changes its business model and its underlying ADDS, all other applications that must share the application's data must be similarly modified to keep pace. For this reason, making even one minor change in a tapestry of interconnecting relational applications can be like throwing a rock into a still pond. The waves of change must propagate throughout the interconnecting applications. This has a profound effect on the structure and composition of relational applications. For example, most relational software applications do not eliminate unneeded attributes from their relations. It is more cost-effective to ignore that which is no longer necessary than it is to make such minor changes and suffer the wide-ranging effects upon the structure and composition of all interfacing applications. Over time, the persistence of unneeded data structure and attribution in a relational implementation can cause additional problems in complexity, storage space, and operations.

Relational Model Problem Involved—Inability to Model Complex Interrelationships:

The relational model has no real mechanism for modeling complex interrelationships among data. The most basic relationships are encapsulated in rigid sets of attributes. All other relationships are simply "embodied" within the FKs that are repeated among the relations. Therefore, the relational model does not define in any semantic manner the relationships among the relations. In 1976, Peter Chen [Che76] defined one of the first semantic data models (the Entity-Relationship or E-R model) to extend the relational model to address this problem. To define and explain the relationships among PKs and FKs in the relational model, the E-R model adds the notion of named "business rules" (among entities) with cardinality (e.g., 1:1, 1:M, 1:0,1M, etc.). The relational model and the E-R models are so generally intermixed in the real world that most people, and indeed most experts in the field, view them as one and the same data model. In [Cod79], Ted Codd both corrected this notion and attempted, himself, to extend the relational model to a semantic data model to encompass the definition and classification of complex relationships among the relations.

In short, the relational model presents a means of depicting data (an end-state description) and an add-insert-delete and query calculus. The relational model is not a means of understanding, analyzing, defining, designing, describing or improving the complex interrelationships that exist among the data. To do that, generally requires a semantic data model, of which there are many to choose from (including Chen's E-R model [Che76]).

Relational Model Problem Involved—OLTP vs. DWH:

When large and very large databases are implemented with the relational model, the contention between query and update transactions can cause severe performance difficulties. Mission critical enterprise applications generally require that updates be applied in real time. This is known as On-Line Transaction Processing (OLTP). However, enterprises also need to query the database, and many of the required queries are elaborate and/or complex. To support such queries on large databases requires secondary indices on each of the columns that are mentioned in the SQL "select" and "where" clauses. Because these secondary indices must be maintained during updates, they add substantial overhead to the update transactions.

Given that joining tables can be time-consuming and resource-intensive, complex queries also benefit from reducing the number of physical tables that must be accessed. A popular approach is to pre-join (or de-normalize) the tables to reduce the number of joins. Though most OLTP sites do de-normalize the databases somewhat, to improve performance, they typically do not do nearly enough de-normalization to support complex queries. Moreover, as the amount of de-normalization and secondary indices increases, OLTP response times get appreciably worse. Because of this contention, complex query support on large and very large databases has been increasingly implemented on separate computing suites known as data warehouses.

OLTP installations are optimized to best support real-time update, while still supporting enough queries to meet the tactical objectives of day-to-day enterprise operations. DWH implementations are optimized to support unrestricted complex query on large and very large databases, and as infrequent and minimally disruptive of an update process as is consistent with strategic assessment and decision support. OLTP supports the least amount of columnar inversion of the database tables (secondary indices) that is minimally consistent with tactical needs. DWHs support the maximum amount of columnar inversion of the database tables that reasonably contributes to efficiency in supporting complex queries. The current direction of the OLTP and DWH markets is to drive these two computing paradigms farther and farther apart, not closer together.

There would be a sizable advantage to conducting OLTP and DWH on the same copy of the database, provided that the solution was cost-effective. It would, for example, simplify training, lower maintenance costs, improve the currency and accuracy of data, and put strategic support within reach of many enterprises that today cannot afford both an OLTP and a DWH solution. It is simply that the DBMS industry views the separation as a necessary evil.

Background Art—Semantic Data Model:

As mentioned above, the relational model provides no mechanism for modeling the complex interrelationships either within or among its relations. Like the hierarchical and network data models that came before it, the relational model is termed a value-based or record-based model. Semantic models were first introduced as tools to understand, analyze, define, design, describe and improve data interrelationships. Complex data schemas could be modeled in a semantic tool and then translated into the relational model for implementation on an RDBMS.

The first published semantic data model, the Semantic Binary Data Model (SBDM) appeared in 1974, (ABRIAL, J. R., Data Semantics, *Data Base Management*, North Holland, Amsterdam, (1974) pp. 1-59, hereafter referred to as [Abr74]). In 1976, Peter Chen published the most commercially successful semantic data model of all, the E-Rmodel [Che76], to address the complete lack of semantic context in the relational model. So successful was the E-R data model at extending the relational model, that most database practitioners today regard the relational model and the E-R model as one and the same model. They are not. The relational model is implemented by an RDBMS while the E-R model is implemented in an entity-relationship diagram. The "business rules" introduced by the E-R model are not supported, per se, by an RDBMS. The success of the E-R model (compared to the more robust semantic models developed by, among others, Codd himself [Cod79]) is rooted in its simplicity.

One grouping of semantic data models that is related to this invention including a Knowledge Operating System or KnOS is the one that describes data as two constructs: entity sets and binary relations. These semantic binary data models(e.g., [Abr74], BRACCHI, G., PAOLINI, P., and PELAGATTI, G., Binary Logical Associations in Data Modeling, *Modeling in Data Base Management Systems*. North Holland, Amerstam, (1976) pp. 125-148, hereafter referred to as [BPP76], DEHENEFFE, C., HENNEBERT, H., and PAULUS, W., Relational model for a Data Base, *Proceedings of the IFIP Congress*, (1974) pp. 1022-1025, hereafter referred to as [DHP74], HAINAUT, J. L., and LECHARLIER, B., An Extensible Semantic Model of Database and its Data Language, *Proceedings of the IFIP Congress*, (1974) pp. 1026-1030, hereafter referred to as [HaL74], and SENKO, M. E., Information Systems: Records, Relations, Sets, Entities, and Things, *Information Systems* 1, 1, (1975) pp. 3-13, hereafter referred to as [Sen75]) treat each binary relation as an inverse pair of possibly multi-valued functions (see Drawing 6, "Semantic Binary Data Model"). The SBDMs and the present invention have the same core construct (sets of binary relations in inverse pairs of possibly multi-valued functions), but the present invention is not a semantic data model, per se, in that it does not seek to define relationships. Instead, the present invention treats the binary relations as basic, unnamed "associations", in much the same way that the relational model implements the net results of the E-R model.

In short, people crave semantic context; computers and DBMSs do not. DBMSs benefit only from efficiency and maintainability. If the inclusion of semantic context makes a DBMS less efficient or the database/application less maintainable, it is a weak candidate for addition to a DBMS. Unfortunately, semantic data models do both (less efficient and less maintainable). The more semantic context a DBMS captures, the more changes are required when one discovers either that mistakes were made or that the enterprise model has changed. If this were not true, all of the commercial RDBMSs would have absorbed at least the E-R semantic data model [Che76] into their basic framework.

Advantages of the Semantic Data Model:

One of the better treatments of semantic models was produced by Richard Hull and Roger King in 1987, "Semantic Database Modeling: Survey, Applications, and Research Issues" [Hull87]. Semantic data modeling techniques provide three principal advantages over record-based or value-based models such as the relational model.

Increased separation of conceptual and physical components. In the relational model, the access paths available to end-users tend to mimic the logical structure of the database schema directly (by comparing identifiers in order to traverse from one relation to another). The attributes of semantic models are used as direct conceptual pointers. Decreased semantic overloading of relationship types. The relational model only has two constructs for recording relationships among objects: a) by binding attributes within relations and b) by using the same values within two or more relations. It is for this latter reason, that the relational model is often called "value based".

Availability of convenient abstraction mechanisms. Semantic models provide a variety of convenient mechanisms for viewing and accessing the schema at different levels of abstraction.

Peter Chen's Entity-Relationship (E-R) model [Che76] is the most widely used and widely recognized semantic data model. The E-R model is the standard semantic data model for understanding, analyzing, defining, designing, describing and improving a relational model.

Problems Involved in the Semantic Data Model:

Semantic data models have been widely used in schema design but have not experienced much commercial success as a means of implementing computing solutions. There are several reasons for this.

Most of the semantic data models are not implementation models (they are used for schema design). For example, the E-R model is not an implementation model.

Many semantic data models are used by the object-oriented (OO) behavioral computing paradigm. OO has suffered from a lack of success because many enterprise data models do not sustain a broad-based crisp boundary condition (the core requisite of OO).

Many semantic data models have a narrow focus of interest, which is not well suited to commercialization as an implementation model.

Many semantic data models are too complex to gain wide-scale usage. Codd's own semantic extension to the relational model [Cod79] gained no following because of its theoretical complexity. The very simple E-R model is the standard semantic data model for defining relational models.

The simplicity inherent in the relational model permits the development of powerful, non-procedural query languages such as ANSI SQL. Many semantic data models can be mapped to a relational model for implementation, thereby taking advantage of the general computing features of relational modeling. As a result, many semantic data models are implemented on the relational model by an RDBMS.

There is no body of expert opinion today to suggest that semantic data models will ever replace record-based data models (relational, network, hierarchical) for implementation. But, it is likely that semantic data models will always have a place in the field of schema analysis and design.

BRIEF SUMMARY OF THE INVENTION

The present invention is referred to as the Knowledge Operating System or KnOS, and is a new computing framework for database management, one that works associatively, the same way that humans think. The KnOS's basic organizational scheme is the inverse of an RDBMS, or <data values->relationship>. This gives the KnOS cellular granularity and allows it to answer any kind of query with maximum efficiency. The KnOS does not attempt to store data according to the relationships in the enterprise model and, thus, the KnOS's physical storage structure is application independent and does not have to be changed when the enterprise's relationships change. Also, when processing data, the KnOS does not use asymmetric ASCII values, but rather uses fully symmetrical Vector Key references.

The KnOS design resolves the problems involved with the record-based (relational, hierarchical, network) DBMSs, as stated above. The intent of the KnOS invention is to supplant and replace current generation DBMSs on the relational, hierarchical, network, or any other currently implemented data models, including both OLTP and DWH.

The invention will generally be practiced through the method of using software with one or more computers. As shown in FIG. 28, the invention can be implemented with computer hardware and software. In the embodiment of FIG. 28, inputs and outputs are shown to the KnOS processor. The processor then manipulates data and instructions consistent with the invention. In the embodiment of FIG. 28, data can be stored either within the computer's own memory or external memory. While it is presently preferred that the invention is practiced on a single processor, it is also within the scope of the invention that the system be utilized on one or more computers in a computing environment, including computers linked such as by the Internet or other network systems. For some specific applications, it may be desirable to utilize the invention with both software, hardware processors, and firmware. FIG. 29 shows a firmware device having three functions, specifically including security, license key management and pooling functions. Other embodiments using firmware may implement other functions in the firmware portions. In such a firmware/hardware/software system, the KnOS processor with its associated software can be assigned certain functions while other functions are implemented by firmware. In some embodiments, both the firmware and the processor can in various applications read and write data to the storage device or devices. While FIG. 29 shows three presently preferred functions in the firmware block diagram, it is to be understood that other embodiments can have the firmware processing different aspects of the invention.

For the purposes of clarification the following terms may apply:

Application: a complete self-contained program used to perform a specific function Data Instance: any piece of data, information or knowledge that is differentiable. For example, any piece of data, information, or knowledge, such as any attribute, item, determinant, key, table, column, row, field, container, repository, environment, class, type, model, function, method, operation, relationship, display element, query, data model, view, report, user display screen, data type, file type, item path, file name, computer name, UPC code, URL, user, connection, status, quality, classifier, word, sentence, paragraph, page, chapter, volume, object, partition, sector, or reference, that is user differentiable.

Atomic: that which is indivisible by definition without destroying its basic nature.

Fundamental Data Structure: The smallest structural component of a data storage or data representation paradigm.

Item: The fundamental unit of the KnOS database, based on the Fundamental Data Structure, the Item encapsulates a self-referencing Vector Key, a Data Instance, and sets of Vector keys referencing other, associated Items.

Vector Key: A multi-dimensional, unique reference to an Item

Vector Key Set: an array of Vector Keys, encapsulated within an Item, which represents a particular type of association between the referencing Item and all of the Items referenced by Vector Keys in the Vector Key Set.

Logical Address: The abstract location of an item, independent of its actual physical location.

Logical Index: A token or value that directly references the abstract location of an item as opposed to its actual physical location.

Some aspects of the KnOS may superficially resemble existing data management paradigms and techniques, but the KnOS design is a wholly new invention in data management. The KnOS is a fully symmetrical computing framework— including all of its values, relationships, structures, and containers—and all KnOS operations are simple boolean functions performed on these symmetrical features. With 100% symmetry of form and function, the KnOS can operate as a native, massively parallel vector machine. The KnOS uses vectorized value representations of cellular granularity based on a format which is universally recognized across KnOS implementations. This means that independently generated functional applications can exchange information without a priori agreement or structural/schema knowledge. With a fully-inverted design and minimal structural contention, the KnOS can run both real-time update and complex query on a single data copy, on any computing scale with more inherent processing efficiency than the best DWH products. Because the KnOS's core fabric is a binary associative structure, it is called an associative database management system, or ADBMS.

The key differentiating factors of the invention are that it is based on a Data Instance centric architecture, where Data Instances are typically atomic, that is, indivisible by definition from a user perspective, such as the datum in a field in a table in a database, where each Data Instance is at the center of all its associations, and where the base structures that encapsulate the Data Instances, the common Fundamental Data Structures, are identical in form and function, are application independent and also contain encapsulated references to all other directly related independently encapsulated Data Instances. The encapsulated references are both unique identifiers for each and every associated Data Instance and are also logical indexes that fully encode the abstracted location of each Data Instance, making it possible to both identify and locate any Data Instance using the same reference key.

With respect to Data Instances, the encapsulating entity is referred to as an "Item." An Item encapsulates a Data Instance, as well as all of the references defining the associations between the Data Instance and all other related Data Instances. Items are based on the Fundamental Data Structure and are identified by a Vector Key, which is a multi-dimensional reference that uniquely identifies each Item in the KnOS system.

The KnOS is the first wholly symmetrical enterprise computing paradigm, as shown in Drawing 27, KnOS Symmetry. To the KnOS, every value looks exactly like every other value, every relationship looks exactly like every other relationship, and every structure looks exactly like every other structure. This fundamental symmetry in the computing model, when combined with cellular granularity, allows multiple processors to subdivide the workload with ease and execute operations with parallel abandon. For example, the KnOS has and requires no comparable action to relational "joins." The KnOS conducts all processing with optimized binary tree (or equivalent) searches on fully vectorized, symmetrical structures. Cellular granularity, fundamental symmetry and the universal use of vector representation can maximize processor efficiency to its theoretical limit. Among other things, this means that improvements in processor performance yield proportional improvements in KnOS performance. This is not true of any RDBMS or any DWH application. The KnOS design resolves most of the issues extant in the relational model.

Value Symmetry—Whenever any atomic data value (i.e., a Data Instance, such as "White Beans", "$9.85", "5", . . . ) is first inserted into the KnOS ADBMS, it is registered with a globally unique, symmetrical reference value in a vector format, known as a "Vector Key." In its preferred embodiment, the KnOS Vector Key has four dimensions of location embodied therein. They are called Environment, Repository, Context and Item, and will be expressed herein as $\{E,R,C,I\}$. If "White Beans" (a Data Instance) were inserted into the "Stock" Context at the "Manhattan South" Repository of the "Global" Environmental domain, "White Beans" might be registered in the KnOS with the Vector Key $\{E,R,C,I\}=\{0,6,1,3\}$. The Vector Key may be expressed as a symmetrical set of four dimensionally-unique thirty-two-bit binary integers in distinct blocks of four words each. This 16-byte Vector Key is the KnOS's globally-unique identifier for each Item. In addition to providing unique, symmetrical, compact value representation, the KnOS Vector Key can be used to locate information. The Item {0,6,1,3}, which encapsulates the Data Instance "White Beans", can be found as the 3rd Item of the 1st Context in the 6$^{th}$ Repository in computing Environment #0. All managed data values are registered in this fashion when they are first loaded. All further references to or uses of any ASCII values by the KnOS ADBMS refer only to these proxy Vector Keys. This design feature establishes the KnOS's value symmetry, as shown in Drawing 23, Value Symmetry.

Relationship Symmetry—All relationships are recorded in the KnOS as one or more binary segments, where each segment is an inherently bi-directional association between two Items. As a default, the KnOS environment automatically maintains the bi-directional integrity of the pair. If Item A points to Item B then Item B will always point to Item A. KnOS associations are not named, per se, but instead are value-based, and they can be classified to improve efficiency (semantic classification is a KnOS tuning technique). Whenever KnOS Items suffer from semantic overload AND the application can distinguish amongst the associative contexts, then the KnOS will store the various associations by context. This reduces the I/O required to identify the correct associations, which improves performance. The technique for storing and retrieving relationships using bi-directional pairs of binary associations is fully symmetrical. Drawing 24, Relationship Symmetry, shows that if 'Stock' Item "White Beans," identified by Vector Key {0,6,1,3} is associated to a 'Price' Item of "$13.45," identified by Vector Key {0,6,2,3}, then the relationship between 'Stock' and 'Price' is inherently symmetrical (as in "$13.45" is-price-of "White Beans"). Note that the same association, expressed as a tuple in the relational model, is only symmetrical if the 'Price' column of the Stock table has a secondary index. In addition, all KnOS relationships are expressed symmetrically both within and across associations, whereas relationships in the relational model are expressed both with tuples and with foreign keys or FKs, which is asymmetrical both within and across the representation.

Structural Symmetry—The target Vector Key of each bi-directional pair of binary associations is stored fully encapsulated with its subject Data Instance. If "White Beans" (subject) has-price-of (relationship) "$13.45" (target), the Item holding the target dollar amount might get registered in the KnOS as {E,R,C,I}={0,6,2,3}. The subject Item {0,6,1,3} ("White Beans") would be encapsulated with the target Item {0,6,2,3} (for $13.45), and vice versa. These type-classified sets of encapsulated references for each Item are stored in ordered one-dimensional arrays, called Vector Key Sets (VK Sets) by context type, as shown in Drawing 25, Structural Symmetry—KnOS Items. Every Item has the same fully symmetrical database structure—a) a self-reference (Vector Key), b) a Data Instance, c) Relationships (expressed as VK Sets), and d) (optionally) one or more Item Embedded Elements (IEE). KnOS Item structures, with all of their encapsulated target References, are also classified by type and stored in classified Contexts, for example, 'Stock' in one Context and 'Price' in another, as shown in Drawing 26, Structural Symmetry—KnOS Contexts. Each Context has the same construct as every other KnOS Context, which means that KnOS Contexts are fully There are many advantages of the KnOS system in comparison to systems of the prior art. These differences and advantages are summarized below.

The following outlines some of the advantages and objects of some of the embodiments of the invention.

COTS Applications: Because KnOS Items are cellular and KnOS Contexts are both fully independent and 100% symmetrical, KnOS databases are not application dependent. This independence holds on the broadest possible scale. The KnOS schema of an enterprise Resources planning application would have the same format and structure as, say, a geographical information system. A KnOS Context can be included or excluded without affecting the structure of any other Context and without any unpredictable or cascade effects on the software. A KnOS database is stored, accessed and processed exactly the same way regardless of what type of application is being implemented. Applications can be built one Context at a time with only local and best-available knowledge. Once defined, each Context can be updated as its context is expanded and without altering its structure in any way. COTS software applications can be prepared for an industry model (or many industry models) and then implemented on a case-by-case basis with none of the COTS application issues associated with RDBMSs.

No Frozen Requirements Baselines: The KnOS can be implemented Item-by-Item, Context-by-Context, and Repository-by-Repository, using any rapid application development or joint application development technique. By virtue of the KnOS's design, developers do not need to understand the format of values, the nature of relationships, the overall structure of a database, or even the design of the application, to begin developing and delivering software capability. The KnOS's 100% symmetrical, cellular technology requires no frozen requirements baseline for development.

No Resistance to Change: In line with no frozen baseline requirement for implementation, the flexible, incremental nature of the KnOS implies that applications can be continuously adjusted for local changes without affecting anything beyond the local condition. For example, the equivalent of table columns can be added or eliminated without repercussion while the application is running.

No Need for Structural Reorganization: The underlying data Repository of the KnOS is not organized in table structures that degrade over time. Insert, edit, and delete activity within the KnOS has no impact on the efficiency of the KnOS operation. The Items within a KnOS Context are not inherently sequence or cluster dependent; the KnOS Vector Keys are absolute and not sequence-dependent. Consequently, a KnOS implementation never needs to be reloaded or reorganized to improve efficiency.

Ability to Fully Normalize: Full normalization is a vastly superior method of database management because, among other things, it eliminates update anomalies and synchronization errors while reducing the amount of data that must be updated and maintained. Conversely, performance of the relational model degrades in inverse proportion to the degree of normalization. The more normalized the structure, the worse the RDBMS will perform. In contrast, the perfect symmetry in the KnOS design means that performance is directly proportional to the degree of normalization. A KnOS ADBMS implementation performs best when it is fully normalized.

Also, the canonical form of the relational model eliminates value redundancy only in non-key attributes with either very low or very high cardinality. Tabular structures (value-based relationships), however much normalized, do not eliminate value redundancy. PK values in ASCII format are repeated throughout the relational model because value-based foreign keys are used to record relationships.

Dimensional Independence—Elemental Security: The KnOS inherits complete dimensional independence from its cellular granularity. The KnOS equivalent of a tabular cell can have zero, one or many values (0, 1, M cardinality). The KnOS data model is n-dimensional, which means that any troublesome dimension of the application, such as elemental security, can be modeled in-place, in whatever fashion best suits the need.

Interfaces Among Applications: Because KnOS Contexts are cellular in granularity and wholly symmetrical, they can be compared for similarity from implementation to implementation, regardless of whether the various implementations have an a priori agreement on the structure of the various relations. For two KnOS application implementations to interface, it is only necessary to cross-reference the Contexts with similar pertinent information. At each participating application or site, the KnOS can then maintain these Context cross-references. Whenever the application issues a transaction that goes against one of these cross-referenced Items, the KnOS will automatically convert any Vector Keys, issue transactions against the target site, and then convert the responses upon receipt. In this manner, KnOS applications can read data without any prior knowledge of a target site's ADDSs. With the KnOS, the attributes of a target application or site are not bound up in complex relations such that the entire complexity of the ADDS must be understood in order to access and understand the columnar information content.

Ability to Model Complex Interrelationships: The KnOS has substantially improved relationship context compared to the relational model. Although still a value-based data model, the KnOS can be mapped 1:1 with the semantic binary data model (see Drawing 24, Relationship Symmetry). Each association is not expressly named, but the binary associations in the KnOS can be fully categorized as to dimension and can be segregated to separate, named tag sets that are slaved to the base Contexts. Experience shows that the KnOS's preferred embodiment of four (4) encapsulated association dimensions ('parent', child', 'link' and 'related') offers sufficient semantic context to achieve any given level of performance efficiency. These features of the KnOS allow it to take advantage of semantic context to improve throughput performance.

Although not the preferred embodiment, the KnOS can be extended easily to support a semantic binary data model without losing any of the semantics contained in the SBDM. The KnOS offers two broad choices for the classification of relationships—encapsulation and segmentation. Encapsulated relationships are located within the Item's Context (hence 'encapsulated'). Segmented relationships are located in separate, slaved tag set Contexts (with an Item-for-Item match to the basing Context). The distinction between encapsulated and segmented is simply one of performance efficiency. In either category, the relationships can be named. Tag sets are named, so there is no loss of semantic context with tag sets. Dimensional encapsulation can be a named classification according to some precise semantic context, simply by adding more associative "dimensions".

Resolution of OLTP and DWH Paradigms: By converting the computing paradigm from the tabular level to the cellular level, the KnOS eliminates much of the contention inherent in the relational model. The KnOS uses the encapsulating efficiency of the "row" and "column" construct without any of the damaging asymmetrical features of tables. As a result, the KnOS has the locating power of tabular representation without any of the damaging, application-dependent features of a table's asymmetrical structure. The KnOS gains the efficiency and accuracy associated with full normalization without any of the inefficiency associated with relational joins. Because the KnOS is inherently fully inverted (relationally symmetrical), it can support both OLTP and complex query on a single computing paradigm and database copy. The KnOS reunites the OLTP and DWH computing paradigms with all of the associated benefits.

Resolution of referential integrity: Cross-referencing tabular based data is an enormous challenge in the relational model, and requires the continuous addition of more and more artificial keys and tables to manage the complexity of a system as it evolves. Updating complex asymmetrical systems with replicated keys often results in inconsistencies due to incompleteness of the updates because there is no direct reference to all instances of any particular key.

Following is a brief discussion of the KnOS's symmetrical framework for value, relationship and structural representation, which overcomes this and other problems associated with the relational model. Drawings 22 to 26, referenced throughout this section, relate to the example found in Drawing 1, "Relational Model".

There are additional advantages associated to the KnOS. For example, the open disk format employed by the KnOS is as inherently secure as is theoretically possible. This is because a) most of the database values are proxies; and b) there is no association implied by physical contiguity. The KnOS disk format consists entirely of contiguous strings of binary integers interrupted periodically by either blank space or ASCII bit patterns. The ASCII bit patterns can be easily disguised by running the KnOS with 128-bit encryption on any persistent ASCII Data Instances and any embedded ASCII values, and this can be done with a very minimal performance penalty. Once that is accomplished, a KnOS data representation on disk is inherently undecipherable by anything but the application itself. If, as in the preferred embodiment, the precise semantic context of a database is maintained in the application and not the database, any remote chance there might be of discerning content from the KnOS's raw data format is essentially eliminated With contextual classification instead of semantic loading (i.e., the VKSets are classified, but the exact semantic context of each VKSet is not recorded in the database) and, with 128-bit encryption on ASCII representations, the KnOS data format on disk is, for all practical purposes, a "bag-of-bits."

The KnOS does not seek to supplant or extend any semantic data models. Rather, the KnOS provides a more flexible associative computing framework, similar in context to binary data models, to implement any and all enterprise data models. Further, it makes maximum use of semantic context (classification) to achieve the best possible throughput efficiency on any given enterprise model. That is to say that capturing additional semantics in the KnOS beyond its preferred embodiment would likely increase the total cost of computing and reduce inherent security.

The KnOS seeks to supplant in its entirety the RDBMS with a more broadly Associative DBMS. The term "associative" is intended to describe the fact that the KnOS is not limited to set structures of relations and FK embodiments, as in the relational model, but rather allows the full range of relationship contexts that may be defined by the more powerful semantic data models. With cellular granularity and 100% symmetry of form and function, the KnOS design is a new benchmark in database management, a cellular computing paradigm that should replace all current value-based computing paradigms.

BRIEF DESCRIPTION OF THE DRAWINGS

Drawing 1 is a diagrammatical representation of a prior art relational data model.

Drawing 2 is a diagram of how a primary relation of a relational model would be assimilated into the KnOS.

Figure 28:
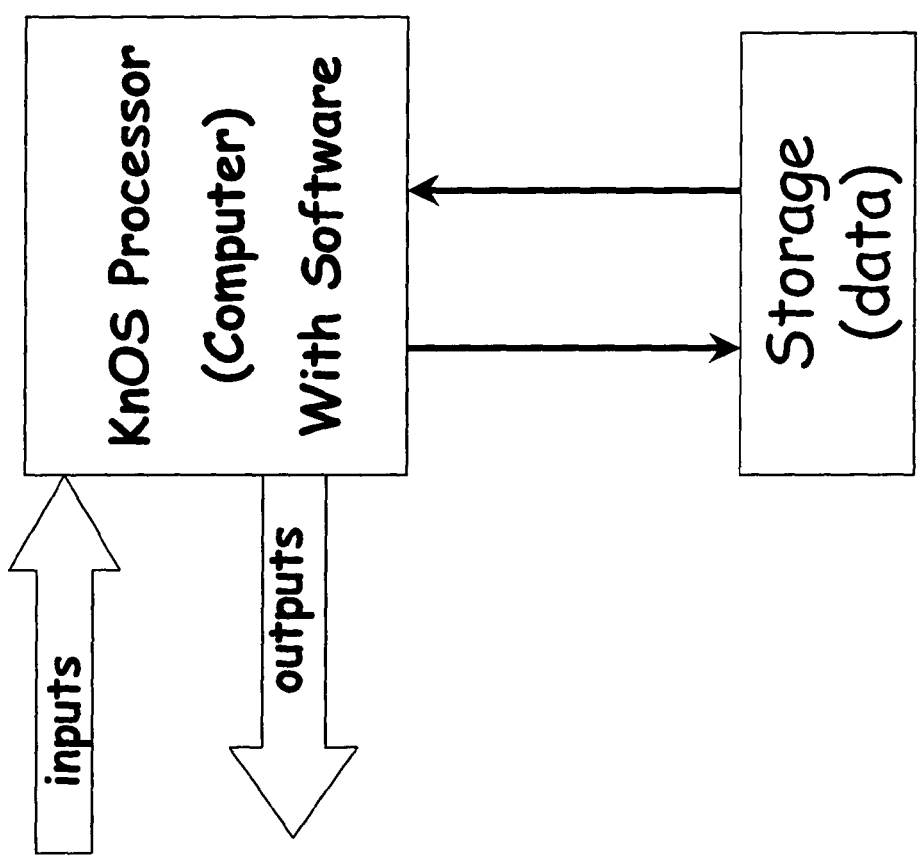
Figure 29:
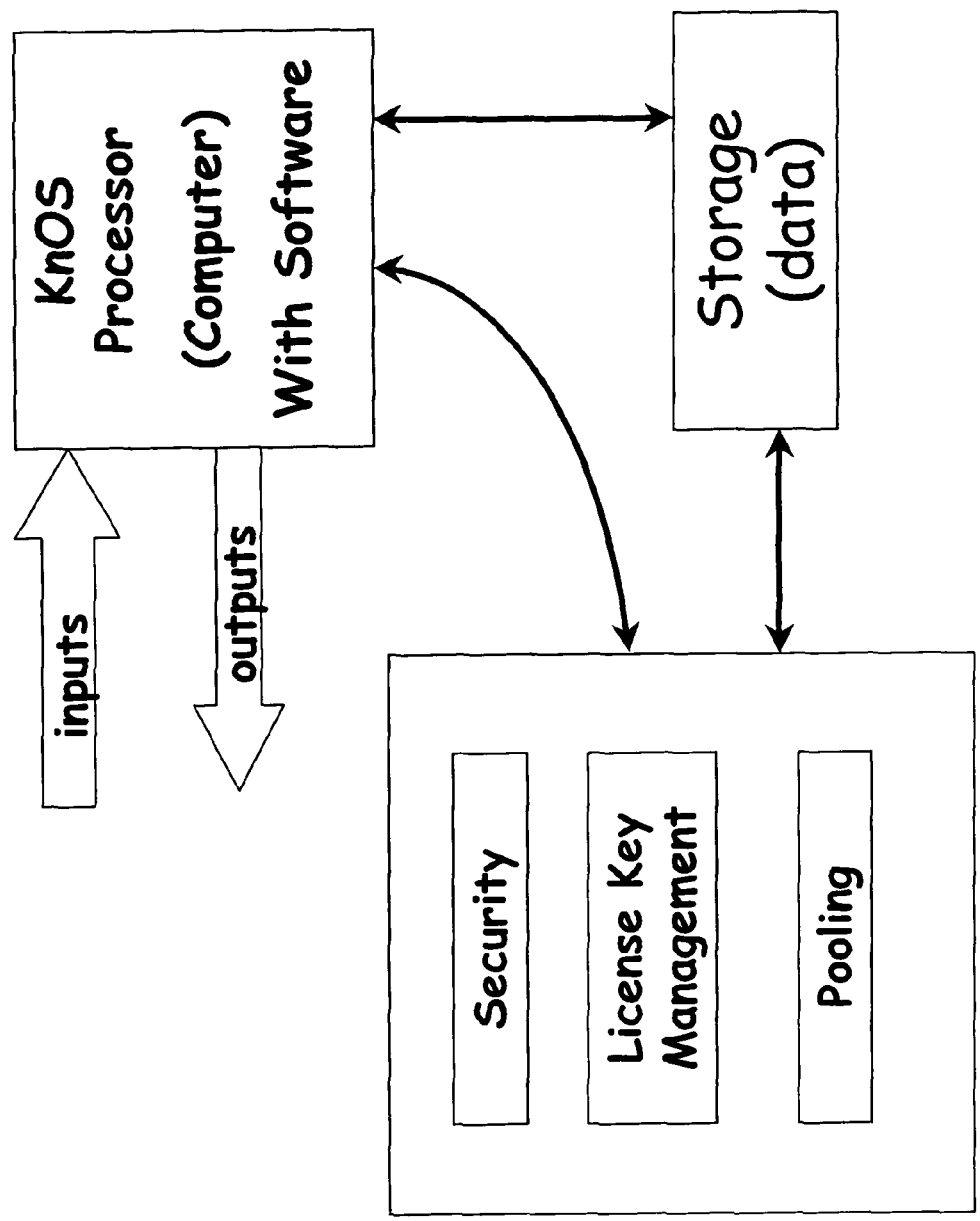

Drawing 3 is a diagram of how an associative relation of a relational model would be assimilated into the KnOS.

Drawing 4 is a diagram showing how the rows and columns of a primary and an associative relation from Drawing 1 would be assimilated into KnOS Contexts.

Drawing 5 is a diagram that shows the assimilation of all relationships from the relational model example depicted in Drawing 1.

Drawing 6 shows the relational model example from Drawing 1 depicted as a semantic binary data model.

Drawing 7 shows how a single segment of the semantic binary data model would be assimilated into KnOS Contexts.

Drawing 8 is a diagram showing the relational model depicted in Drawing 1 both as a semantic binary data model and as a KnOS model.

Drawing 9 is a diagram showing why the KnOS Context construct is application independent.

Drawing 10 is a diagram comparing KnOS operations to the equivalent relational operations depicted in Drawing 1.

Drawing 11 is a diagram showing an example of the KnOS pooling operation.

Drawing 12 is a diagram showing a four-dimensional reference model.

Drawing 13 is a diagrammatic representation showing the structure of a KnOS Item.

Drawing 14 shows the KnOS's symmetrical referencing.

Drawing 15 is a process model showing how the KnOS ASCII-bet converts ASCII values to their equivalent KnOS Vector Key.

Drawing 16 is a diagrammatic representation showing the six steps to fetching an Item based on the Item's Vector Key.

Drawing 17 is a diagrammatic representation of a Fundamental Data Structure as a Repository.

Drawing 18 is a diagrammatic representation of a Fundamental Data Structure as a Context and an Item.

Drawing 19 shows an embodiment of a method for updating KnOS Items on a physical media.

Drawing 20 shows another embodiment of a method for updating KnOS Items a physical media.

Drawing 21 shows the KnOS architecture to demonstrate KnOS scalability.

Drawing 22 illustrates inter-referencing between Environments.

Drawing 23 shows the comparison between ASCII and KnOS value representation.

Drawing 24 shows the symmetry (or lack thereof) between the relational, semantic binary and KnOS data models.

Drawing 25 shows the structural symmetry of a KnOS Item.

Drawing 26 depicts the structural symmetry of KnOS Contexts.

Drawing 27 illustrates the symmetry of the KnOS design.

Drawing 28 shows a block diagram of a typical computing environment incorporating the KnOS.

Drawing 29 illustrates an embodiment using firmware.

Drawing 30 shows prior art.

DETAILED DESCRIPTIONS OF THE DRAWINGS

Following is a more detailed description of each drawing and interpretation of various figures.

Drawing 1, "Relational Model", shows a Primary relation ('Stock') whose single Primary Key (PK) attribute is 'Stock', and an Associative relation ('Stock-Orders') whose PK is a combination of two Foreign Key (FK) attributes, namely 'Stock' from the 'Stock' relation and Order # from the 'Order' relation. Drawing 1 also shows how the Relational Model would project, select and join to answer the sample query— 'what is the total price of white beans on all stock orders?'

Drawing 2, "Assimilating a 'Primary'Relation", shows how a primary relation in the relational model would be assimilated into the KnOS. Tuples of the 'Stock' primary relation are named 'Pinto Beans', 'Kidney Beans', 'White Beans' and 'Wax Beans'. The 'Stock' Context is an example of a KnOS Context used to record row relationships. All other columns of a primary relation are assimilated as one column to each KnOS Context, in this case, a Context for 'Stock' and a Context for 'Price' (which is a column-like Context).

Drawing 3, "Assimilating an Associative Relation", shows the process depicted in Drawing 2, but for an associative relation, or one in which the PKs of the relation migrate in as a FK from other relations. There is one KnOS Context for each relational column plus one KnOS Context to represent the tuples of the Stock-Order relation.

Drawing 4, "Projection of Rows & Columns to KnOS Contexts", illustrates the first step in converting the 'relations' from Drawing 1 into KnOS Contexts. A KnOS Context is created for the rows of the one associative relation ('Stock-Order'), and then one KnOS Context is created for each column of both relations, resulting in additional KnOS Contexts for 'Stock', 'Price', 'Order' and 'Qty'.

Drawing 5, "Assimilation of Relationships to KnOS Contexts", shows the assimilation into a KnOS model of all the relationships in the relational model example depicted in Drawing 1.

Drawing 6, "Semantic Binary Data Model", shows the classical semantic binary data model for the relational model shown in Drawing 1. It is similar to the KnOS in that there is one KnOS Context for each node of the semantic Binary Data Model. Each of the bi-directional relationships is named and the instances of association (i.e., multiple values) are shown in the upper left.

Drawing 7, "Representing Binary Associations as KnOS Contexts", shows how a single segment of the semantic binary data model depicted in Drawing 6. The example shows the relationship between the "stock" entity and the "price" entity. Each element of the relationship associates one value of the "stock" entity (e.g., "Pinto Beans") with its matching value from the "price" entity. The semantic binary data model depiction is asymmetric while the KnOS depiction is symmetrical.

Drawing 8, "Comparison of Data Representations", shows the raw data from the relational model example in Drawing 1 depicted in all three representations—relational model, semantic binary data model, and the KnOS. At the bottom is the ADDS from the relational model. At the left is the same database represented as a semantic binary data model. In the upper right is the KnOS representation of the same raw data (though accurate context is not depicted in the VKSets). The KnOS Context can represent the data from both a binary data structure and a tabular structure.

Drawing 9, "Application Independence", shows why the KnOS Context is application independent. Adding a new attribute to the 'Stock' relation (a new column) would alter the physical construct of the 'Stock' entity in the relational model. With the KnOS Context data architecture, the same change simply adds more VKSets to the 'Stock' Context, it does not alter the structure of the Item or the Context. The Item has the same structure before and after the 'Qty' attribute association is added, namely {Vector Key-Data Instance-VK-Sets}.

Drawing 10, "KnOS Operations", shows how the KnOS conducts core operations with "referenced fetches." This example is the same problem posed on the relational model in Drawing 1. The KnOS would:

(1) Determine which stock-orders are for white beans. Fetch Item {0,6,1,3} (Data Instance="White Beans") from the 'Stock' Container. (2) Extract from Item {0,6,1,3} any VKSet References to the 'Stock-Order' Container (i.e., Vector Keys of the form {0,6,3,X}), namely {0,6,3,1} & {0,6,3,5}.

(3) Determine the associated quantities. Fetch Items {0,6,3,1} & {0,6,3,5} from the 'Stock Order' Container and extract any VKSet References to the 'Qty' Container ({0,6,5,X}). The answer is {0,6,5,1} & {0,6,5,3} respectively. Fetch {0,6,5,1} & {0,6,5,3} from the 'Qty' Container to get the answers (Data Instances) "1" and "3", respectively.

(4) Determine the price of white beans Extract from Item {0,6,1,3} (Data Instance="White Beans") the VKSet References to the 'Price' Container (i.e., Vector Keys of the form {0,6,2,X}), namely {0,6,2,3}. Fetch Item {0,6,2,3} from the 'Price' Container to get the answer (Data Instance) "$13.45".

(5) The KnOS results are extended and summed to get $53.80. "Fetch Item {E,R,C,I} is a Referenced fetch because the Vector Key {E,R,C,I} is both a unique reference and a KnOS logical address.

Drawing 11, "An Example of Pooling", shows how the KnOS would answer the question—'which Stock-Orders for "Pinto Beans" have a Qty<=2?' In the 'pooling' operation, relevant Items are fetched from the database and placed into a 'pool' for a series of direct integer comparisons whose purpose is to determine the intersection. The first step is to fetch from the 'Qty' Context all Items whose Data Instance is <=2, and place them into the 'pool'. Next, fetch from the 'Stock' Context the Item whose Data Instance="Pinto Beans" and place it into the 'pool'. Finally, put the driver element from the 'Stock-Order' Context, namely {0,6,3,X}, into the 'pool'. Perform a direct integer compare on the first 3 components of the {E,R,C,I}, in this case {0,6,3,X}. The intersection result from the integer compares, {0,6,3,2} or Stock-Order 2*, is the answer to the question.

Drawing 12, "Multi-Dimensional Reference Model", shows how a given Multi-Dimensional Vector Key, "{1,38,1,5}", might be assigned to a real world situation. In the preferred embodiment of the invention, the multi-dimensional reference model has 4 dimensions. The world view or Environment might be assigned to countries, as in "United States"=#1. The Repository view might be assigned to processing sites within countries, as in the "New York processing site"=#38 (within Environment #1). The identities of persons might be assigned to Context #1 within {E,R}={1,38}. The "Duane Nystrom" person might be assigned reference #5 within {E,R,C}={1,38,1}. The unique multi-dimensional reference, or Vector Key, for "Duane Nystrom" would be {1,38,1,5}. It is also the logical index used to find the abstracted location of "Duane Nystrom"; which Item in which Context in which Repository in which Environment (see Drawing 16 for elaboration).

Drawing 13, "Structure of a Item", shows a conceptual and a physical representation of an actual Item. The physical representation is depicted on the right. The Item is a variable number of words (each word=32 bits or 4 bytes), shown here in rows of 4 words per row. The columns are for ease of use in reading the VKSets—the first column is the Environmental ("E") dimension, the second column the Repository dimension ("R"), the third column the Context ("C") dimension and the last column represents the Item dimension or Item ("I"). This vector key is abbreviated "{E,R,C,I}" herein.

Drawing 14, "Bi-Directional References", shows a fundamental property of the KnOS. Each explicit reference has an explicit back reference. Shown here is the reference that "Duane Nystrom" has "Brown" hair color. The "Brown" Item in the hair color Context also contains an explicit reference back to "Duane Nystrom". The drawing also shows an embedded reference from "Duane Nystrom" to a phone number. With an embedded reference, there is no back-referencing ability.

Drawing 15, "ASCII-betical Conversion", shows how an Data Instance, "Duane Lewellyn Nystrom, Esq." is converted to its KnOS Vector Key. The first and second letters are looked up in an ASCII-bet to determine which Item's Data Instance values start with "Du". The resulting Items are then pooled with the Context for persons, {1,38,1,0}. This yields an intersection of two compliant Items. Compare the Data Instance values on all compliant Items to get the answer, {1,38,1,5}.

Drawing 16, "Locating Item {0,6,8,2} on the Physical Media", shows how the KnOS uses the value of the Vector Key ({E,R,C,I}) to locate the Item. First, the KnOS retrieves from the Repository container the {C,R,N,O} Directory entry (a Vector Key format) whose 'C' value matches the particular {E,R,C,I}. In this case, {E,R,C,I}={0,6,8,2} matches Repository directory entry {C,R,N,O}={8,3,1,5}, which gives the location of Context {0,6,8,0} on disk. Next, the KnOS retrieves from the {0,6,8,0} Context the {I,R,N,O} Directory entry (a Vector Key format) whose 'I' value matches the particular {E,R,C,I}. In this case, {E,R,C,I}={0,6,8,2} matches Context directory entry {I,R,N,O}={2,3,6,7}, which gives the location of Item {0,6,8,2} on disk.

Drawing 17, "Repository Structure", is a diagrammatic representation of a Fundamental Data Structure as a Repository data structure.

Drawing 18, "Context and Item Structure", is a diagrammatic representation of a Fundamental Data Structure as Context and Item data structures.

Drawing 19, "Updating Item {0,6,8,2} on the Physical Media—I", shows one method of KnOS update that may be used if the updated Item will not fit back into its previous space allotment after update. The updated Item is appended to the end of the Repository file.

Drawing 20, "Updating Item {0,6,8,2} on the Physical Media—II", is similar to Drawing 19, except that it depicts the preferred embodiment of physical disk management under the KnOS. As with Drawing 18, Item {0,6,8,2} receives an update that makes it larger than the 1-page it was currently allotted on disk. In the preferred embodiment, the KnOS has no space registry. Instead, the KnOS will first move the next container, in this case {0,6,5,223}, to the end of the file, thereby freeing up enough space to return Item {0,6,8,2} to its original location. In effect, Item {0,6,8,2} inherits as additional space that which was previously allocation to {0,6,5,223}.

Drawing 21, "KnOS Scalability", illustrates how a typical high-end site might be configured as a range of loosely-coupled processing nodes interconnected by a high-speed bus.

Drawing 22, "Inter-Referencing Between Computing Environments", illustrates how incorporating multi-dimensional Vector Keys in the KnOS enables items in completely disconnected data systems to be associated across computing environment boundaries.

Drawing 23, "Value Symmetry", shows how asymmetrical ASCII representations are converted to symmetrical KnOS References.

Drawing 24, "Relationship Symmetry", shows the symmetry, or lack thereof, of the relational, semantic binary and KnOS data models.

Drawing 25—"Structural Symmetry—KnOS Items", illustrates how an inherently asymmetrical relational model would be depicted as symmetric KnOS Items.

Drawing 26—"Structural Symmetry—KnOS Contexts", illustrates how KnOS Items are grouped and encapsulated in symmetric KnOS Contexts.

Drawing 27—"KnOS Symmetry—KnOS Contexts", illustrates the overall symmetry of the KnOS design—values, relationships and structures.

Drawing 28—A block diagram showing the KnOS system implemented on a computer with KnOS software operating on the system.

Drawing 29—A block diagram showing the KnOS system implemented on a computer with KnOS software operating on the system utilizing firmware incorporating data security, license key management, and KnOS Operations accelerator.

Figure 30:
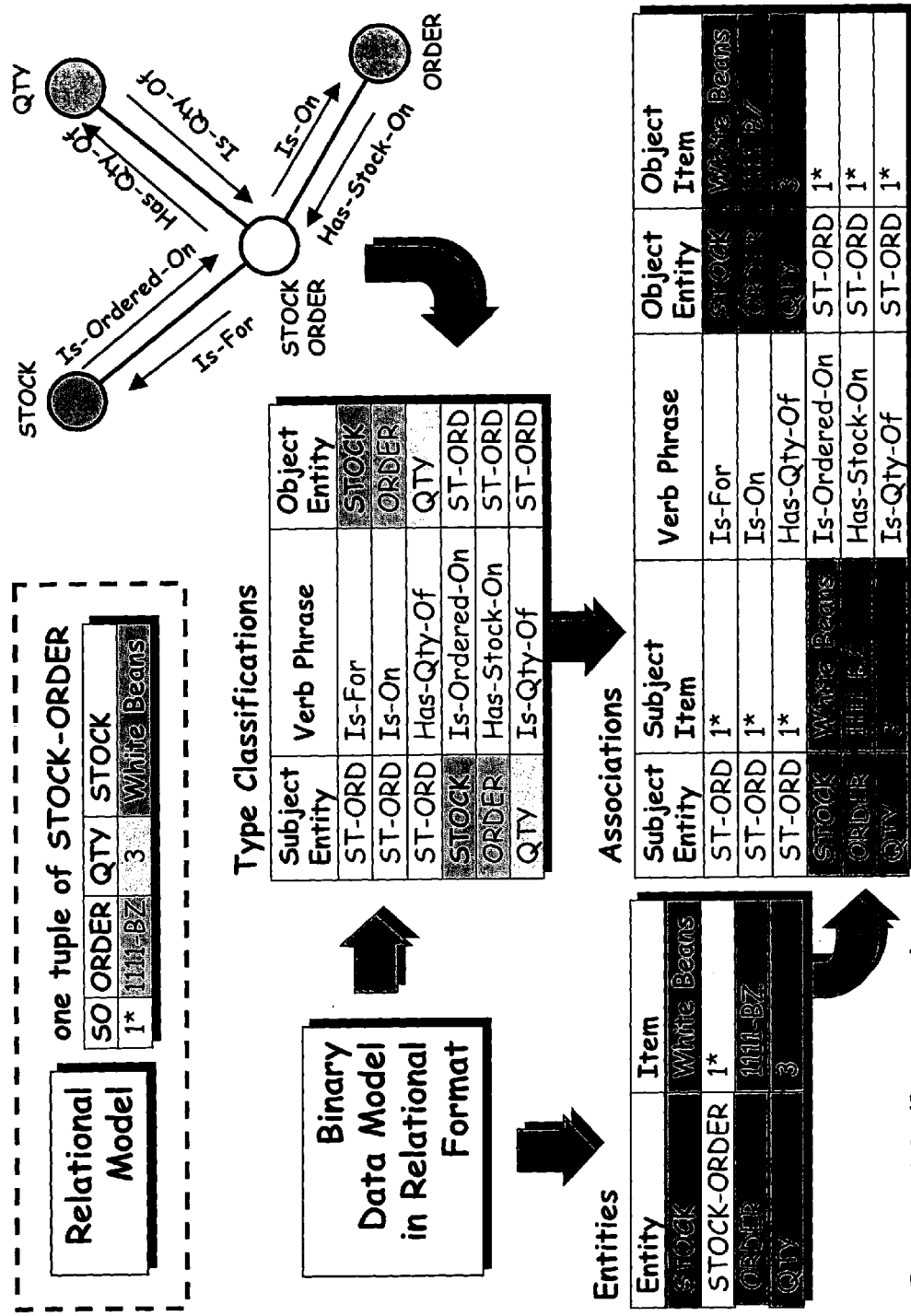

Drawing 30—FIG. 30 is a diagrammatic representation of a prior art data base system. It shows the associations of Stock, Qty, and Order with regard to a single Stock Order in a diagrammatical representation. The relative compactness of the data model in relational format and associative format can be seen.

DETAILED DESCRIPTION OF SOME EMBODIMENTS OF THE INVENTION

A computing environment is shown in Drawings 28 and 29. While the system can be implemented in a variety of ways including on multiple processors, Drawing 28 shows a software embodiment on a single computer. Drawing 29 is a block diagram showing the KnOS system implemented on a computer with KnOS software operating on the system utilizing firmware incorporating data security, license key management, and KnOS operations accelerator. While only these two embodiments are shown, it will be well understood by someone skilled in the art, that a large variety of embodiments using different hardware configurations can employ the invention. This specification hereby incorporates by reference prior U.S. applications Ser. Nos. 60/398,843, filed Jul. 26, 2002 and 60/457,207, filed Mar. 25, 2003.

To solve the problems outlined previously which are inherent in the relational model, the KnOS is structured inversely to the relational model. In the KnOS, data values lead to relationships. The KnOS's organization rule is <data values->relationships>, which means that the KnOS is a fully inverted data model. The KnOS stores atomic Data Instances in successively encapsulated Contexts by type classification, and within the storage mechanism for each Data Instance the KnOS stores references, in Vector Key format, to all of the associations that are relevant to that Data Instance. In KnOS terminology, unique, encapsulated Data Instance values in a like context are called "Items." Items are classified by type (context) and encapsulated in Contexts. Contexts are encapsulated by Repositories and Repositories are encapsulated by Environments. All relationships between Data Instances, however complex, are segmented into binary associations between two Items. The associations are then type-classified by semantic or other conceptual context by organizing them in to VK Sets and encapsulating them within the associating Items. In simple terms, the encapsulated members of Environments are Repositories, the encapsulated members of Repositories are Contexts, the encapsulated members of Contexts are Items, and the encapsulated members of Items are classified sets of associations with other Items, which are expressed as Vector Keys (VK) and classified by semantic or other context into VKSets. This fundamental organization allows the KnOS to effectively associate data values to relationships.

Granularity:

How the data model is organized (i.e., whether <relationship->data values> or <data value->relationships>) also determines the granularity of the data model. Granularity is the extent to which a data model contains separately accessible components. The more components that are separately accessible, the greater is the granularity. The greater the granularity, the more flexible is the data model.

The granularity of a data model cannot be independently established. It is determined solely based on the subject of the prime organization rule (i.e., <subject->object>). If the model is organized by the rule <relationship->data values>, then the granularity of the data model is the smallest element of a relationship (the subject). For the relational model, the smallest element of relationship is the relational tuple (i.e., one instance of a relation, one row of a table). Otherwise, the model is organized by the inverse rule <data value->relationships>, and the granularity of the data model is the smallest element of a data value. The data value is analogous to each unique, non-null cell value in the relational model. For this reason, models that are inverted relative to the relational model, as is the KnOS, may be described as having cellular granularity, whereas the relational model has row level granularity.

The KnOS treats each unique instance of a cellular value in a relational table as an independent concept, called an Item. Because the KnOS Item is the foundation of the KnOS design, it means that the KnOS can represent relational data at the cellular level. The KnOS is properly characterized as having cellular granularity. In other words, unlike the relational model that reads and writes information by row, the KnOS reads and writes information by unique cellular values within each given context.

Each KnOS Item has encapsulated within it, specific references to all other associated concepts (Items), including all cellular values in that particular row, as well as all other cells in the table that have that particular cellular value, and all other associated concepts in those rows, etc., etc. This satisfies the organization rule <data value->relationship> in that when one provides the KnOS a data value or a description of data values, the KnOS's organization rule can provide all relationships associated to those data values. In short, the KnOS is data instance centric whereas the relational model is relationship centric.

To summarize, the granularity of the relational model is the tuple (row of a table). If you can identify a tuple to a relational model, it can return you all of the data values associated to or contained in that tuple. The granularity of the KnOS is each unique data value for a given context, which is to say each unique, differentiable concept, or Item, is atomic. If one can identify a single unique data value (Item) to the KnOS Model, it can return all of the Items that are directly associated to that Item.

It may be convenient to compare the KnOS to the relational model. Indeed, any relational model can be assimilated fully into a KnOS representation by fully normalizing it first and then classifying all of the unique data values within the tables as binary associations based on their row×column orientation. However, the inverse is not true, while a relational model database can always be fully represented in a KnOS model, a KnOS database cannot always be represented by a relational model. The same statement is also true of the hierarchical model and the network model when compared to the KnOS. The KnOS is a vastly more flexible data-modeling paradigm than any record set or table based data model. It is possible to build KnOS enterprise models that simply cannot be represented relationally.

Therefore, while it may be convenient to think of the KnOS relative to the relational model, it does a disservice to the KnOS invention to define it in this limited fashion. Unlike the relational model, Items in the KnOS can be defined at any level of abstraction that can be differentiated by users. For example, any Data Instance, that is any piece of data information or knowledge that is differentiable, can be a single KnOS Item. It may be a characteristic, determinant, key, table, column, row, class, type, model, program, function, method, operation, display element, image, query, data model, view, report, user display screen, data type, file type, item path, file name, table name, computer name, database, UPC code, serial number, part number, URL, user, protocol, connection, message, status, quality, classifier, word, sentence, paragraph, page, chapter, volume, object, partition, sector, BLOB, CLOB, pointer or reference. A KnOS Item can be anything, any concept, that a user can identify (differentiate).

In short, the KnOS is an unrestricted n-Dimensional modeling environment, whereas the relational model is a folded, 2-Dimensional representation. If one is comfortable only with relational representations, the KnOS can easily accommodate the user. The decision as to the granularity of a KnOS data model is left to the implementers. The KnOS has no preconceived dimensional notion of how data should be organized. In its preferred embodiment, the KnOS is a wholly self-referencing modeling environment, meaning that everything relevant to the implementation is stored in the KnOS database as KnOS Items of appropriate types.

Symmetry

Throughout the course of this detailed description of the invention, the text will refer to symmetry, meaning a) bilateral similarity, b) similarity of form and arrangement, and c) the correspondence of parts in size, shape, and position.

This specification will not detail why symmetry is an important feature to the modeling process. Suffice it to say that the more symmetrical the model the simpler and more efficient it is to define, change, process. Model symmetry is also critical to parallelism in processing. The more symmetrical the model, the easier it is and the more completely it can be processed in parallel.

The relational model seeks the definition of relationships through an analysis of symmetry. Once known, relationships are categorized completely by their symmetry. Any candidate distinct relationships that are subsequently determined to have like symmetry are combined to be the same relationship. The remaining, unique, asymmetrically defined relationships then constitute the relational model, in its normal form. Thus, asymmetric representation is used as the principal means of definition in the relational model. When properly constituted in the normal form, a relational model is 100% asymmetric. Among other things, this means that all of the enterprise's relationships must be understood correctly before the data model can be constructed. If two distinct components of the relational model are subsequently determined to be symmetric or structurally congruent, meaning contained in the same columns in the table, the data model must be corrected to combine the two components.

The KnOS model is not based on relationships, but rather is based on unique data values. KnOS relationships are defined as being composed of segments of binary associations between two Data Instances encapsulated as Items and represented as multi-dimensional Vector Keys. The KnOS is specifically designed to be the first fully symmetrical computing paradigm, consisting of symmetrical values, relationships and structures. The discussion of KnOS symmetry will begin with value symmetry.

Value Symmetry

ASCII values are wholly asymmetrical because they lack a) bilateral similarity; b) similarity of form and arrangement; and c) correspondence in size, shape and position. The vast majority of all data values, concepts, etc. (KnOS Items) are expressed in terms of ASCII values, with the main exception being Binary Large Objects (BLOBs). When data values are represented in an ASCII format they are difficult to store and process for many reasons. As a result, most data warehousing DWH applications substitute bitmapped representations for ASCII values in an attempt to inject symmetry and compactness into the computing process. DWHs use bitmaps on a localized basis while the KnOS has full value symmetry on a universal scale.

The KnOS injects 100% value symmetry into the computing paradigm by converting every Item's ASCII value representation, referred to herein as the Data Instance or ThOhT), into a wholly symmetrical, multi-dimensional reference referred to herein as a Vector Key. Each separate Item is assigned its own unique Vector Key the first time it is introduced into a KnOS computing environment, and that Vector Key assignment is never altered, changed or reused in any other context thereafter. The KnOS Vector Key is a wholly symmetrical proxy for each Data Instance. In other words, when comparing one KnOS Vector Key to another, the activity has a) bilateral similarity; b) similarity of form and arrangement; and c) correspondence in size, shape and position.) This symmetry is illustrated in Drawing 23, "Value Symmetry".

Whenever any action (update or query) begins in the KnOS, the very first step is always to determine the Vector Key of any Data Instances that are presented as parameters in the transaction. If any Data Instance presented to the KnOS is new, the KnOS will either reject the action (if a query), or (if an update) a) assign the new Data Instance a unique Vector Key; and b) add the new Data Instance to its ASCII-bet dictionaries. The KnOS Vector Keys for Data Instances are then used exclusively by the KnOS for computing operations. In effect, the KnOS translates asymmetrical data values at the front gate, and then works only with the fully symmetrical Vector Key, as proxies, thereafter.

The KnOS' symmetrical reference takes the form of a Vector Key consisting of an ordered set of binary integers that are unique in each dimension of the model. In a typical embodiment of the invention, the Vector Key has four (4) dimensions, known as Environment, Repository, Context and Item. The KnOS Vector Key, which is often referred to herein as {E,R,C,I}, consists of four distinct binary integers of thirty two bits (one word, four bytes) each, where each of the binary integers is unique in that dimension. The actual number of reference dimensions for any given application may be fewer or greater than four. Four dimensions is simply the preferred implementation. In some embodiments, only 30 bits of a the 32 bit word are used as a the Vector Key, leaving 2 bits to mark system qualified reference types, but the full bit width is available for embodiments that require it. The word width is defined by the computing environment; therefore, if a 64 bit word width is available, the reference can be such.

The Vector Key is not limited to Item references. The Vector Key also applies to container headers in the same {E,R,C,I} format: Environment headers={E,0,0,0}, Repository headers={E,R,0,0} and Context headers={E,R,C,0}, and to both Repository directories (in the {C,R,N,O} format) and Context directories (in the {I,R,N,O} format. VK Sets (arrays of vector keys) must be uniform by type—Vector Keys in the {E,R,C,I} format cannot be mixed with Vector Keys in the {I,R,N,O} format.

Relationship Symmetry

In the relational model, relationships are recorded in one of two fashions: the basic relation or the shared identifier values (FKs). These two approaches are completely different and wholly lacking in symmetry. No two relations or shared identifier values are alike, by definition. If two relations or two shared identifiers are alike, they are combined into one. The relational model's method for recording relationships actually prides itself on its distinctiveness, which is to say its lack of symmetry.

Because the KnOS's basic organization rule (<data value->relationships>) is inverted relative to the relational model, the KnOS requires that all relationships compare two and only two Data Instances. The KnOS refers to these binary relationships as associations. Also, the organizational requirement to go from any data value to the attendant relationships means that all binary associations are inherently bi-directional (inverted). The example depicted in Drawing 24, "Relationship Symmetry", shows that two Data Instances, Item="White Beans" and Item="$13.45", are associated to one another. The particular semantic context is a) that "White Beans" have-price-of "$13.45" AND b) that "$13.45" is-price-of "White Beans". Either semantic context must be accessible to the KnOS given its basic organization rule (<data value->relationships>).

Whether viewed within or amongst the associations, the KnOS's binary, bi-directional association is 100% symmetrical. When the KnOS registers a bi-directional association between two Items, the association has a) bilateral similarity, b) similarity of form and arrangement, and c) correspondence in size, shape and position.

It is worthwhile at this point to make a short assessment of the semantic context of the example shown in Drawing 24. Neither the relational model nor the KnOS records the precise two semantic contexts in so many words (i.e., have-price-of and is-price-of). Each model records only that "Price" is somehow involved in the relationship. The relational model records 'Price' as the name of the column (attribute) and the KnOS records 'Price' as the name of the Context. The semantic binary data model, shown in the upper left of Drawing 24, does directly record the entire semantic context of each relationship. The KnOS maps the semantic context of the relationships by similarity of type and hence the semantic context can be directly inferred by reading the associations within the context of their dimensions and the encapsulating Contexts.

Structural Symmetry

The last and most important dimension of symmetry in a data model is structural symmetry. Structural symmetry refers to how the parts of the model are stored. The organization rule of the relational model, <relationship->data values>, means that data is stored by relationship. The means of depicting relationships in the relational model is asymmetrical, so the structure of the data storage is asymmetrical. Because the KnOS's organization rule is driven by data values (<data value->relationships>), the KnOS can have structural symmetry.

In fact, each different level of abstraction in the KnOS storage structure is symmetrical, as shown in Drawing 25, "Structural Symmetry—KnOS Items" and Drawing 26, "Structural Symmetry—KnOS Contexts". The relationships encapsulated within the Item containers, as VKSets, have structural symmetry. Each Item is structurally the same as all other Items. Items are type classified and stored in Contexts. Each Context of Items is structurally the same as all other Contexts of Items. In fact, KnOS containers are structurally symmetrical across container types, even though different types of KnOS containers perform different functions. The Item container and the KnOS container that is called Context are structurally symmetrical. The same structural symmetry exists with the Repository container and the Environment container as well.

Drawing 27, "KnOS Symmetry", shows that no matter how one looks at the KnOS model it is completely symmetrical. This is true whether one considers values, relationships or structures.

Within the structural symmetry of the KnOS model, there also exists a symmetry of containment. In all other DBMSs, the data values do not reference their containers because they simply occupy space and have a position in a container. Once read from a container, (i.e. a table or a tree), the data value does not reference its container, and hence context must be externally maintained. This becomes more and more difficult as the number of data instances read grows. All Data Instances as Items in the KnOS, have symmetrical relationships with their containers (Contexts), in that the Items are inherently self-referencing, via their Vector Keys, and hence point to themselves, and thus by definition reference their containers (Contexts). Contexts always reference the Items 'within' them. In addition, logical to physical mapping of the items to their actual locations is symmetrical in that the KnOS maintains a physical to logical mapping from the actual location to the Items residing there.

The Vector Key:

The Vector Key has two distinct purposes. The first is to act as a unique identifier to identify each and every Item. The second is to act as a locator key, or Logical Index to allow the KnOS to find an Item. Using a Vector Key as the universal reference to any Item enables the KnOS to encode sequentially encapsulated container references, as in {E<R<C<I} in the preferred embodiment, as elements of the key and use those elements as direct indexes into each successively encapsulated container. Since the Vector Key acts as both an identifier and a locator for each Item, it is used directly to designate an association in any of the VK Sets of any dimension of association encapsulated in an Item.

The term dimension, used throughout this specification, refers to two distinct things—a) the dimension of references of Items; and b) the dimension of relationships of Items. The Vector Key is essentially a logical index to where they are uniquely located within the dimensions of reference of Items. Because the Vector Keys also uniquely identify Items, they are also used to record the relationships among the Items. Thus, the Vector Keys are used to uniquely identify and directly locate associated Items when they are classified into one dimension or another of the VK Sets of references of an Item. The classification of KnOS associations constitutes the relationship dimension.

The KnOS is said to be dimensionally enfolded, or successively encapsulated. Items are housed within a series of crisply bounded containers such that each is uniquely numbered within its parent or envelope container. An Item container can be logically located within its parent Context. A Context of Items can be logically located within its Repository container and a Repository of Items can be logically located within its Environment container. With only a Vector Key, it is possible to pass from dimension to dimension until a particular Item is located. Each Item container encapsulates its relationship dimension.

In the preferred embodiment of the invention, binary associations or relationships are also classified in four (4) dimensions—'parent', 'child', 'link' or 'related'—and encapsulated within each Item container, where the binary state of the association in each dimension is represented respectively by the existence or lack thereof of a Vector Key referencing the associated Items. The existence of the Vector Key uniquely identifies each associated Item in that dimension and provides the KnOS the means to directly locate it. The relationship dimensions are thus enfolded within the Item dimension.

Each Environment is always its own first reference. All of the enfolded Item dimensions are exposed once a given Environment has been entered. See Drawing 22, "Inter-Referencing between Computing Environments". In a typical embodiment, each Environment has 3 primary enfolded Item dimensions (R, C, and I) and I primary external dimension (E), where E=1 is typically the self reference to that Environment. (E=0 typically references the "Creator" or "License Master") and further Environments are added as they are encountered. In this way, every Environment will have 'E' references to other Environments that will be different.

It is important to note here that 'E' is a logical reference and, hence, an Environment value of, say, "2" could conceivably refer to different things in different KnOS Environments. In other words, there is no master environment list with specific allocations for which 'E' is which, such that the list must be maintained by some authority. This does not preclude the allocation of a defined set of universally referenceable 'E's. For instance E=0 could be the central licensing authority for the KnOS. E=411 could be the master knowledge base for KnOS systems. E=611 could be for maintenance or technical support, etc. In practice the KnOS would reserve the first 'n' 'E's for these types of applications.

With each Item having unique encapsulated Vector Keys in the four (4) primary enfolded dimensions ({E,R,C,I}), every Item in every Environment can be associated to every other Item in every Environment by classifying and encapsulating all associated Items with each Item's own Vector Key. Each Environment's multi-dimensional referencing scheme is completely consistent internally, that is, a Vector Key for any Item within an Environment will be unique no matter which other Item within that Environment uses it as a reference.

It is important to understand that a Vector Key is not a specific memory address or specific physical location pointer. Each Item is placed in a Context in association with every other applicable Item, but the placement is made by reference, which is encapsulated within the Context and is not necessarily physically contiguous. Items are always stored and retrieved by logical reference, not by address or physical location. Therefore, which underlying mechanisms are used to actually store the Items in a storage medium are not necessarily important, as long as they accommodate the requirements of the KnOS and are optimally efficient. Typical underlying mechanisms for the storage and retrieval of Items are described herein. It should be noted here that the preferred storage mechanism has symmetry between the logical and physical layers of the KnOS, that is the logical location system encapsulates physical locator tokens and the physical storage system encapsulates logical locator tokens.

The KnOS Data Instance associated with any Item is analogous to a single instance of a relational attribute (e.g., Person="Duane Nystrom", Qty="3", Stock="White Beans", or Price="$13.45") in a given context. The Context is analogous to the entirety of a relational attribute (e.g., Person, Qty, Stock, Price), including its full range of values. In other words, a KnOS Context can hold all of the Items of a given type of Item. The Repository dimension of the Vector Key is an aggregation of Contexts. It might refer to a real-world location, a particular machine complex, or any other user/application-dependent organization of data such as region, district or city (e.g., the New York, N.Y. or Los Angeles, Calif. repositories). The Environment dimension of the Vector Key is the aggregation of Repositories, which can be used to denote the world view, say, nations or continents (e.g., the US or Canadian Environment). In particular, it is typically used to identify the actual real-world computing environment that houses or brokers a collection of Repositories. In practical applications, References with four dimensions are sufficient to deal with any data management issue, especially since these dimensions refer only to the Item dimension of the KnOS. The semantic context of relationship modeling has unlimited dimensionality in the KnOS through the classification and segmentation of associations (described further on).

Drawing 12, "Multi-Dimensional Reference Model", depicts a typical instance of the multi-dimensional referencing scheme. As the Vector Key symbol ({E,R,C,I}) implies, the Vector Key is simply four distinct, one-word binary numbers concatenated together, such as {1,38,1,5} (Environment #1, Repository #38, Context #1 and Item #5). On 32-bit machines (4 bytes to a word), each of the four components of the Vector Key is typically constrained to a 30-bit binary integer (i.e., $2^{30}$=0–1,073,741,824 base 10), (however, the full 32 bits can be used). The full Vector Key can, therefore, reference or identify $2^{30} \times 2^{30} \times 2^{30} \times 2^{30} = 2^{120}$ different Items.

The multi-dimensional reference model is broadly extensible. It is possible to begin with a single location, add a second, third etc. Later, the locations might be divided into multiple Environments. For a single location, {0,1,1,5} would be a valid Vector Key and would refer to the fifth Item in Context #1 of the one and only Repository. Later on, if a second Repository were added, it might become Repository #2. Nothing need be changed with respect to the data in the first Repository. The data from one Environment/Repository can be read by the applications from any other Environment or Repository without confusion.

The KnOS Item:

The KnOS Item is based on application independent Fundamental Data Structure. Drawing 13, "Structure of a KnOS Item", shows both a conceptual and a fully formed physical representation of an Item. The physical representation is depicted on the right. An Item consists of a variable number of words (on a 32-bit machine, each word=32 bits or 4 bytes), shown here in rows of 4 words per row.

The row×column table representation shown on the right is strictly for purposes of explanation, and does not represent an actual implementation of an Item. The 18-rows×4-column structure does not actually exist. The "Duane Lewellyn Nystrom, Esq." Item shown in Drawing 13 does not have 18×4=72 words, but rather 71. The grayed-out cell in row 6 does not exist. The Item is actually a variable length record. The row×column representation of the Item shown in Drawing 13 is intended to make it easier to read the Item's own Vector Key and the Vector Keys of associated Items. Where the Items own Vector Key or the Item's VK Sets are concerned, the four columns of words represent the dimensions of the Vector Key—{E,R,C,I}. Otherwise, the four columns have no meaning to the Item.

The first 'row' of four words in the Item is the primary self-referencing Vector Key for the Item in Drawing 13, {1,38,1,5}. The second, third and fourth 'rows' consisting of twelve words gives the Item's "map," describing how to read the remainder of the variable length Item. The Item map in Drawing 13 states that the Item's Data Instance is the next 7 words, shown as "|Duan|e Le|welll|yn N|ystr|om, |Esq.|".

Each Item also concatenates and encapsulates an unrestricted number of Vector Keys of associated Items arranged in classified (dimensioned) sets, called Vector Key Sets, such that each Item fully encapsulates the sum of all defined associations with respect to the given Item (Data Instance, data value, concept). Different VK Sets within a single Item correspond to different types or classifications of associations, and there are typically four primary types. The Item map in Drawing 13 shows that there is first a VK Set of three 'parent' vector keys (four words each), then a VK Set of two 'child' vector keys, then a VK Set of two 'link' vector keys, followed by a VK Set of two 'related' vector keys. 'Parent', 'child', 'link' and 'related' are the four typical classifications or dimensions of relationship (semantic context) used by the KnOS, and which can be seen as representing the semantic contexts of "is", "has", "does" and "goes with". Any number of further semantic contexts can be added at any time, with no limit imposed by the KnOS.

If desired, additional related elements may be embedded in the Item. These are referred to as Item Embedded Elements, or 'IEEs'. The IEEs can be data, such as a part number or a street address, or VK Sets, which reference other Items. Drawing 13 shows that the "Duane Lewellyn Nystrom, Esq." Item has an embedded phone number ("514-824-9949") and street address ("3307 Blake Lane, Unit 47"). Embedded elements may also be expressed as separate Items and explicitly referenced through one of the primary VK Set dimensions or through a secondary dimension instantiated in an Embedded Element as either a single Vector Key or a VK Set.

Embedded Item data is optional. If most of the queries put to a Repository about persons also request the person's phone number, and no independent queries are ever made by phone number (i.e., who has phone number "514-824-9949"?), it might make sense to embed those values in each person Item. Otherwise, 'phone number' should be a Context in its own right. For example, if the Repository had to support a query by phone number, then embedding the phone number would not work without a complete search through the data contained in all Items (unless all embedded items were also added to an ASCII-bet dictionary (see next section), cross-referenced, and thus identifiable and accessible by binary tree search).

Each type of container in the KnOS is an application independent Fundamental Data Structure in that it is structurally congruent, self-referencing and encapsulates its content and is completely independent from any application built using the KnOS. The assumed classification scheme for KnOS containers, listed from the lowest level to the highest level is—Item, Context, Repository, Environment. A Context houses some number of Items, a Repository houses some number of Contexts, and an Environment houses some number of Repositories. Note that the term "Context" refers to a specific type of container, namely the container that logically houses all Items that have been grouped according to some contextual definition or classification (i.e. Person, Customer, Product, Company, Species, Color, Part Number . . . ).

The KnOS Context and Repository:

The left half of Drawing 18, "Context and Item Structure", shows a Context of Items. The right side of Drawing 18 shows one of the Items so contained. Structurally, there is no difference between Items and Contexts. Items have members, which are VK Sets of Vector Keys. Contexts have additional members, which are the Items.

In a Context, an Item member's Vector Key is not a literal {E,R,C,I}, even though it has the same structure and the same number of words element. By definition, any given member of a Context has the same identical "E", "R" and "C" values as do all other members of the same Context AND even the Context itself. Thus, only the Item (I) value, or rightmost of the four components of the Vector Key, is required to be maintained in the Item member's Vector Key of a Context.

The provisions for the other 3 dimensions (i.e., the "E", "R" and "C") are used for the 'physical locator' index, the Item size in bytes and status and state flags. All members' Vector Keys can be maintained in sorted order by Item (I) value, which allows for rapid look-up of any specified Item in the Context.

The use of this member information in the Context is also shown in Drawing 16, "Locating {0,6,8,2} on the Physical Media". Item #3 on Drawing 16 shows the Context. Items #4 and #5 show the members of the Context (four words in two pairs). In a normal {E,R,C,I}, the "I" would be in the fourth position. Because the "E", "R" and "C" do not need to be maintained in a Context, the member Vector Keys in a Context start with the "I" in the leftmost position. These {E,R,C,I} might be better described as {I,R,N,O}, meaning Item, Relative, Next and Offset. Reading from left to right, the member entry in the Context gives the actual number of the Item, followed by its Relative position in the Item locator directory (which refers to the last two positions N and O), followed by the number of the number of the Next Item one would encounter on the disk, followed by the page Offset to the Item's Data Instance.

A similar situation exists with the Repository container. In the case of the Repository, the members describe Contexts, which means that the vector keys might be better described as {C,R,N,O}, meaning Context, Relative, Next and Offset. Reading from left to right, the member entry in the Repository gives the actual number of the Context, followed by its Relative position in the Context locator directory (which refers to the last two positions N and O), followed by the number of the Next Context one would encounter on the disk, followed by the page Offset to the Context's Data Instancee. Drawing 17, "Repository Structure" illustrates this.

Drawing 16 shows that for the Item whose {E,R,C,I}={0, 6,8,2}, the Context member Vector Key to Item #2 would be {I,R,N,O}={2,3,6,7}, and the Repository member Vector Key to Context #8 would be {C,R,N,O}={8,3,1,5}. Whether {E,R,C,I}, {I,R,N,O} or {C,R,N,O}, all are Vector Keys, and, when grouped or classified, are referred to as VK Sets.

This illustrates a core power of the KnOS—Items can be located with only the Item's Vector Key and the logical-to-physical directories that are embedded in the disk media. VK Sets in {C,R,N,O} format are disk Repository directories. VK Sets in {I,R,N,O} format are disk Context directories. The KnOS can locate and retrieve any Item by comparing its {E,R,C,I} first to the {C,R,N,O} of its Context and then to the {I,R,N,O} of its Repository.

The first step in the locate-and-fetch process for an Item is to locate the right Environment. From the Environment, the Repository directory, in {C,R,N,O} format, is accessible.

Using the Repository directory, the KnOS compares the {E,R,C,I} Referenced by the transaction (in this case {0,6,8,2}) to the {C,R,N,O}. {C,R,N,O}={8,3,1,5} is the Repository member entry that matches {0,6,8,$\overline{2}$} (i.e., where the "C" in the {E,R,C,I} matches the "C" val$\overline{\text{u}}$e in the {C,R,N,O}. In this case, th$\overline{\text{e}}$ "O" value of "5" in the Reposit$\overline{\text{o}}$ry directory entry gives the Offset to the page on the disk media that contains the pertinent Context.

Using the Context directory, the KnOS compares the {E,R,C,I} referenced by the transaction (in this case {0,6,8,$\underline{2}$}) to th$\overline{\text{e}}$ {I,R,N,O}. {I,R,N,O}={2,3,6,7} is the Context m$\overline{\text{e}}$mber entry that matches {0,6,8,$\underline{2}$} (i.e., where the "I" in the {E,R,C,I} matches the "I" value in$\overline{\text{t}}$he {I,R,N,O}. In this case, the "O" $\overline{\text{o}}$f "7" in the Context directory entry gives the Offset to the page on the disk media that contains the pertinent Item.

Drawings 17 and 18 illustrate an alternative accessing method which segments the above described elements of the logical to physical 'directories from the physical to logical 'directories'. The physical to logical 'directories' for disk locations are located in VK Sets of the respective Repository containers and for RAM locations they are located in the KnOS's own Environment container. Consolidated are the PageID offset references for both the RAM and disk locators, eliminating the need for separate operating system memory and disk management sub-systems. All memory allocation and de-allocation by PageID is managed by the KnOS. Only the physical layer reads and writes are handled by hardware drivers, which interpret PageID offsets and map them to the underlying physical structures of the RAM and disk systems.

Context Names and Item Data Instances:

All KnOS Contexts have a name that describes or classifies the contents of the Items in the Context. Similarly, each of the Items in a Context represents a unique Data Instance within a given context, which may be visualized as a name in the sense that it is how a user identifies each Item within a Context. Because they are is used for identification, the names of the Contexts and the Data Instance values that are represented by each Item in a Context should be unique. Many Contexts and encapsulated Items can be uniquely named by the user, but some cannot.

The easiest way to explain the KnOS concept of named vs. unnamed is by comparing it to the relational model. When a normalized table of data (3NF) is assimilated by the KnOS, each column of the table is mapped to a KnOS Context. The KnOS then creates one encapsulated Item within each Context whose name=each unique, non-null cell value in the column, corresponding to a Data Instance in KnOS. This assimilates, as KnOS Items, each unique data value that is found in each column of the table. If 'color' were a column in the table, then 'color' would be the name of a KnOS Context (attribute or column), and the various colors themselves—pink, green, lavender—would be the Items referenced within the 'color' Context (i.e., "green" might be the Data Instance of a particular Item in the 'color' Context). If 'age' were a Context (attribute or column), then the cardinal numbers ascribed to age (1, 2, 3 . . . n) would be the age's Data Instances (i.e., "14" is an age Data Instance). Each unique data instance in a column (i.e., each discrete ASCII value) is a 'Data Instance' and each Data Instance is associated with an Item having a Vector Key reference. In the example in Drawing 13, "Structure of a KnOS Item", the Data Instance="Duane Lewellyn Nystrom, Esq.".

If the color 'brown' were encountered in two different columns of a 3NF table, it would be considered two different Data Instances, and two different Items would be created—one "brown" Item in each column. The two columns would, presumably have two different names, such as "hair color" and "eye color", which would be two different semantic contexts of relationship. Note that "brown" may be associated to a person in two very different and independent contexts—as the color of one's hair and as the color of one's eyes, independently. The KnOS would implement this, similarly, as separate Contexts—one named 'Hair Color' and one named 'Eye Color', and 'brown' would be the Data Instance of an Item in each one.

The Contexts created thus far may be considered as column-like Contexts. To record the row associations in the KnOS, we also need a KnOS Context to represent the rows. If the user can name the row values in a 3NF table, the table will typically be a primary relation with one attribute (column) as the PK of the table. In such cases, the one KnOS Context that represents the PK of the table is the row proxy for the table.

If a primary table on the relational model has a single column that serves as the PK, it is a named table. The values of the PK column uniquely identify each row of the table, or tuple of the relation. When a primary table is assimilated by the KnOS, the PK column of the table becomes the row proxy Context in the KnOS. As shown in Drawing 2, "Assimilating a Primary Relation", the 'Stock' primary relation has two columns—'Stock' and 'Price'. These would be assimilated into the KnOS as two Contexts named 'Stock' and 'Price'. Because 'Stock' is the PK of the table, or the unique identifier of the rows, the 'Stock' Context in the KnOS is automatically a row-like Context. It is not different in construct than any other KnOS container, but its Items represent the rows of the table that is being assimilated—one KnOS Item for each row in the Stock table.

In contrast, the 'Price' Context would have one Item for each unique, non-null cell value in the Price column. If "$9.99" appeared 252 times in the Price column of the table, the KnOS would only have one 'Price' Item of "$9.99".

This illustrates the named case—a primary relation with a single column that acts as a unique PK. If the table were a different kind of primary relation, say a 'person' table, and person's names were not unique, it would be necessary to have some other single column as the PK, for example, a social security number or employee number.

Whenever two or more columns are required as the PK of a 3NF table, the table is termed an associative relation in the relational model, meaning that it associates two or more tables, each of which are in 3NF. These are the FK relations. Drawing 3, "Assimilating an 'Associative' Relation", shows an associative relation whose tuples cannot be named by the user. This Stock-Order table associates two primary relations—Stock and Order. The PK of the Stock-Order table is Stock+Order. It is unlikely that any user would know this combination for each tuple of the relation, particularly if there were thousands of 'Stock' Items and thousands of 'Order' Items. The combination of associations between 'Stock' and 'Order' (the tuples of the associative relation) would be too great to memorize names for each row.

For example, no one would be expected to know that the 'Stock' Item "Pinto Beans" was associated to the 'Order' Item "1111". In such cases, the user might ask for a display of all 'Stock' Items associated to 'Order' Item "1111" and then pick the desired 'Stock' Item from the display. Or, vice versa, the user might ask for a display of all 'Order' Items associated to 'Stock' Item "Pinto Beans", and then pick the desired 'Order' Item from the display.

If there is no single name column on a 3NF table, as in an associative relation, a separate KnOS Context for the table's proxy must be instantiated in the KnOS. The name of this special row-like Context likely would be the name of the relational table. This is illustrated in Drawing 3, "Assimilating an 'Associative' Relation". The 'Stock', 'Order' and 'Qty' columns of the 'Stock-Order' relation are assimilated to column-like Contexts, as above with the primary relation, and then the Stock-Order table is assimilated, as a name proxy, to a 'Stock-Order' Context. Notice that the KnOS Items of this row-like Context have no real names, only artificial ones (1*, 2*, 3*, . . . n*). This is why it is called an unnamed relation.

Once the row-like KnOS Context of the assimilation has been identified, a binary association is established for the references of each column value of each row. This is illustrated in Drawing 5, "Assimilation of Relationships to KnOS Contexts". There are two row-like containers, one for the Stock-Order associative relation and one for the Stock primary relation, Contexts "3" and "1" respectively.

The row relationships embedded in the primary relation of the relational model are recorded in the 'Stock' and 'Price' Contexts as binary associations between the Items in each non-key attribute column, in the case 'Price', of each row and the Items in each column of the PK KnOS Context, in this case 'Stock'. This is accomplished using only the Vector Keys for Items which have been created for each data value in each column, as shown in Drawing 5. The same thing is done for the rows of the associative relation Stock-Order.

To summarize, if a tuple in the relational model has one column with a unique name (ID), it is considered a primary or named relation. When assimilated to the KnOS, a named relation will convert to one KnOS Context for each column of the table. The single column that contains the tuple names will map to a KnOS Context that will be treated as the row proxy for the table. If a tuple of the relational model has multiple attributes or columns in its PK, it is considered to be an associative or unnamed relation. For an unnamed relation, the KnOS will create an artificial Context to serve as the proxy for the relation. All of the data values in all of columns of the relation will be associated, row-by-row, from each column Context to this artificial (proxy) name Context.

The Dimension of Relationships (Semantic Context):

Associative classification is a fundamental concept to the KnOS. In the KnOS's typical embodiment, all associations between Items are classified into four natural categories, which correspond to the four default VK Sets for Item references. The four associative classifications are shown in Drawing 13 as 'parent', 'child', 'link' and 'related'. The following exposition of natural association types uses 'cat' as an example Item:

Parent: Item 'A' belongs to Item 'B' in the sense that Item B is the 'parent' or 'classification' of Item A. The subject Item belongs to the target Item or classification in the sense that a child belongs to a parent. If the subject Item were a 'cat', the target Items might be, for example, 'animal', 'feline', or 'pet'.

Child: Item 'A' has Item 'B' in the sense that Item A owns, spawns or classifies the target Item B, or in the sense that a parent has a child or children. For example, a cat has 'fur', 'sharp teeth' and 'claws'.

Link: Item 'A' does Item 'B' in that Item A engages in, activates, or is responsible for doing the referenced Item B. For example, cats 'eat', 'nap' and 'meow'.

Related: Item 'A' goes with Item 'B' in that analogy or societal conditioning relates Item A in some fashion to Item B. For example, in our society, cats are related to 'dog', 'mouse' and 'jazz' (i.e., 'cool' cats and 'hep' cats). This may be the weakest category of associative link, yet it can be extremely useful in broad concept searches. Additionally, items may be 'related' by analogy or similarity, such as single language synonyms or multiple language term equivalence.

The advantage to classifying all of the references to associated Items is primarily in reducing the number of Vector Keys that must be matched in a KnOS 'pooling' operation to determine the intersection of the Vector Keys, typically using a boolean AND operation.

For example, say that a medical laboratory tests tissue samples for antimicrobial susceptibility. The Data Instances of these tests would be unnamed, because the test is an associative relation in the relational model. The lab's computer system may give an 'artificial' name to each such test, for example, for billing purposes. The artificial name for a particular test might be "23A-3&44-2121222-Jason" and the KnOS will record the given artificial name as each test Item's Data Instance. However, no user will know, remember or recognize this Data Instance, so it is of no value in supporting access. Instead, a user trying to locate the test Data Instance="23A-3&44-2121222-Jason" would have to give enough clues to, hopefully, get close to identifying it. For example, a user might ask to see the tests that were run by "Jason Lee" on Jul. 12, 2002. That query posed with two clues might produce zero, one or many possible results. When the user sees all of the tests that Jason ran on July 12th, they should be able to spot the one that they seek. In this test example, the lab technician who performs the test and the date might be classified as a 'parent' link. When looking for Jason Lee's Tests on Jul. 12, 2002, the KnOS only has to 'pool' the 'parent' VK Sets of the test Item with the 'child' VK Sets of Jason and Jul. 12, 2002 to find Vector Key matches.

In practice, any mapping of classification to association type is supported by the KnOS. The four types listed above are for illustration purposes, and, while fundamental to human memory, are merely suggestions for how one may consider grouping associations by context.

Consider now, the precise semantic context of the relationship dimension. Most practitioners of the relational model use Peter Chen's Entity-Relationship model to design schemas and record semantic context (business rules). In the vast majority of all cases, the business rule will be "is" or "has". The question is whether the semantic context is actually helpful. Consider the semantic model equivalent shown in Drawing 8, "Comparison of Data Representations":

| <Association> | | |
|---|---|---|
| Subject | Target | Semantic Context |
| Price | Stock | Is-Price-Of |
| Stock | Price | Has-Price-Of |
| Stock | Stock-Order | Is-Ordered-On |
| Stock-Order | Stock | Is-For |
| Order | Stock-Order | Has-Stock-On |
| Stock-Order | Order | Is-On |
| Qty | Stock-Order | Is-Qty-Of |
| Stock-Order | Qty | Has-Qty-Of |

In each case above, the semantic context (the business rule) is a combination of "is" and "has" with the subject or target values. This example holds true in the vast majority of all real-world implementations of the relational model, which is why no commercial RDBMS implements the semantic context from the E-R model. This semantic context is not a good candidate for partitioning or classifying associations, which means that it cannot reduce the volume of Vector Keys of association that must be searched, which means that it is of no benefit to the performance of a DBMS. However, re-qualifying the semantic contexts as follows can yield significant performance improvements:

| <Association> | | |
|---|---|---|
| Subject | Target | Semantic Context |
| Price | Stock | Is-Price-Of |
| Stock | Price | Has-Price-Of |
| Stock | Stock-Order | Was-Ordered-On |
| Stock-Order | Stock | Was-For |
| Order | Stock-Order | Relatesto-Stock |
| Stock-Order | Order | Relatesto-Order |
| Qty | Stock-Order | Is-Qty-Of |
| Stock-Order | Qty | Has-Qty-Of |

Dictionary System and ASCII-Bet Conversions:

The dictionary system is a standalone Repository that maintains sorted lists for the ASCII-bet, which includes every character of the ASCII set (1-255) and, consequently, for every letter of the alphabet (upper and lower case), single digit number (0, 1, 2, 3, 9), etc. There are many different ways that a KnOS dictionary system can be implemented. There is also no theoretical limit on the number of dictionaries that can be added. One could add a new ASCII-bet dictionary for every science or language or phrase in a language. Also Uni-Code-bet dictionaries can be implemented in support of Asian languages or other complex character set based bodies of knowledge. In addition, dictionaries can be created to embody any token or symbol set, as well as any value set. The following is one type of ASCII-bet implementation, which illustrates advantages of the architecture, but is not meant to limit the scope or diversity of possible dictionary implementation methodologies or techniques.

As shown in Drawing 15, "ASCII-betical Conversion", it is determined that access to Repository #6 is sufficiently fast when it is based on the first two characters of the ASCII value of each Item's Data Instance. If that assumption ever proves to be wrong, more letters of the Item's Data Instances can be indexed. As a result, two dictionary Contexts are placed into Environment #1, Repository #6 (Context #1 and #2). The first Context is assigned to the first letters of all Context names and Item Data Instances in the Repository; the second Context is assigned to all second letters of all Context names and Item Data Instances. The Multi-Dimensional References for the two dictionary Contexts would then be {1,6,1,0} and {1,6,2,0}.

Each of the Dictionary Contexts would have exactly 255 Items. ASCII characters need not be translated to the base 10 integers 0-255 because eight-bit ASCII characters can be read natively as eight-bit binary integers from '00000000' to '11111111', or from 0 to 255 base 10. The base ten digits 0-9 are ASCII characters #48-#57. The 26 capital letters of the alphabet are ASCII characters #65-#90, while the lower case versions are #97-#122. The first two ASCII characters of "Duane Lewellyn Nystrom, Esq.", namely capital "D" and lower case "u", are ASCII characters 68 and 117, respectively.

When the Item whose Data Instance is "Duane Lewellyn Nystrom, Esq." is added to the person Context with Vector Key {1,38,1,5}, Vector Keys for the first two letters of the Item's Data Instance are also added to each of the two dictionary Contexts. The Vector Key the Item whose Data Instance is "Duane Lewellyn Nystrom, Esq." (i.e, {1,38,1,5}) would be added to each of the two dictionary Contexts within their child VK Sets for capital 'D' ({1,6,1,68}) and lower-case 'u' ({1,6,2,117}) respectively. In other words, Items {1,6,1,68} and {1,6,2,117} would each contain the Vector Key {1,38,1,5} within their 'child' VK Set, and Item {1,38,1,5} would contain the Vector Key for Items {1,6,1,68} and {1,6,2,117} within its 'parent' VK Set.

The first step to retrieve the KnOS Vector Key for "Duane Lewellyn Nystrom, Esq." is to retrieve the KnOS Items for ASCII capital 'D', {1,6,1,74} and ASCII lower-case 'u', {1,6,2,117} from Contexts {1,6,1,0} and {1,6,2,0} respectively. Many Items from many different Contexts will start with the ASCII character capital 'D', and many Items from many different Contexts will have the ASCII character lower-case 'u' as the second letter of their Item's Data Instance. However, many fewer Items will meet both conditions, and even fewer will belong to the person Context, {1,38,1,0}.

The VK Sets for ASCII capital 'D' and ASCII lower-case 'u' are placed into a vector pool with the target Context (E,R,C,I)={1,38,1,0} as control. The pooling operation determines which Vector Keysof the form {1,38,1,X} are contained in both VK Sets. Beginning with the lowest Vector Key element in the smaller of the two VK Sets that corresponds with the {1,38,1,X} control element, which in this case would be {1,38,1,5}, the KnOS will conduct an optimized binary tree search of the other VK Set looking for a match. If a match is found, as illustrated, the value will be moved to the answer pool This search will continue until all elements of the control form in the smaller of the two VK Sets have been searched in the target VK Set. In the example illustrated in Drawing 15, two vector Keys conform to the pool criteria—{1,38,1,5} and {1,38,1,24}.

The next step is to issue a referenced fetch for each of the two Items {1,38,1,5} and {1,38,1,24}. This will return two Items, one with Data Instance="Duane Lewellyn Nystrom, Esq." and one with Data Instance="Duane Lee Guy, Jr." A simple string compare on the multiple ASCII values gives the desired result that the global Vector Key, of "Duane Lewellyn Nystrom, Esq." is {1,38,1,5}. This completes the process called ASCII-betical conversion.

Another method of dictionary implementation consists of a single set of ASCII coded Items in a Context. For each Item having a Data Instance composed of ASCII characters, one or more sets of ASCII indexed Embedded Elements as VK Sets, representing second and further character instance occurrence, are used. This has the advantage over the previous method of having the associations of second, third and latter characters already filtered by the fact of occurrence as elements under the first letter, so that the pooling operation is only done on the third and latter characters.

KnOS Operations:

Drawing 10, "KnOS Operations", shows an example of how the KnOS conducts core operations compared to the relational model operation depicted in Drawing 1. The hypothetical question being answered is—What is the total price of white beans on all stock orders? The relational model answers this question by (1) projecting 'Stock' and 'Qty' from the 'Stock-Order' relation; (2) selecting "White Beans" from the 'Stock' relation; and then (3) joining the projection and the selection. The result is extended and summed to get $53.80.

The relational discussion above excludes a discussion of indexing. For the KnOS, the indexing operation would constitute determining the Vector Key for "White Beans" from an ASCII-betical conversion performed on the dictionary Contexts, and a 'pooling' of the retrieved Item's VK Sets with the Stock Container. The process is depicted in Drawing 15, "ASCII-betical Conversion", and is as described above. Once the KnOS Vector Key for "White Beans", {0,6,1,3}, is determined from the ASCII-betical indexing operation, the KnOS would answer the same question with referenced fetches as follows:

Step #1—Which stock-orders are for white beans? Fetch Item (0,6,1,3), having the Data Instance="White Beans" from the 'Stock' Container. Extract from Item {0,6,1,3} any VK Set references to the 'Stock-Order' Context—Vector Keys of the form {0,6,3,X}—namely {0,6,3,1} & {0,6,3,5}.

Step #2—What are the associated quantities? Fetch Items {0,6,3,1} & {0,6,3,5} from the 'Stock-Order' Context and extract any VK Set references to the 'Qty' Context, {0,6,5,X}. The answer is {0,6,5,1} & {0,6,5,3} respectively. Fetch {0,6,5,1} & {0,6,5,3} from the 'Qty' Context to get the Items having the Data Instances "1" and "3", respectively.

Step #3—What is the price of white beans? (from (1) above . . . ) Extract from Item {0,6,1,3} the VK Set references to the 'Price' Container—Vector Keys of the form {0,6,2,X}—namely {0,6,2,3}. Fetch Item {0,6,2,3} from the 'Price' Container to get the Item having the Data Instance "$13.45".

The KnOS results are extended and summed to get $53.80. The step of fetching Item {0,6,2,3}" is a referenced fetch because Item {0,6,2,3} is both a reference and a KnOS address.

The above was accomplished by directly looking up the required information. The KnOS also has a slightly different version of this operation called 'pooling'. Say that we ask a more difficult question like—'Which of the stock-orders for Pinto Beans have a Qty<=2'. The operation to answer this question is depicted in Drawing 11, "An Example of Pooling". In the 'pooling' operation, VK Sets are extracted from the database using the given selection criteria (stock-orders, Pinto Beans, Qty<=2) and placed into a 'pool' for a direct integer comparison using boolean operations. The first step is to retrieve from the Qty Context those Items whose Data instance is <=2, and place them into the 'pool'. Next, retrieve from the Stock Context the Item for "Pinto Beans" and place it into the 'pool'. Finally, retrieve the Vector Key of the Stock-Order Context, namely {0,6,3,0}. Perform an integer compare on the first 3 components of the Vector Keys (i.e, {E,R,C}) using a pooling operation known as 'filtering' to get the result, in this case {0,6,3,X}. The result of the integer compare, {0,6,3,2} is the answer to the question.

Location of Data on the Physical Media:

Each Repository of a KnOS implementation is stored as a container that resembles a file in a disk based or a memory based system. Only an Item's Vector Key is necessary to locate it on the physical media. If an Item's Vector Key is not known, it must first be determined using the from the ASCII-betical conversion process (depicted in Drawing 15, "ASCII-betical Conversion", and described above). There are six steps to retrieving an Item such as {0,6,8,2} based on its Vector Key, as shown in Drawing 16, "Locating Item {0,6,8, 2} on the Physical Media":

Step #1—Context Index. The first database artifact to retrieve from a Repository file is the Repository's Context Index, in this case for Repository #6. The Context Index contains an ordered series of two part entries, one entry for every Context in the particular Repository. The first part of the Context Index entry is the actual number of the Context within the Repository, which is the 'C' dimension of the Vector Key. The first four entries shown here represent the first four Contexts of Repository #6—Contexts #1, #2, #7 and #8. Because the Context Index is ordered, it is clear from the example in Drawing 16 that Contexts #3, #4, #5 and #6 have been deleted or simply never added for some reason. The second part of the Context Index entry is the sequence of each Context in the Context Locator. The second part of the entry shows that Context #8 of Repository #6 is the third Context in the Context Locator.

Step #2—Context Locater. The next artifact in the Repository file is called the Context Locator, which has the same exact physical construct as the Context Index. Like the Context Index, the Context Locator also has one two-part entry for each Context in the Repository, but the Context Locator is not an ordered list. The Context Locator is an indexed list which is indexed by the Context Index. Step #1 above determined that Context #8 of Repository #6 is the third Context entry in the Context Locator list. The first part of Context #8's entry in the Context Locator list (i.e., the '#1') shows that Context #8 immediately precedes Context #1 on the physical media. The second part of the Context Locator entry shows that Context #8 starts on the fifth 'page' of the Context sector of the Repository file. This is also called an 'offset of 5'. Page size is defined to be whatever is optimal for Repository management with regards to the data object granularity and the average size of most KnOS objects. In order to minimize wasted space and maximize access throughput, and handle dynamically variable length Items, a fairly fine grain approach is typically used. Page size, however, can be defined at runtime to suit whatever storage medium is used, and whatever data object size is typical. and adapted to the primary purpose of the KNOS, whether it be a read only data-mart or data mining application or a real-time dynamic data model with many items updates per transaction In a multi-media application, large data-objects such as image or sound files may define the typical page size. Regardless of application, one rule is that no two KnOS objects, whether Context or Item, are ever contained within the same page. If a given object does not fill up a page, the remainder of the page is left blank.

Step #3—Context BLOBs. Each Context in Repository #6,and each Item of each Context, is stored on the physical media of Repository #6 as a BLOB. Based on the location that was obtained in Step #2 above (i.e., an 'offset of 5'), buffer a track/sector of disk beginning with the fifth page of the Repository's Context section. The buffered disk track/sector will contain more information than the 4 pages occupied by Context #8. The header for Context #8 begins on the fifth page of the Context section of the Repository's file. The first four words are the Context's Vector Key, in this case {0,6,8,0}, followed by the Context's item map. The item map for Context #8 indicates where within the Context are located the Item Index and the Item Locator. These two lists are similar in construct and purpose to the Context Index and the Context Locator.

Step #4—Item Index. Based on the item map in Context #8, retrieve the Context's Item Index from the Context #8 BLOB. The Item Index contains an ordered series of two part entries, one entry for every Item in the particular Context. The first part of the Item Index entry is the actual number of the Item within the Context, or the I dimension of the Vector Key. The first four entries shown here represent the first four Items of Context #8—Items #1, #2, #5 and #6. Because the Item Index is ordered, it is clear from the example in Drawing 16 that Items #4 and #5 have been deleted. The second part of the Item Index entry is the sequence of each Item in the Item Locator. The second part of the entry shows that Item #2 of Context #8 is the third Item in the Item Locator.

Step #5—Item Locater. The next artifact to retrieve from the Context BLOB is called the Item Locator, which has the same exact physical construct as the Item Index. Like the Item Index, the Item Locator also has one two-part entry for each Item in the Context, but the Item Locator is not an ordered list. The Item Locator is an indexed list which is indexed by the Item Index. Step #4 above determined that Item #2 of Context #8 of Repository #6 is the third Item entry in the Item Locator list. The first part of Item #2's entry in the Item Locator list (i.e., the '#6) shows that Item #2 immediately precedes Item #6 on the physical media. The second part of the Item Locator entry shows that Item #6 starts on the seventh 'page' of the Item sector of the Repository file. This is also called an 'offset of 7'. Again, page size is defined to be optimal for the size of most KnOS objects because no two KnOS objects, whether Context or Item, are ever contained on the same page. If a given object does not fill up a page, the remainder of the page is left blank.

Step #6—Item BLOBs. Each Item in Context #6 and each Context of the Repository is stored on the physical media of Repository #6 as a BLOB. Based on the location that was obtained in Step #5 above (i.e., an 'offset of 7'), buffer a track/sector of disk beginning with the seventh page of the Repository's Item section. The buffered disk track/sector will contain more information than the 2 pages occupied by Item #2. The header for Item #2 begins on the seventh page of the Item section of the Repository's file. As always, the first four words of an object are the Item's Vector Key, in this case {0,6,8,2}, followed by the Item's Item map.

This completes the steps necessary to locate Item {0,6,8,2} on the physical media. Note that the preceding six steps are a logical discussion of physical media access. The Context BLOBs (from Step #3) and the Item BLOBs (from Step #6) may be thought of as separate file sections for 'offset' purposes. In fact, all six of the KnOS objects shown in Drawing 16 are intermixed on the same contiguous physical media within the file that is Repository #6. Contexts and Items look very similar in structure and are distinguished by an 'object type' in the object header. Also the 'offset' (locator) can be an 'effective address', wherein the referenced page ID is derived indirectly in accordance with the storage medium's internal architecture.

Update of the Physical Media:

A KnOS 'Repository' consists of a file of BLOBs. The BLOBs are independently accessed by reference as shown in Drawing 16, "Locating Item {0,6,8,2} on the Physical Media-".Context BLOBs and Item BLOBs are intermixed in the Repository file and in no particular sequence, as shown in Drawings 19 and 20, "Updating Item {0,6,8,2} on the Physical Media (I & II)". The BLOBs do not require sequencing for the KnOS to operate efficiently because all of the necessary information is encapsulated in each BLOB. Sequence independence is one of the core advantages that the KnOS gains from its specific form of encapsulation. Each BLOB of the KnOS data structure is indexed for location. The sequence of the BLOBs on the disk is of no consequence to KnOS operations because each BLOB is fully encapsulated with all associated and relevant knowledge to that particular BLOB.

Each BLOB, whether Context or Item, is assigned to a certain number of allocated pages on disk, so that the last page of each BLOB may contain some empty space. Page size may be established to house most BLOBs on one page with as little empty space on the page as possible. In a preferred embodiment, the page size is determined based on the optimization requirements of the application, the average BLOB size and the structured nature of the physical medium on which the BLOBs are stored.

All BLOBs may grow or shrink in size with each update. If after an update, if a BLOB still requires its assigned number of pages, then it will be written back to disk in its updated format and into the same block of pages. If after update it requires more pages or fewer pages than its previous page allotment, the KnOS will evaluate the minimum work required to update the disk. The variety of sizes of BLOBs varies according to the application. In general, the larger the BLOB, the less desirable it is to move it. If an expanded BLOB will still fit in its own space plus the allotted space for the next BLOB, the expanded BLOB may be returned to its original offset position and the next BLOB may be moved out of its way.

The KnOS can maintain a memory-resident 'registry' of all allotted contiguous page blocks by PageID reference, with an associated Index into a locator of the occupying Item's Vector Key. This physical to logical mapping of every Item allows for differing schemes of memory and disk management to be implemented using a fully associative model, one that is entirely contained within the KnOS and thus one that requires no third party disk operating system or memory management system to run.

An additional empty space management Context can be instantiated in each Repository with a set of Items whose Data Instance is the number of contiguous pages available, for example, the Items whose Data Instance is equal to "1" is the list of all 1 page allotments, etc., and where each Item has as a VK Set, Page Locator references as indexes to all de-allocated contiguous page blocks within the used part of Repository file where the size is each Item's Data Instance.

If there is a more or less even distribution of BLOB size growth and reduction, the following space registry scheme may be preferable:

In this implementation, the KnOS will simply relocate an updated BLOB on disk. To do this, the KnOS indexes the Empty Space Context's Item whose Data Instance is the number of pages required for the updated BLOB. From that Item's PageID reference list, it then gets the PageID of the last added contiguous page block of the required number of pages and copies the updated BLOB to the new location, updates the appropriate Locator reference to the BLOB item and removes the PageID from the Empty Space Context's Item's Page-ID reference list. The KnOS then adds the previously occupied pages block to the Empty Space Context's Item's whose ID is the number of pages, PageID reference list.

By example, if a KnOS object currently requires 5 pages and is updated to require 7 pages, the KnOS will first check the space registry to see of there are any available 'offsets' with seven contiguous pages. If so, the KnOS will (a) take one of the available 7-page offsets; (b) delete the new space from the space registry; (c) write the updated KnOS object to that location; (d) update the second half of the entry in either the Context or Item locater with the new offset location; and (e) add the old, vacated 5-page offset location to the open space registry. If no open space is available of the exact number of pages required, the KnOS will append the updated object to the end of the file, as shown in Drawing 19.

Over time with this disk management scheme, some unallocated pages (see Drawing 19 for an example) will develop throughout the Repository file. As long as total disk space is not an issue, these holes present no issues to the KnOS. Unlike an RDBMS, the KnOS throughput efficiency does not degrade significantly as the disk becomes disorganized; the sequence of the BLOBs on disk is immaterial to the access scheme. As far as the KnOS is concerned, the disk file is inherently disorganized.

If the disk utilization becomes unacceptably low to the customer, the KnOS may begin a background operation to copy the BLOBs of the Repository to a new file in such a way as to eliminate any unallocated pages between BLOBs. There is no attempt made to sequence the BLOBs by reference ID. However, the BLOBs can be copied according to their Item ID order within their Context. This would linearize all the items in a Repository, which could reduce disk head seek time if Context contents are often requested in their entirety from the Repository. Otherwise the existing BLOB sequence will be copied into the new disk area. The intent of the copy is to get the BLOBs arranged end-to-end, eliminating any unallocated pages between BLOBs. This may be done without disrupting any current operations of the KnOS. If any BLOBs that are being moved are accessed by the operating system, the updates are simply cached until the end of the copy process and then the cached updates are written to disk.

In an alternative scheme, an 'eviction' method as shown in Drawing 19, is used. With this method the unallocated page problem is virtually non-existent. As each Item grows, the space it needs to grow is provided by moving the Item(s) occupying the space in its way out of its way, either to the empty space at end of the used part of the Repository or to an empty page block of matching size found in the space registry, if it is activated. The resulting space is then allocated to the grown Item. Since the Items tend to grow in most applications, whatever empty space an Item acquires through clearing the way, eventually gets used by the Item as it continues to grow. In this method, the space left by deleting an Item can either be allocated to the Item that precedes it in the memory or it can be added to the space registry for reallocation to new or moved Items.

Content Awareness:

A KnOS implementation can support key word search and limited text search capability as part of the core embodiment of a structured data application. Say, for example, that an enterprise with a structured data application also has a requirement to provide text search and keyword search capability on all employee resumes. Following is how that would be accomplished in the KnOS.

First, each Person's résumé is added in multi-page PDF format (a © and ® of Adobe Systems) as an embedded Item in the person Item. The résumé would then appear similar to the embedded items in Drawing 13, "Structure of a KnOS Item" (i.e., the phone number and the street address). The PDF of the résumé is simply stored as a BLOB or a compressed BLOB inside each person's Item.

The second step is to establish and populate a 'Keywords' Context. This Context will include one Item for each non-trivial word (not conjunctions, articles, etc.) in all résumés. The word itself is the Item's Data Instance for each Item in the Keywords Context. Whenever a new or revised résumé is added to the person Context, all previous associative keyword references for the particular person are removed and a new associative reference for each and every unique non-trivial word in the résumé is added to the Keywords Context, and, of course, bi-directionally to the particular person's Item. Each Item in the keywords Context will then include a Vector Key to the correct person Items in the person Context. For example, if the résumé word is 'carpentry', the keywords Item whose Data Instance='carpentry' will contain specific a VK Set of Vector Keys to all persons that have the word 'carpentry' in their résumé.

To conduct a text search on the résumés, the user would be prompted to enter a string of words for searching. Each search word would first be converted in the ASCII-bet to determine the keyword Item Vector Keys for each search word. (see Drawing 15, "ASCII-betical Conversion" for an example of how this is accomplished). The correct keyword Item for each search word is then 'pooled' with the person Context to determine which person Items have a résumé with those exact words. This procedure is identical to the 'pooling' operation depicted in Drawing 11, "An Example of Pooling". The result of the pooling operation is the list of Vector keys for all persons whose résumé possess all of the search keywords. The list of person Data Instances may be returned to the user or a simple retrieval of the person Items will produce the actual résumé as embedded PDFs.

Adding a résumé in PDF format to each person Item will add considerable size to each person Item. If the routine use of the person Item does not require a résumé it might be advantageous for throughput efficiency to embed the actual PDF of the résumé in a separate tag set Context called Résumé (see below for an explanation of tag set Contexts). Then, actual résumé PDFs could be retrieved only when needed and not each time that a person Item is retrieved. In fact, this is part of the generalized test for whether or not something should be included as an embedded item in the base Item.

Assimilating Legacy Databases to KnOS Databases:

As a practical matter, nearly all enterprises have a legacy repository of data in a tabular format. The usefulness of the KnOS invention as a DBMS is judged in large measure by its ability to absorb or assimilate large amounts of legacy data stored in tables. For the most part, this legacy data exists in uncoordinated flat files and not in an idealized normal (3NF) format. The KnOS works best when it absorbs fully normalized relational structures.

A set of normalized (3NF) relational structures and the associated data can be converted or assimilated into KnOS Contexts and Items by a well-defined process. Relational databases consist of three types of normalized relations (tables)—named (which is to say primary relations), unnamed (associative relations) and lookup—and each is assimilated to the KnOS differently. This section first describes how the relational database depicted in Drawing 1., "Relational Data Model", would be assimilated to the KnOS. Because most legacy applications use flat files (not relational tables), the remainder of the section describes how a flat file is processed to mark it up as though it were a relational database for assimilation purposes.

Assimilating Named (Primary) Relations:

A name is a unique identifier that is given to each tuple (row) of a relation (table). For something to qualify as a name, it must be unique and they user must be able to recognize it. It is a fact of life that users can name some relational tuples and not others. This is because some relations are too complex for users to name. Unnamed tuples can only be described by giving clues to their existence.

In the relational model, a named relation is most often called a primary relation. A special case of named relations, lookup relations, are not considered to be primary relations. For these, see the section on "Assimilating Lookup Tables" below. In Drawings 1 and 2, the Stock primary relation is a named relation whose tuples are named 'Pinto Beans', 'Kidney Beans', 'White Beans' and 'Wax Beans'. All other unique columns of a named relation are assimilated as one column to each Context. As previously stated, a KnOS Context is analogous to a relational column or attribute.

As shown in Drawing 3., the Stock primary relation would be assimilated into two KnOS Contexts—one Context for the 'Stock' attribute and one Context for the 'Price' attribute. If there were more attributes in the Stock relation, each unique attribute would have its own Context in the KnOS. If the context is the same, attributes are assimilated into the KnOS on a unique basis. If the 'Price' attribute appeared in four different relations in the same relationship context, for example, the price of something, the KnOS would only have one 'Price' Context. Next, each tuple in the Stock primary relation is assigned to an Item in the named attribute Context of the KnOS, which in this case is the 'Stock' Context. Each of the named rows must have an Item in the named Context. Four rows in the Stock relation means four Items in the 'Stock' Context, one for each named Item, as shown in Drawing 2. For all other attributes in the primary relation, one KnOS Item is created for each unique value of the attribute. For the 'price' attribute, there would be one Item for each different price. In this case, four prices means four Items. If 'Pinto Beans' and 'Kidney Beans' both cost $11.10 per case, then the 'Price' Context would only have three Items (i.e., $11.10, $13.45 and $18.72).

Each tuple of the named relation represents a lot of embedded relationships. To record the relationships within each tuple, VK Sets are inserted into each Context to fully describe the association between 'Stock' and 'Prices'. The complete assimilation is depicted in Drawing 5. Each named relation would be assimilated in this fashion.

Assimilating Unnamed (Associative) Relations:

In the relational model, an unnamed relation is most often called an associative relation because it is used to describe a complex association among relations, which are defined by FKs. Due to its complexity, an associative relation typically has no convenient names by which to refer to the individual tuples. As shown in Drawing 3, "Assimilating an 'Associative' Relation", the Stock-Order relation is associative. It associates named Stock ('Pinto Beans', 'Kidney Beans', 'White Beans' and 'Wax Beans') to named customer order numbers (#1111, #1117, #1118, and #1119), as shown at the bottom of Drawing 8, "Comparison of Data Representations". The associative relation Stock-Order associates two named relations (Stock and Order), but is not, itself, a named relation, meaning the users cannot directly name the separate tuples of the relation.

Relative to the Relational Model, the KnOS design requires a named Context for every relation to represent the tuples of the relation. So, if a given relation is unnamed—the tuples cannot be uniquely identified by a single PK attribute—then the KnOS will require a separate, proxy named Context for the particular relation. As shown in Drawing 3, the proxy 'Stock-Order' Context in the KnOS has no name on the Items (for the same reason that the relational tuples are unnamed). Other than creating a special proxy Context for the relation, an unnamed relation is assimilated in identical fashion to a named relation.

The difference between named and unnamed relations is most obvious in Drawings 2 and 3. A named relation is assimilated as one KnOS Context for every attribute of the relation with a distinct context; an unnamed relation is assimilated as one KnOS Context for every attribute of the relation PLUS one proxy named Context for the unnamed relation itself In Drawing 3, the proxy Context is Context #3: Stock-Order.

It should be noted that the so-called proxy Context for unnamed relations is only a proxy in a relational sense, which is to say that compared to relational theory it is a proxy for an unnamed relation. As far as the KnOS is concerned, it is a Context that is indistinguishable from any other Context. If one were creating a data model from scratch, with no relational model as a precedent, the rule would not apply. Instead, the KnOS model would contain one row-like Context for every concept and one column-like Context for every attribute with a distinct context.

An associative relation assimilates into one KnOS Context that represents the relation itself, and one KnOS Context for each of the unique attributes of the relation. The Stock-Order relation assimilates to a proxy 'Stock-Order' Context and one KnOS Context for the 'Stock', 'Order' and 'Qty' attributes in the relation. As with Drawing 2, Vector Keys are then concatenated into VK Sets and encapsulated in the containers to reflect the relation that binds the three attributes together into a relation.

Drawing 5, "Assimilation of Relationships to KnOS Contexts", depicts how the named and unnamed relations would appear in the KnOS after assimilation. The two relations at the top of Drawing 5 are very much application-dependent in terms of their structure. The five KnOS structures below the relational relations in Drawing 5 are all the same and have no dependence on the particular application. Each Item has the same exact physical structure—a self-reference Vector Key followed by a Data Instance containing the name (or name proxy) followed by VK Sets and any included Item Embedded Elements.

Assimilating Lookup Relations:

Relational database designs achieve attribute-level integrity through a special named relation called a lookup relation. A lookup relation is a trivial relation that is used to record the domain of allowed values for a given attribute. A lookup relation has two columns—an artificial kiey (AK), which is a proxy for the attribute value, and a name, which is the attribute data value itself. Permissions within the functional application will limit who can add, edit or delete values from a lookup relation. In each relation that uses such a domain-restricted attribute, the AK proxy is always substituted for the attribute data value.

Lookup tables are the first thing assimilated into the KnOS. Given that the KnOS does not assimilate AKs, each lookup relation assimilates to one KnOS container. When the named and unnamed tables that use the lookup relation are assimilated into the KnOS, the AK proxy relationship is removed in favor of a direct relationship to the containers that represent the lookup attributes.

For example, a relational application might choose to restrict the attribute 'Color' to just three values—'red', 'blue' and 'green'. To ensure that users of the application do not assign other colors to the relations, a lookup relation called 'Color' would be created with just three tuples—'red', 'blue' and 'green'. Each of these would be assigned a proxy attribute 'Color Code' (the AK) with values of '1', '2' and '3' respectively. Throughout the remainder of the relational database, the proxy attribute 'Color Code' {1,2,3} is used in lieu of 'Color' {'red', 'blue', 'green'} itself.

In this example, the KnOS would first assimilate the color lookup relation to a 'Color' Context with three Items whose Data Instances='red', 'blue' and 'green'. Each time that the AK 'Color Code' is encountered in assimilating a relation, the KnOS would eliminate the 'Color Code' {1,2,3} AK attribute in favor of the KnOS Vector Key to the 'Color' attribute, representing one of the three Items in the 'Color' Context {'red', 'blue', 'green'}. The associations from the relational database would be preserved but the AK 'Color Code' would not survive into the KnOS implementation. The KnOS-based functional application would have to institute similar permissions control over who could and could not add, edit or delete Items in the 'Color' Context. This would accomplish the same attribute level integrity that the lookup relation accomplishes in the relational implementation.

Assimilating Flat Files:

The preceding three sections describe how a fully normalized relational database is assimilated into the KnOS. But many database assimilations to the KnOS format will come from "flat files" as opposed to relational tables. A flat file is also a table, but it does not conform to the relational rules of normalization (named, unnamed or lookup). Flat files are organized instead by user "view" to support specific applications. As a result, flat files are too disorganized to assimilate directly.

To be assimilated into the KnOS format, a flat file must be first marked up as described in the following sections, a relational process called normalization. Once each flat file has been marked up and prepared as described below, it may be assimilated into a KnOS format as described in the previous sections. It is not necessary to first parse and separate flat files into relational tables before assimilating them into a KnOS format. Markup can be applied to the flat files to enable them to be assimilated by the software as though they were named, unnamed or lookup relational tables.

The following sections describe the process for analyzing and marking up flat files as though they were relational tables. To assimilate flat files, the KnOS requires a piece of special-purpose software called an assimilator that is capable of reading the flat file markup, described below, and converting the information from the flat file format into the KnOS format.

Identifying Unneeded Data:

The first step to converting a flat file is to identify the unneeded data. Over time, any computer system based on flat files will acquire unnecessary columns of data. These are columns of information within the flat file that are no longer used by the application software. The most straightforward and accurate way to identify unneeded columns of data is to map each element of the desired set of new user views to the various columns of the flat files. This process is called view modeling. A view is any end-user interaction with the information in the flat files, most typically screens, reports and interfaces. Once the flat files have been mapped to the "views" in this fashion, many of the columns in the flat files will likely be unmapped to any required capability. These columns of the flat files are candidates for unneeded data, which will not be assimilated.

The initial markup of unneeded columns must be checked with the users of the new application to confirm that the information is really not necessary. Most of the information marked as unneeded will be attributes of the legacy application that have been overtaken by events. The information was placed into the flat files to serve the legacy applications at some prior point in time. When the legacy application was changed to eliminate the feature, the flat file was not corrected to eliminate the unused information. The older the legacy application is, the more unnecessary columns of data will be contained in the flat files.

Often, the candidate unneeded columns of data are physical representations (flags, indicators, etc.) used by the flat files' application software to process information. Such flags and indicators may or may not be required by the new application. Each such flag or indicator must be verified against the new application's behavior model to make certain that the particular flag or indicator can be re-established by other means (software in the new application). If not, the column that contains the flag or indicator must be marked for assimilation.

Identifying Derived Data:

The second step is to identify derived data. Much of the information in the flat file that does map to the user views will be data values that can be directly derived from other needed columns of data. Derived data, such as numeric total columns, are placed into flat files to save computing resources. Whether the derived data is needed by the new application or not, it is never assimilated. Instead, the derived data is either derived by the user's application at runtime, or if the derived data will be stored, derived again by the KnOS at the time of assimilation. All columns of derived data in the flat files must be identified and marked as unneeded for assimilation.

For any derived data that will be stored in the KnOS, the file markup must contain the derivation algorithm. The assimilator software's pre-processor will attempt to recreate the derived data from the algorithm and report any differences relative to the derived data contained in the flat file. Any such differences should be checked with the user of the new application to ensure that the differences are valid (i.e., that the algorithm is accurate).

Resolving Composite Information:

Step 3 is to resolve composite information. Composite information in the flat file is a form of derived data that consists of concatenations of atomic attributes for special purposes like sorting and printing (or, often, for triggering special processing conditions). Each such column of composite information must be analyzed and resolved. Often, columns of composite information will contain one or more kernels of needed data that do not appear in any other column of the flat files. In these cases, the flat file should be preprocessed to extract the necessary kernel(s) of information from the composite attribute and place it into new columns of the flat file (for assimilation purposes). Once the necessary kernel(s) have been extracted to their own new columns in the flat file, the column of composite information is marked as unneeded (and not assimilated).

Marking the Copies of Record:

Step 4 is to identify replicas and mark the copies of record. The most difficult part of the assimilation process relates to synchronization errors among replicated columns of information. Columns of information (attributes) across the flat files likely will be replicated. A synchronization error occurs whenever replicated attributes have different values for the same primary key value. Synchronization errors must be identified and the copy of record must be marked for assimilation (i.e., which of the differing values is accurate). The remaining replicas of the attribute are marked as unneeded (and not assimilated).

The first step in this process is to identify the primary key of the replicated attributes. The KnOS assimilation pre-processor must then compare each of the unique values of the primary key to all of the values of the replicated attribute. In an ideal situation, for each single unique instance of the primary key all of the replicated attributes should have the same value (this is, after all, the meaning of replication). When the pre-processor checks for this condition it will likely find numerous violations, replicas that are not really replicas. No computerized process can determine which of these differing values is the accurate one. It may also be that the primary key has been assessed incorrectly and the replicas are not really replicas (e.g., different addresses actually may be billing addresses, invoicing addresses, etc.). In these cases, correcting the primary key for the replicated flat file columns will correct the synchronization error.

For true replicas that are out-of-synch, analysts must verify the synchronization errors with the user of the application and determine a disposition for each identified data integrity error. The best outcome is for the user population to determine that certain ones of the replicated columns are the copy of record (i.e., the column of data that will be assimilated), thereby allowing all other replicated columns to be marked as unneeded (and not assimilated). The user may require that each synchronization error be individually resolved. The results of this analysis must be preserved for use by the assimilation software.

Identifying the Normalized Tables:

Step 5 is to normalize the flat file. For each remaining needed column of information in the flat file, an analyst must identify its primary key (column or columns of information in the flat file that uniquely identify the values in that column). This exercise identifies the normalized relational tables within the flat file, because each different primary key represents a different normalized table. It is not necessary to parse the flat file into separate normalized table structures (normalized tables can co-exist within a flat file provided that each column of information is marked (associated) with its correct primary key). In the KnOS, each primary key will be uniquely associated to one row-like Context.

Identifying the Artificial Keys:

Step 6 is to identify and eliminate the Artificial Keys. Often, tables have Artificial Keys (AK), which are identification numbers invented to be unique. AKs are often substituted for PKs that would otherwise be long ASCII strings or might have uniqueness problems. For example, user name might be the real OK of a person table, but names are too long for indexing purposes and two persons might have the same name. If a convenient unique, numeric PK, like a Social Security Number exists, the flat file will typically contain it. If no convenient unique number exists to number a primary relation, the flat file may contain an AK for that purpose. If such AKs exist in the flat file, they must be identified as unneeded and not assimilated. Instead, identify the correct PK as the column or columns of user-accessible attributes for which the AK has been substituted.

Once the correct PK has been identified for each AK, any uniqueness issues in the flat file must be identified with a pre-processing run of the assimilator. If the correct PK for a given normalized table has the same value but different AKs, then the duplicate PK values must be resolved with the users of the application. A scheme must be determined such that, upon assimilation, the values will be unique. The resolution scheme may be nothing more than adding an integer at the end of the character string (e.g., John Paul Jones1, John Paul Jones2). The correct PKs in the flat file must be converted to unique values prior to resolving integrity errors.

Choosing Among Multiple Primary Key Candidates:

Step 7 is to select a PK when multiple candidates exist. Often a needed column of information in a flat file will have multiple candidates for its PK. When this occurs, analysts must determine the best way to assimilate the multiple keys. One of the candidates must be chosen as the principal key for the KnOS. All non-key columns and the remaining candidate PKs are associated to the principal key at the time of assimilation. For performance reasons, some care must be exercised when choosing the principal PK from among the candidates.

For example, user name and Social Security Number may be competing candidate PKs for a person table. Either could be used as the named row-like Context that is assimilated for the person table. The selection should be made based on which is more often used by the user to access records in the table. If the user most often accesses the person information by name, then person name is the correct Data Instance value for the principal key.

Once the principal key has been selected, the other PK candidates must be evaluated for treatment. If person name is the correct attribute for the KnOS's person Context, then the SSN must be closely tied to it. The SSN could have its own KnOS Context, particularly if it has significant independent access. However, it is more likely that every time the person's name is used the SSN is also required. If so, it might be advantageous for performance to treat the SSN as an Item Embedded Element in the Person Context. Such decisions should be made prior to assimilation.

Resolving Integrity Errors (Table-Level Integrity):

Step 8 is to establish table-level integrity. Once this markup has been completed, the flat file must be pre-processed to identify referential integrity errors. A referential integrity error occurs whenever a given value of a PK in the flat file occurs multiple times with differing values for the columns of data that the PK identifies. In other words, if a given PK identifies columns A, B and C and a given value (instance) of the PK appears multiple times, then the values of A, B and C must be the same for each occurrence. If not, it is a table-level integrity error in the flat file. Referential integrity errors can be one of two things—either the PK structure that was identified is incorrect or there are corrupted values in the flat file. Once the PK structure errors have been corrected, any remaining corrupted values should be verified and resolved with the user of the application.

Different user populations will have varying approaches for correcting such referential integrity errors in the flat files. Some will allow the assimilation software to arbitrarily choose one of the multiple values, such as, for example, the perhaps the first one encountered. Others will require that each referential error be resolved by analysis. In extreme cases, the users may actually reconstitute the flat file to eliminate the errors. The method used to resolve referential integrity errors depends on the degree of importance attached to accuracy in the particular instance.

Standardizing Lookups (Attribute-Level Integrity):

Step 9 is to establish attribute-level integrity. Many of the columns in the flat file will be identified as lookup values. In these cases, the user will specify a range of values for the attribute to establish attribute-level integrity in the new application. The range of values in the flat file almost certainly will not conform to the desired range of values for the new lookup attribute. The KnOS assimilation software has the capability to accept a user map of flat-file-lookup-values-to-standardized-lookup-values. The assimilator first compares the range of values in the particular lookup column to the standard range of values selected by the user for that column. Values that do not conform must be mapped to values that do conform. This process may necessitate changes in the standard list of values (i.e., some of the out-of-range values will be correct values that the user failed to identify when compiling the standard list). Once complete, the assimilator software will use this cross-reference mapping when assimilating any column labeled as a lookup.

This completes the preprocessing of the flat file. It is now marked in such a way as to conform to relational standardization rules for named, unnamed and lookup relations, and suitable for assimilation into the KnOS.

Extended Structures—Classification and Context:

In some applications, certain KnOS Contexts may have Items that are very complex in associative scope, having very large VK Sets. Extremely large Items are more difficult to process because their context is very broad. If the context of a given Context is difficult to process, the Context's VK Sets can be segmented into one or more tag set Contexts based on context or classification.

A KnOS tag set is a special type of Context that may be used to record a classification or taxonomy in the database. A tag set Context has the same physical construct as a standard Context except that it does not contain any independent Items. Instead, the Items in a tag set Context are effectively replicas or representatives of the Items in another Context, which is referred to as the base or basing Context of the tag set Context. The VK Sets in a tag set Context Item record either some subset or classification of the associations defined by the VK Sets in the corresponding basing Context Item or a distinct new set of associations applicable to the newly created context. In other words, a tag set Context records a specific context of associations, as subset of VK Sets, for the Items in it.

There are three types of tag set Contexts—standard, multi-path and composite. A standard tag set Context can be created from any standard Context. A multi-path tag set Context is based on another, standard tag-set Context. A composite tag set is composed of a selected collection of Items from one or more base Contexts. The following discussion describes the use of all three types of tag sets to enhance classification, improve context and improve performance.

It should be clear that context can only improve performance if the functional application can distinguish it. If a taxonomy or classification is invisible to the functional application making the access, then the application is incapable of accessing information by context. If the particular context is invisible to the application, then the KnOS has no basis to take advantage of the improvement from the context. Indeed, it would actually slow the KnOS down because it creates more places to have to look for things.

Standard Tag Set Contexts:

A standard tag set Context can be based on any standard KnOS Context. In the standard case, a tag set Context has the same number of Items as the basing Context, and the Data Instances of the corresponding Items are also the same. In this respect (number, Data Instances and composition of Items), the standard tag set Context is an exact replica of the basing Context. Next, some context is applied to the VK Sets in the basing Context. Based on the selected context, the conforming VK Sets or VK Set elements are moved from the base Context Items to the matching standard tag set Context Items. Whenever the software application operates in that given context, it accesses the tag set Context instead of the basing Context. When the application operates in some context other than the given context, it would use the basing Context or another tag set Context. The base Context is now very much simpler to use because the given context has been removed from it. A tag set is a KnOS classification tool that improves throughput performance and the general organization for both data and view modeling.

For example, the part Context in a manufacturing application likely would have extremely complex Item relationships, and, as a result, very large VK Sets. One likely classification or context of the associations in the part container would be the "bill of materials" (BOM). If desired, the BOM associations define by the VK Sets in the part Context can be segmented to a BOM standard tag set Context.

A standard Context KnOS called "part" would have as its Item Data Instances the part numbers of all parts. A tag set Context called BOM would be established such that it contains one Item for each part in the part Context, where each Item has the same Item Data Instance. The parent and child VK Sets in the part Context that represent the BOM associations could then be removed from the part Context and placed into the BOM tag set Context. All other VK Sets are left in the part Context. This has the effect of removing all of the BOM classification's complexity from the part Context, thus reducing the size of the Items in the part Context and improving throughput for any applications involving parts that are not concerned with BOM processing. Whenever an application needs the BOM, it would invoke the BOM Context instead of the Part Context.

The KnOS automatically maintains the one-to-one mapping between the Items of a tag set Context and its basing Context. In this case, application software may not add or delete Items from a KnOS tag set Context. Item adds and deletes are handled by the KnOS operating environment. though Items are never deleted, per se, they simply have null VK Sets. Items are only added to a tag set Context whenever an Item is added to the basing Context, and items are only deleted from tag set Contexts when the corresponding Item is deleted from the basing Context. For example, if an Item is deleted from the part Context, the KnOS will also delete all references to the part in the BOM Context, both the BOM Item itself and any VK Sets that reference it. The tag set Context is thus "slaved" to the basing Context.

There is no limitation on how many distinct associative contexts can be identified in a standard Context. A standard KnOS Context can be the basis for any number of tag set Contexts. For example, the part-vendor associations might also be removed from the part Context and placed into a tag set Context called part-to-vendor (PTV). Then, queries related to who can furnish a given part would invoke the PTV Context and not the part Context. In this manner, the vendor context would be segmented from the part Context. The same thing might be done to the vendor Context as well, thereby segmenting the part associations from the vendor Context to a vendor-to-part (VTP) Context.

A tag set Context can be created in one direction (e.g., PTV) without creating a matching tag set (e.g., VTP) Context in the other direction. The tag sets can be injected independently to improve context or throughput. If context or throughput are not improved, there is no need to inject a tag set to classify associations defined by VK Sets by context.

With the exception of the multi-path case described below, one tag set Context may not be based on another tag set Context. In the example above, the associations defined by VK Sets in the PTV Context would point only to Items in the real vendor Context, and the associations in the VTP Context would point only to Items in the real part Context. Items in the PTV Context would not reference Items in the VTP Context, and vice versa.

Such classifications/contexts can be injected, segmented or removed from the KnOS at any time. Thus, tag set classification is a powerful tuning tool in the KnOS. For example, if at any point in the process it is determined that the BOM associations are making the part Context needlessly complex or too slow to process, the BOM tag set Context can be created. Once created, the BOM tag set Context can be eliminated at any time, (if it is determined to be unneeded. The VK Sets of the BOM Context would simply merged with the corresponding VK Sets of the part Context and the BOM Context would be deleted.

The KnOS tag set technique works based on context. The more context there is in a KnOS database, the quicker it is to process. For example, it is much quicker to process BOM queries from the dedicated BOM Context than from an all-purpose part Context. This is because the BOM Context has a limited context. It can be invoked when needed and otherwise ignored. Operations against the part Context are not burdened by BOM associations. Also, it means that there is no KnOS contention between contexts.

It is important not to confuse the KnOS "classification" scheme with two similar throughput problems inherent in the relational model, namely sparsely populated matrices and row-level contention.

A sparsely populated matrix will occur whenever the attributes of a relation do not apply to all of the tuples. The relational approach for tuning this problem is to identify the different classifications within the relation and segment the sparsely populated parts of the "generic" relation into one or more "category" relations. In other words, put the database into normal form.

Row-level contention can be a problem if too many users are trying to use the same table and row at the same time. Segmenting the problem tables into separate physical tables based on context can often eliminate this type of contention.

The KnOS does not suffer from sparsely populated matrices or row-level contention because the KnOS has no matrices and no rows. Context, categorization and classification are very different things in the KnOS compared to relational modeling.

Multi-Path Type of Tag Set Contexts:

The most difficult problem in any enterprise database environment is query iteration, where dozens of independent retrievals may be required before a single request can be satisfied. This query problem is actually associative in nature, not relational. To learn whether A is associated to F, it must first be learned that A is associated to B, then that B is associated to C, . . . and so on until E associates to F. A-B-C-D-E-F is a multi-path composite of five discrete associations. Each of these associations is independent and cannot be determined a priori by any means. To learn that A is associated to F requires that five (5) completely independent queries be performed in succession: A-B, B-C, C-D, D-E, and E-F. This type of query is almost impossible to process if the underlying scheme is a complex network or hierarchy (i.e., a multi-path).

In such cases, the query "fans-out" to hundreds or thousands of possible pathways. These types of queries present severe workload problems to a DBMS because the iterations of the query cannot be performed in parallel.

The best real-world example of this iteration problem is in BOM processing. An indented BOM is a complex hierarchy of parts, often ten or more levels deep. A multi-level explosion is the hierarchical version of a left-to-right multi-path query. It retrieves all children, grandchildren, etc. of a given part. A multi-level implosion ("where used") is the hierarchical version of right-to-left multi-path query, or a query that points toward the source of the network, retrieving all parents, grandparents, etc. of a given part Item. To learn whether part Item A is used in the manufacture of part Item B, or vice versa, can be a complex query with dozens of iterations. Unfortunately, such queries tend to be very popular with users and, thus, typically represent a high percentage of the computer workload in a manufacturing or network environment.

In the KnOS, all such queries can be reduced to a single iteration through the use of a special type of tag set Context called a multi-path (or m-p) type. In the manufacturing example above, m-p type tag set Context might be called "Multi-Level". The Items in the Multi-Level tag set Context would be replicas of the Items in the BOM Context, which are replicas of the Items in the parts Context). For each part Item in the new m-p type tag set Context, the parent VK Sets would include Vector Keys for all parts from the "where used" multi-level implosion for the Item, while the child VK Sets would include the Vector KEys for all parts from the multi-level explosion for the Item.

This m-p type tag set Context could answer any BOM type of question in a single iteration. For example, does Part A have a BOM relationship with Part B? After learning the KnOS References for A and B, this query can be answered directly by retrieving either Item, A or B, from the Multi-Level Context and checking to see if it includes the Vector Key for the other in one of its VK Sets. Do Parts A and B belong to any common Parts C, D, E . . . at any level and, if so, which ones? This seemingly simple query would have such staggering complexity to process that it likely would not be programmed for use in a relational application. In the KnOS, the query can be answered simply in a single iteration of the Multi-Level Context—retrieve the Items for A and B from the Multi-Level Context and compare the VK Sets for matches.

Of course, each revision to the BOM hierarchy (e.g., the BOM tag set Context) would require numerous multi-level implosions and explosions to correct the associations defined by VK Sets in the Multi-path tag set Context for all affected parts. Updating an m-p type of tag set Context is not easy, but each change in the basing Context, BOM, can be handled as an atomic operation on the m-p type Context, processing as workload permits. Performing the two operations (implosion and explosion) upon loading or correcting each piece of hierarchical information is significantly more efficient for the DBMS than performing the two operations on demand each time that an iterative query is posed. By classifying needed associations in this manner, the KnOS multi-path type of tag set Context can improve the operating efficiency of a manufacturing application by as much as two orders of magnitude.

In the KnOS, a tag set Context can be designated as a multi-path type of tag set Context and based on a second classification tag set Context. The KnOS will automatically perform the explosions and implosions on the basing tag set Context to obtain the multi-path classification tag set Context and to keep it in synch during operations. The Multi-Level tag set Context in the example above could be established in the KnOS by instructing the KnOS to create an m-p type of Context based on the BOM tag set Context. No other application code is required; the KnOS environment takes care of creating the Context. Then, each time that a change occurs in the VK Sets of the basing BOM Context, the KnOS will automatically keep the VK Sets in the Multi-Level Context synchronized. Thus, query iterations can be eliminated in the KnOS by simply establishing a multi-path type of tag set Context for any hierarchical or network contexts that must respond to multi-path queries. The KnOS handles all ongoing operations associated to maintaining an m-p type of tag set without additional application code. A multi-path type of tag set Context is a supported KnOS feature.

A similar classification approach cannot be used in a relational implementation because the relational model has no convenient, compact structure to store and maintain such an associative classification structure. Any given part in the KnOS Multi-Level Context example above could have any number of VK Sets numbering into the thousands, which eliminates the use of a single relational table with one row per part. So, the relational implementation of the KnOS multi-path solution would be a table with two columns, such that each row of the table mimics the VK Sets in the Multi-Level Context. In simple terms, the relational solution would be the standard associative scheme using large quantities of "free vectors" housed in a table. Without a parallel vector processor, this table would process too slowly to be of much help to the iteration problem.

The relational tuning technique of "views" cannot be used to solve the multi-path problem because the relational DBMS cannot manage enough "views" at one time to solve the problem. A single relational "view" is essentially the result of an anticipated query. If the relational implementation were established with one view for each potential multi-path query, (which is, essentially, what the KnOS does, the relational processor would not be able to handle the view maintenance overhead. In short, the iteration problem caused by querying a complex multi-path structure, whether hierarchy or network, cannot be solved within the relational model or the standard "free vector" associative model.

The KnOS can achieve dramatic improvements in DBMS efficiency through two techniques. The KnOS equivalent of a relational "join" is significantly simpler to process and the multi-path tag set Context can be used to eliminate query iteration on complex networks or hierarchies. These two issues account for most of the performance problems in conventional DBMSs.

Composite Tag Set Contexts:

The final category of tag sets is called "composite". Composite tag sets, which are broadly useful for defining applications, can be formed in many different ways for different purposes. A composite tag set can consist of:

A complete clone of a base Context—e.g., a dictionary Context can be cloned;

A complete clone of a base Context minus the VK Sets;

A set of fully-cloned Items selected from any combination of Contexts;

A set of cloned Items selected from any combination of Contexts, minus their VK Sets—e.g., a view model.

Clones (replicas) within a composite tag set Context are automatically maintained by the KnOS subscription service based on the type of tag set. The following example illustrates the use of a #4 composite tag set Context:

The creation of an application requires that the user interface be defined, which is often referred to as view modeling. In view modeling, the collection of references that may be needed to construct a particular view of some data relationships will typically be from more than one Context. If one wishes to construct a view to support the needs of a particular user, all the display elements of that view can be represented as Items in a composite tag set. The associations among the display elements in that tag set are specific to that particular view and hence can be seen as belonging to the context of that view. That view can be a composite tag set. Its Items can be drawn from any Context where their base Items exist. Items in Contexts such as 'Web Display Elements', 'Web Pages', 'Manufacturers', 'Parts', 'Assemblies', and 'Consumer Items' can be drawn from the different Contexts and added to a Composite tag set in the following way: a new Web Page is created and added to the Web Pages Context.

The new Web Page is read from the container and used to create a new composite tag set with the same name as the new Web Page. Selected Display Elements are read from the Web Display Elements Context and copied, as representatives, into the new Web Page tag set . . . . See "KnOS Layers" for further on this example.

In data modeling, as in the standard tag set, it is often important to define multiple contexts for any given Item. To extend the BOM and parts example, where there are dozens, hundreds or even thousands of manufactured items that may use or contain a given part, at any level of its BOM hierarchy, a distinct composite tag set can be created for each and every manufactured item, and parts from many different parts Contexts can be added wherever they belong. Any individual part from any parts Context, say, from a particular manufacturer, can be added into every manufactured item's BOM tag set hierarchy wherever it belongs in that hierarchy. Some parts, such as washers or screws, may appear almost everywhere in every hierarchy.

Context and Scale:

Tag set Contexts can be created in one Environment or Repository (E/R) to improve context among geographically-dispersed KnOS implementations. For example, users in Environment 1 {1,0,0,0} and Environment 2 {2,0,0,0} will, more than likely, create relatively independent contexts when implementing a KnOS, even on the same application. In other words, very few of the VK Sets in {1,0,0,0} will contain Vector Keys for Items in Environment 2 {2,0,0,0}, and vice versa. This is because the users who are performing the implementations are not aware of the contexts in the different Environments and, for the most part, have no interest in them. The same feature may apply to Repositories as well. Within Environment 1, the users of Repository 1 {1,1,0,0} may have a different context from Repository 2 {1,2,0,0}.

One KnOS E/R can invoke tag set Contexts for Contexts or Items independently in a different E/R. Different rules apply to tag set Contexts that are invoked across E/R boundaries:

A tag set that crosses E/Rs can be invoked on any of three levels—"maintained", "non-maintained" or "localized". Standard tag set Contexts within a given Repository are always "maintained". If a tag set Context is "maintained", then the associations are automatically maintained current with or synchronized to the basing Context.

Within a given E/R, a tag set Context cannot be created from another tag set Context, but among different E/Rs both standard and tag set Contexts can be replicated such that they can be shared. A copy of a classification or taxonomy from one E/R can be replicated and placed into another. This gives a subscriber E/R's computing suite the ability to consult a tag set Context locally, thereby providing a local KnOS-supported window among different E/Rs.

If a non-maintained tag set Context is created in one E/R based on a Context in a different E/R, then the using E/R, for example, {2,0,0,0}/{2,3,0,0} is established as a "subscriber" in the publisher's (host) Context. Such a non-maintained tag set Context is a snapshot, accurate only at the time it is created. To update the snapshot, an application in the subscriber E/R must request an update or schedule an update request, at which point the subscriber E/R requests a new version from the publisher E/R. When the subscriber receives the new tag set Context version from the publisher, it replaces the current snapshot.

If a tag set is created across E/Rs on a "maintained" basis, whenever the host Context is updated, copies of the updates are broadcast to the list of subscribers to enable the replicas to be kept in synch. These publisher/subscriber activities can be invoked directly from the KnOS environment. Because the KnOS is built on a multi-dimensional reference with a universal format, the referencing between E/Rs is a relatively straightforward activity. Links or portals between E/Rs can be created and deleted as a routine part of operations.

If a tag set is created across Environments on a "localized" basis, then the Items represented in the 'local' view initially will only have VK Sets referencing other Items that have also been "localized" and represented in a 'local' tag set. Creating 'localized' representatives of Items in other Environments can be an iterative process or done as a block. The primary reason for 'localizing' Items is to create local contextual associations for those Items distinct from their source Environment associations, while still maintaining a relationship with the base Item in order to globally correlate all the 'localizations'. To further extend the BOM and parts example, suppose a manufacture of some consumer goods has a number of facilities in a number of countries. Some parts used in the manufacturing of the same consumer item may be from different manufacturers in different locations and hence different parts will be substituted in the "localized" tag set. Also "localized" BOM tag sets can be completely distinct in their associations yet have the same part Items in the same hierarchical positions. The same part may have a different distributor in every country. Its pricing will be in the local currency and lead times, quantity discount thresholds, and quantity minimums may all be different for each location. In this case, the "localized" tag sets will have different VK Sets for each of the parts in the BOM even though the parts and the hierarchies may be the same across all E/Rs.

KnOS Layers:

The KnOS is a 100% layered, fully self-referencing environment. Self-referencing means that all components of a KnOS application are stored in the database in standard Items, Contexts, Repositories and Environments. This includes all of the software—callable functions, database APIs, source code, etc. Even the Web forms are stored not as Java Server Pages or Active Server Pages, but rather are defined using Contexts, Items and VK Sets, just as with any other KnOS feature. Buttons and other active features on the Web pages include a KnOS Vector Key and not a URL. Prior to packaging a Web form for the browser, KnOS software converts the KnOS page description to HTML.

This is a true structureless environment compared to standard environments such as Sun Microsystems' Java™ standard (Java 2 Enterprise Edition™ or J2EE™) for Web computing. In J2EE, a myriad of Java classes must be invoked in the web application server space. The web application server must be both vertically (bigger processor) and horizontally (more servers) robust in order to respond to high transaction volumes. In contrast, KnOS components can be run anywhere in the network computing stack, as performance dictates. For example, the application itself and the associated web page composition may be run on the client's PC, the web application server or the database server. The executing location of KnOS computing components depends only upon the needs of the application and the amount of hardware provided.

In addition to flexibility in implementation and optimized performance, this design means that the KnOS does not rely on the HyperText Transport Protocol's (HTTP's) Uniform Resource Locators (URLs) to define the basic directory structure and placement of the application elements. When JSPs/ASPs are used, their location in the file system can very easily become chaotic. There could be many versions of the same page or code stored in different directories depending on where each developer chooses to place them. Whenever modifications to the application are performed, it is very easy to "lose track" of derivative instances of HTTP and code and simply "miss" them, introducing discrepancies and causing problems that are extremely difficult to track down and correct. With the KnOS, page definitions and their derivative versions exist one place, in the database, and can be changed while the application is running. This is allowed because each component part of a KnOS Web page is separately defined in the KnOS database using Items and VK Sets. Changing a page component Item or Items automatically changes all Web pages that use the Item or Items.

Enterprise Scalability:

The KnOS architecture defines the performance envelope for enterprise scalability. There can be dedicated nodes for the firewall, the inbound HTTP dispatcher, session managers, dictionary managers and data servers. Unlike the relational computing model, the KnOS does not require that intermediate query results be saved for continuity in each user session. As a result, HTTP dispatching is simple (availability/workload driven) and the number of processors dedicated to pooling, filtering and XML packaging can be expanded as required to handle growth in concurrent user sessions. The KnOS database operations are so efficient and so predictable that additional computing capacity typically is not required to service additional numbers of concurrent users. However, the number of database processors can be expanded across a loosely coupled cluster architecture either to service greater numbers of concurrent sessions or to service disk farms that measure into the terabyte range.

Enterprise Architecture:

Drawing 21, "KnOS Scalability", illustrates how a typical high-end site might be configured under worst-case assumptions. A range of loosely coupled processing nodes interconnected by a high-speed bus. HTTP requests are received at the firewall node. If cleared, the HTTP request is forwarded to a node dedicated to HTTP dispatching. There are "k" web application servers, where each can have a number of processors, depending upon the size of the concurrent user population that must be served and the degree of difficulty posed by the particular application in pooling, filtering and XML packaging. This example shows that two Repositories are dedicated to the dictionary, where $\{1,1,2,0\}$ is system-maintained replica (tag set) of $\{1,1,1,0\}$. Finally, there are 3–"n" Repositories dedicated to database service. Each of the database servers manages upwards to 100 GB, or so, of non-redundant data. Ordinarily, the application will support a logical partitioning scheme for database servers such that the web application server can know what data is located on what server. This example assumes no ability to partition the data logically. Items are scattered across the 3–"n" data server repositories based on when they were received or the workload associated to their access profile.

The typical scenario shown in Drawing 21 would work like this:

Step #1—an HTTP request is received over the Internet and processed at the firewall.

Step #2—if proper, the HTTP request is forwarded to the single dispatcher node.

Step #3—the dispatcher either handles logon or authenticates the session credentials embedded/encrypted in the HTTP message. If authentic, the dispatcher branches the request among the functioning web application servers based on workload. In this case, the HTTP request is dispatched to web application server #1 for servicing.

Step #4—web application server #1 establishes the session by parsing/decrypting the session credentials and the HTTP message.

Step #5—if valid, the HTTP message will require one or more pieces of information. Web application server #1 is allocated to dictionary server $\{1,2,0,0\}$ for servicing ASCII-bet search requests. Web application server #1 tasks Dictionary server $\{1,1,2,0\}$ with a set of ASCII values from the transaction, requesting ASCII-betical conversion. Server $\{1,1,2,0\}$ performs the requested ASCII-bet conversions and returns the requested Item Vector Keys to the session on web application server #1.

Step #6—web application server #1 receives the requested Item Vector Keys and issues a set of directed, referenced fetches to the data servers based on the Repository ID number in each Item Vector Key. In other words, the Item Vector Key identifies which server contains each required Item. The data servers for Repository $\{1,1,3,0\}$, $\{1,1,4,0\}$, and $\{1,1,n,0\}$ conduct the referenced fetches for the requested Items in the manner depicted on Drawing 21. The data servers return the requested Items to the requesting session manager, web application server #1.

Step #7—the session manager will receive the requested Items and conduct the indicated pooling/filtering operations, repeating step #6 as necessary to retrieve additional data.

Step #8—the web application server will then follow the instructions contained in the application code and retrieve any additional answer values that may be required from the data servers.

Step #9—the web application server will then render the web pages and package the XML, encrypt the session credentials, compose the HTTP response and return it to the HTTP dispatcher. At this point, the session is complete and is cleared from the web application server. The HTTP dispatcher will dispatch the HTTP response to the Internet through the firewall for return to the requester.

Because the KnOS architecture is 100% parallel, the equivalent of the relational select operation (step #6) can be separated from the equivalent to the relational join. The KnOS equivalent of the join operation (pooling/filtering), which is the core bottleneck of an RDBMS, can be run at any layer of the computing stack—the database processor, the web application server or the desktop. This is done by simply passing the Items obtained in the select to the designated processing location before invoking the pooling/filtering operation (the KnOS equivalent of a join). In the case of Drawing 21, the pooling/filtering operation has been consigned to the web application servers.

Because each Item is fully encapsulated with a primitive level of granularity, the data farm can be spread across any number of data servers without increasing contention. Also, because there is no need for sequence in the disk arrangement, the Items can be arranged across the data servers based on each one's request profile to balance workload. Dictionary server $\{1,1,2,0\}$ is a replicated tag set of $\{1,1,1,0\}$ with replication maintained by the KnOS subscription service. There may be any number of dictionary servers to balance the workload.

This is a loosely coupled cluster of processing nodes. There is no requirement for shared memory among the nodes. All requirements for cooperative processing are based strictly on simple, referenced fetches. Thus, all traffic on the high-speed bus is either HTTP or referenced fetches. All data is embedded in one or more Items housed on the data servers (there are no ancillary data repositories). All critical servers, such as web application servers, dictionary servers and data servers, can be expanded as needed to meet the workload. The only contended resource that cannot be expanded easily is the main bus.

The KnOS architecture can be scaled within a single Environment using parallel processing techniques to meet any enterprise computing need, and that scalability applies throughout the life of the installation. Multiple KnOS Environments can function on a similar cooperative basis.

Scalability of the Associative Operations:

The KnOS database processor(s) can get essentially 100% utilization from the processor because KnOS database operations use only encapsulated, integer arithmetic. Consider, for example, the basic associative operation called pooling. The basic pooling operation takes two complete encapsulated classifications of VK Sets for two different Items and determines the intersection, typically sing a boolean AND operation, between the two arrays of Vector Keys. For example, select the "child" classification of VK Sets from Item A and the "parent" classification of VK Sets from Item B. Performing the basic pooling operation on the two arrays would determine the children of A or the parents of B, depending upon one's orientation. The operation thus identifies the complete range of association between two Items for a given context (in this case context="parent/child"), which is why it is the core operation of an associative DBMS.

For each Item, the preferred embodiment of the KnOS keeps VK Sets in the correct sequence within each Vector Key dimension. For example, within the classification of "parent" Vector Key {0,3,2,4} would come after {0,3,1,4} but before {0,3,2,7} on the storage medium. The basic pooling operation compares two arrays of such Vector Keys, arranged in this fashion, to determine the intersection of the two Item's VK Sets. The following discussion assumes that a single classification of VK Sets on a single Item consists of unique entries. It is possible for a single classification of VK Sets for a single Item to have more than one copy of a given Vector Key, but that is a trivial variation to the operational discussion below.

Of the two reference classifications being pooled, the array with the fewest number of Vector Keysis called the "driver" array and the array with more Vector Keysis called the "target" array. Beginning with the lowest {e.g., 0,0,1,0} Vector Key entry in the driver array, the pooling operation looks for a matching Vector Key in the target array by means of a standard binary tree search. If a Vector Key match is found as a result of the binary tree search, a copy of the Vector Key is inserted in the solution set, which represents the intersection of the VK Sets, and the location of the next entry in the target array is noted for use in the next iteration of the search. If no match in the target if found, the location of the entry in the target array that is just greater than the current driver Vector Key is noted for use in the next iteration.

The portion of the target array that precedes the noted location may be ignored for successive binary tree searches in the given pooling operation because all Vector Key entries in that portion of the target array are less than the current entry being processed from the driver array. This optimizes the binary tree search. The pooling operation continues in this fashion with each next entry in the driver array, until all Vector Keys in the driver array have been checked against the target array. This optimized binary tree search is further optimized by the fact that, in practice, the VK Set arrays of Vector Keys typically contain long strings of Vector Keys to a given Context. Thus, the binary tree search can perform the "compare" part of the "load and compare" operation only on the Item component of the Vector Keys, checking the E, R, and C component of the {E,R,C,I} only when an Item match is found.

Optimized in the manner described above, two VK Set arrays with sequenced Vector Keys in each could average about 10 optimized binary tree searches per "driver" entry— more searches for the first driver entries, fewer for the later driver entries—to examine the "target array" for a match. Each binary tree search action is a "load and compare" operation to the processor. If the processor's pipeline is optimized, each "load and compare" operation can be completed within a single clock cycle.

Even these excellent performance numbers can be "tuned" significantly by recognizing that an Item with a single VK Set classification with many Vector Keys likely contains multiple, unresolved contexts. For optimum performance, each of these mixed contexts should be resolved by classifying them and then segmenting them to independent tag set Items. If a large VK Set were to be segmented into even four independent tag sets based on context, then the time required to conduct the pooling operation would only consume one-quarter as much processor resources. This is because all KnOS database transactions are context-sensitive. By eliminating muddled contexts from the database definitions, the KnOS will experience significantly less processing workload to achieve the same result.

For example, consider an application that does labor planning by job charge number, by labor category, by person, by week. In a major enterprise implementation for 10,000 employees, this KnOS database might contain a million Vector Keys associated to "40" hours. If the "40" Item had these Vector Keys in a single classification scheme, it might pose a performance problem. If so, a "person" context might be established for the "40" Item's VK Set, such that each person would have their own tag set consisting of their personal "40" Vector Key. Then, each of the 10,000 personalized tag sets would only have 100 Vector Key references to the "40" Item on average instead of a million. For database transactions where the person is known, this would speed up transaction processing by a factor of 10,000/1. By examining the actual workload profile of the application, the VK Sets can be segmented into tag sets by "context" to improve the performance of the database, thereby improving substantially its efficiency of operation.

The KnOS's ultra high scalability profile rests on six concepts.

The KnOS supports a very broad distribution/parallelization without significant increases in contention among transactions because of its ability to fully encapsulate both a) data at a very low level of granularity; and b) the core associative operations.

KnOS associative operations can be distributed and parallelized both horizontally, across processors performing the same function, and vertically, up and down the architectural stack, wherever computing resources are available. The core Vector Key pooling operation, that represents 99% of the DBMS workload, can be performed at the dictionary server(s), database server(s), the web application server(s) or the end-user's PCs.

KnOS associative operations are simply integer arithmetic, which can be staged and pipelined so as to achieve essentially 100% utilization of a processor.

The KnOS's efficiency of operation, measured in processor time required per end-user transaction, can be corrected, post implementation, to eliminate any bottlenecks y identifying the correct "context" for each bottleneck and then segmenting the VK Sets into dedicated tag sets by context. All KnOS bottlenecks are related to clusters of VK Sets with overly broad or muddled contexts.

The KnOS does not have to save intermediate results for continuity in user sessions because it is efficient enough to repeat the process each time. Given that there is no need to maintain open sessions on any of the systems servers with each user's intermediate results, HTTP dispatching can direct transactions to the server with the least workload.

Lastly, because each KnOS Context is essentially a secondary key index, the workload profile of a KnOS implementation is not dependent upon the type or complexity of the transactions being performed.

The KnOS is highly scalable because, whether data or operations, it can be broken down into relatively small, fully encapsulated components that can be parallelized with very limited contention for system resources. Also, because of the KnOS design, each different type of transaction presents approximately the same workload profile to the processors. By improving the context (classification scheme) of the database through the use of tag sets, the KnOS can be performance-tuned so that each transaction only has to look through the data within a relevant context.

Fuzzy Associations:

A topic critical to the evolution of computing is that of fuzzy logic. No processing model is more suitable than the KnOS to facilitating applications constructed with fuzzy logic.

Much of the criticism about computers occurs because computers typically use precise logic. When a computer compares "Paco Verde" and "Paul Green", it detects no match. When a computer compares "1028 Morningside Way" to "1028 Morningside Way" it detects no match. When a computer is instructed that "Paco Verde" lives at "1028 Morningside Way" while "Paul Green" resides at "1028 Morningside Way" the computer still will not detect any matching pattern. Most humans would spot these matches instantly—the Data Instances are the same in Spanish and English, respectively, and the addresses are misspellings for one another. These are matches in a fuzzy dimension. In other words, by ignoring language differences and misspellings, the computer could determine that "Paco Verde" and "Paul Green" have a very strong association. They have the same Data Instance value in a language dimension and they live at the same address in misspelling dimension. A reasonable conclusion from fuzzy logic would be that "Paco Verde" and "Paul Green" are aliases.

Because the KnOS is cellular model and not an RDBMS, the KnOS can accommodate, store and retrieve, as many fuzzy dimensions as can be defined by the particular application. For example, the application might establish one fuzzy dimension for misspellings and another for language equivalencies. The application can then insert VK Sets into the KnOS for fuzzy associations just as it would for precise associations, like parent/child. When the application identifies the fuzzy associations it can record them. These fuzzy VK Sets can be included as additional VK Set classifications within the Item or as separate tag sets by context. In this manner, the KnOS can separate the dimensions. When queried in a precise context, the KnOS would find no match between "Paco Verde" and "Paul Green". When queried in a fuzzy language dimension, it would find a match.

The invention claimed is:

1. A data management system comprising:
   a. a plurality of independent data structures having a common form, each of said data structures encapsulating a single data instance;
   b. each of said data structures also encapsulating references to other of said independent data structures encapsulating associated data instances; and
   c. wherein said plurality of data structures are stored on a computer-readable media in non-tabular form and further wherein said data instances encapsulated in said data structures can be added, removed and searched.

2. The data management system of claim 1 wherein each of said independent data structures also encapsulates a reference indicating the location of itself within a multi-dimensional organization of said data structures.

3. The data management system of claim 1 wherein a first data instance is encapsulated with references to associated data instances and each of said associated data instances are separately encapsulated with a reference to said first encapsulated data instance.

4. The data management system of claim 3 wherein said data structures are application independent and generally the same for all of said data instances.

5. The data management system of claim 1 wherein:
   a first data instance is encapsulated with references to associated data instances and each of said associated data instances are separately encapsulated with a reference to said first encapsulated data instance;
   wherein each of said encapsulated references is a logical index which uniquely identifies each of said associated encapsulated data instances and also encodes the location of each of said associated encapsulated data instances on said computer-readable media; and
   wherein said logical index is 'm' dimensional, and has 'n' bits per dimension.

6. The data management system of claim 5 wherein said data structures are application independent and generally the same for all of said data instances.

7. The data management system of claim 1 wherein:
   said encapsulated references are in at least one dimensions; and
   each of said at least one dimensions corresponds to a type of association.

8. The data management system of claim 7 wherein each of said at least one dimensions has a plurality of said encapsulated references.

9. The data management system of claim 8 wherein said data structures are application independent and generally the same for all of said data instances.

10. The data management system of claim 7 wherein said data structures are application independent and generally the same for all of said data instances.

11. The data management system of claim 1 wherein said data structures are application independent and generally the same for all of said data instances.

12. The data management system of claim 1 wherein at least one of said encapsulated references is a reference to an encapsulated data instance in another computing environment.

13. The data management system of claim 1 wherein the encapsulated references of at least one of said encapsulated data instances are unique and the encapsulated references of at least two of said encapsulated data instances are generally identical.

14. The data management system of claim 1 including a plurality of pre-existing encapsulated data instances having established associations, wherein at least one new encapsulated data instance is associated with at least one of said preexisting encapsulated data instates.

15. The data management system of claim 1 including a plurality of pre-existing encapsulated data instances having established associations, wherein any of said pre-existing encapsulated data instances can be removed and disassociated from other pre-existing associated encapsulated data instances.

16. The data management system of claim 1 including a plurality of pre-existing encapsulated data instances having established associations, wherein new associations between at least two pre-existing encapsulated data instances can be added.

17. The data management system of claim 1 including a plurality of pre-existing encapsulated data instances having established associations, wherein any of said pre-existing associations between said pre-existing encapsulated data instances can be removed.

18. The data management system of claim 1 further comprising a search capability for finding specific unknown encapsulated data instances from a selection criteria of known encapsulated data instances by accessing said known encapsulated data instances representing said selection criteria comprising the steps of:
    accessing references encapsulated with said known encapsulated data instances representing said selection criteria;
    using Boolean operations to compare said accessed encapsulated references to find references to said specific unknown encapsulated data instances; and
    retrieving said specific unknown encapsulated data instances.

19. The data management system of claim 18 wherein said encapsulated references are embodied as logical indexes in a plurality of dimensions, each of said dimensions corresponding to a type of association, wherein said accessing further comprises accessing said encapsulated references from said dimensions specified in said selection criteria.

20. The data management system of claim 19 wherein said encapsulated references are 'm' dimensional logical indexes, each of which uniquely identifies and encodes the location of said associated encapsulated data instances on said computer readable media, wherein said encapsulated references are filtered by Boolean operations on at least one of said 'm' dimensional logical indexes.

21. The data management system of claim 20 wherein said Boolean operations further comprise:
    a basic mathematical operator which results in the direct exclusion of at least one encapsulated reference from the result of said comparing in a single operation.

22. The data management system of claim 19 wherein said Boolean operations further comprise:
    a basic mathematical operator which results in the direct exclusion of at least one encapsulated reference from the result of said comparing in a single operation.

23. The data management system of claim 18 wherein said encapsulated references are 'm' dimensional logical indexes, each of which uniquely identifies and encodes the location of said associated encapsulated data instances on said computer readable media, wherein said encapsulated references are filtered by Boolean operations on at least one of said 'm' dimensional logical indexes.

24. The data management system of claim 23 wherein said Boolean operations further comprise:
    a basic mathematical operator which results in the direct exclusion of at least one encapsulated reference from the result of said comparing in a single operation.

25. The data management system of claim 18 wherein said Boolean operations further comprise:
    basic mathematical operators which result in the direct exclusion of at least one encapsulated reference from the result of said comparing in a single operation.

26. The system of claim 1 wherein said encapsulated data instances have attributes of a user interface.

27. The system of claim 26 wherein said attributes of a user interface are selected from a group of user views, display elements, and data access methods.

28. The system of claim 1 further comprising searching said system wherein the encapsulated references of two or more different encapsulated data instances are used to derive desired results.

29. The system of claim 28 wherein said encapsulated references of two or more different encapsulated data instances are compared for at least one of commonality, similarity and difference to derive sets of references corresponding to said desired results.

30. The system of claim 29 wherein said encapsulated references of two or more different encapsulated data instances are stored in an order based on value and are compared for at least one of commonality, similarity and difference to derive sets of references corresponding to said desired results.

31. The system of claim 28 wherein:
    a first data instance is encapsulated with references to associated data instances and each of said associated data instances are separately encapsulated with a reference to said first encapsulated data instance;
    wherein each of said encapsulated references is a logical index which uniquely identifies each of said associated encapsulated data instances and also encodes the location of each of said associated encapsulated data instances on said computer readable media; and
    wherein said logical index is 'm' dimensional, and has 'n' bits per dimension; the encapsulated references of two or more different encapsulated data instances are compared for at least one of commonality, similarity and difference to derive sets of references corresponding to said desired results.

32. The system of claim 28 wherein:
    each of said at least one dimensions has a plurality of said encapsulated references; and
    said encapsulated references of two or more different encapsulated data instances are stored in an order based on value and are compared for at least one of commonality, similarity and difference to derive sets of references corresponding to said desired results.

33. The system of claim 1 further comprising:
    a plurality of encapsulated data instances representing ASCII characters;
    said data structures containing said encapsulated data instances representing ASCII characters also containing encapsulated references to encapsulated data instances using one or more of said corresponding ASCII characters; and
    said data structures containing encapsulated data instances using one or more of said ASCII characters also containing encapsulated references to said encapsulated data instances representing said used ASCII characters.

34. The system of claim 33 wherein said encapsulated references with a given ASCII character data instance refer to other encapsulated data instances using said ASCII characters based on the position of said given ASCII character in the sequence of said ASCII characters in said encapsulated data instances.

35. The system of claim 1 further comprising:
a plurality of encapsulated data instances representing Unicode characters;
said data structures containing said encapsulated data instances representing Unicode characters also containing encapsulated references to encapsulated data instances using one or more said Unicode characters; and
said data structures encapsulated data instances using one or more of said Unicode characters also contains encapsulated references to said data instances representing said used Unicode characters.

36. The system of claim 35 wherein said encapsulated references with a given Unicode character data instance refer to other data instances using said Unicode characters based on the position of said given Unicode characters in the sequence of said Unicode characters in said encapsulated data instances.

37. The system of claim 1 further comprising:
a plurality of encapsulated data instances representing the tokens of a token set of any data type;
said data structures containing said data instances representing said tokens also containing encapsulated references to encapsulated data instances using one or more of said tokens; and
said data structures containing encapsulated data instances using one or more of said tokens also containing encapsulated references to said encapsulated data instances representing said used tokens.

38. The system of claim 37 wherein said encapsulated references for a given token data instance refer to other encapsulated data instances using said token based on the position of said given token in the sequence of said tokens in said encapsulated data instance.

39. The system claim 38 wherein:
said token set is selected from a group consisting of a set of graphic descriptors, a set of colors, a set of shapes, a set of glyphs, a set of waveforms, a set of frequency values, a set of audio frequency values, a defined set of symbols, and real numbers.

40. The data management system of claim 1 wherein:
said data structure is application independent and is generally the same for all of said data instances;
finding specific unknown encapsulated data instances from a selection criteria of known encapsulated data instances by accessing known encapsulated data instances representing said selection criteria;
accessing references encapsulated with said known encapsulated data instances representing said selection criteria;
using Boolean operations to compare said accessed encapsulated references to find references to said specific unknown encapsulated data instances; and
retrieving said specific unknown encapsulated data instances.

41. The system of claim 40 further comprising searching said system wherein said encapsulated references of different said encapsulated data instances are used to derive desired results.

42. The data management system of claim 1 wherein:
at least one of said encapsulated references is a reference to an encapsulated data instance in another computing environment; and a first data instance is encapsulated with references to associated data instances and each of said associated data instances are separately encapsulated with a reference to an encapsulated data instance.

43. The data management system of claim 1 wherein:
said encapsulated references of at least one of said encapsulated data instances is unique and said encapsulated references of at least two of said encapsulated data instance are generally identical;
finding specific unknown encapsulated data instances from a selection criteria of known encapsulated data instances by accessing known encapsulated data instances representing said selection criteria;
accessing references encapsulated with said known encapsulated data instances representing said selection criteria;
using Boolean operations to compare said accessed encapsulated references to find references to said specific unknown encapsulated data instances; and
retrieving said specific unknown encapsulated data instances.

44. The data management system of claim 1 wherein:
said encapsulated references of at least one of said encapsulated data instances is unique and said encapsulated references of at least two of said encapsulated data instance are generally identical; and
searching said system wherein said encapsulated references of different said encapsulated data instances are used to derive desired results.

45. A data management system in a computing environment comprising:
a plurality of independent data structures having a common form, each encapsulating a single data instance;
wherein said plurality of data structures are stored on a computer-readable media in non-tabular form;
wherein each of said encapsulated references is a logical index which uniquely identifies each of said associated encapsulated data instances and also encodes the location of each of said associated encapsulated data instances on said computer-readable media; and
wherein said logical index is 'm' dimensional, and has 'n' bits per dimension, said encapsulated references are in at least one dimensions, and each of said at least one dimensions corresponds to a type of association.

46. The data management system of claim 45 wherein each of said data structures are application independent and generally the same for all of said data instances.

47. The data management system of claim 46 further comprising a search capability for finding specific unknown encapsulated data instances from a selection criteria of known encapsulated data instances by accessing known encapsulated data instances representing said selection criteria comprising the steps of:
accessing references encapsulated with said known encapsulated data instances representing said selection criteria;
using Boolean operations to compare said accessed encapsulated references to find references to said specific unknown encapsulated data instances; and
retrieving said specific unknown encapsulated data instances.

48. The system of claim 47 wherein said encapsulated references of two or more different said encapsulated data instances are used to find said specific unknown encapsulated data instances.

49. The data management system of claim 48 wherein at least one of said encapsulated references is a reference to a encapsulated data instance in another computing environment.

50. The data management system of claim 49 wherein said encapsulated references of at least one of said encapsulated data instances is unique and said encapsulated references of at least two of said encapsulated data instances are generally identical.

51. The system of claim 50 further comprising searching said system wherein said encapsulated references of different said encapsulated data instances are used to derive desired results.

52. The data management system of claim 45 further comprising a search capability for finding specific unknown encapsulated data instances from a selection criteria of known encapsulated data instances by accessing known encapsulated data instances representing said selection criteria comprising the steps of:
 accessing references encapsulated with said known encapsulated data instances representing said selection criteria;
 using Boolean operations to compare said accessed encapsulated references to find references to said specific unknown encapsulated data instances; and
 retrieving said specific unknown encapsulated data instances.

53. The system of claim 52 wherein said encapsulated references of two or more different said encapsulated data instances are used to find said specific unknown encapsulated data instances.

54. The data management system of claim 45 wherein at least one of said encapsulated references is a reference to a encapsulated data instance in another computing environment.

55. The data management system of claim 45 wherein said encapsulated references of at least one of said encapsulated data instances is unique and said encapsulated references of at least two of said encapsulated data instance are generally identical.

56. A method to convert a non-data instance centric database to a data instance centric database comprising:
 creating encapsulated data instances in said data instance centric database representing elements of said non-data-instance centric database schema and data elements of said non-data-instance centric database;
 creating associations amongst the said data instances in said data instance centric database representing the relationships between said data elements and said schema elements of the non-data-instance centric database; and
 storing said associations as a reference to each associated data instance stored within a independent data structure having a common form encapsulating the associated data instances, which are stored in non-tabular form on a computer-readable media.

57. The method of claim 56 wherein said converting is through a software agent which is a data instance in said data instance centric database.

58. The method of claim 56 wherein said non-data instance centric database includes a flat file.

59. A data management system comprising:
 one or more items;
 wherein each of said items encapsulates a data instance;
 wherein items which are associated with each other encapsulate mutual references to each other;
 wherein said items may be added, removed and searched; and
 wherein said items are stored in non-tabular form on a computer-readable media.

60. The data management system of claim 59 wherein each of said items is represented in a fundamental data structure.

61. The data management system of claim 59 wherein each of said items has a unique reference associated therewith.

62. The data management system of claim 61 wherein said unique reference also serves as an index to physically locate said data instance associated with each of said items on said computer-readable media.

63. The data management system of claim 61 wherein each of said references is an "m" dimensional index, each of said dimensions being "n" bits in length.

64. The data management system of claim 63 wherein "m" is 4 and "n" is 30.

65. The data management system of claim 59 wherein said references to associated items are arranged in sets defining the type of association between said item and each of said other items referenced in said set.

66. The data management system of claim 59 wherein said items may act as containers for one or more other member items.

67. The data management system of claim 66 wherein membership of an item within a container item is indicated by an identity in one or more of said "m" dimensions in said logical index of said container item and each of said member items.

68. The data management system of claim 59 wherein each of said items may encapsulate embedded elements.

69. The data management system of claim 68 wherein said embedded elements are references to other items.

70. The data management system of claim 59 wherein said data instances may contain data of any type.

* * * * *